(12) United States Patent
Bae et al.

(10) Patent No.: US 11,971,070 B2
(45) Date of Patent: Apr. 30, 2024

(54) INDOOR UNIT FOR AN AIR CONDITIONER

(71) Applicant: LG ELECTRONICS INC., Seoul (KR)

(72) Inventors: Junseok Bae, Seoul (KR); Sunggyu Choi, Seoul (KR); Kangyoung Kim, Seoul (KR); Seongkuk Mun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 455 days.

(21) Appl. No.: 16/980,818

(22) PCT Filed: Mar. 15, 2019

(86) PCT No.: PCT/KR2019/003023
§ 371 (c)(1),
(2) Date: Sep. 14, 2020

(87) PCT Pub. No.: WO2019/177415
PCT Pub. Date: Sep. 19, 2019

(65) Prior Publication Data
US 2021/0088075 A1 Mar. 25, 2021

(30) Foreign Application Priority Data

Mar. 16, 2018 (KR) .................. 10-2018-0030777
Mar. 4, 2019 (KR) .................. 10-2019-0024963

(51) Int. Cl.
*F25D 23/00* (2006.01)
*F16C 17/03* (2006.01)
*F24F 1/0087* (2019.01)

(52) U.S. Cl.
CPC ............ *F16C 17/03* (2013.01); *F24F 1/0087* (2019.02); *F25D 23/006* (2013.01); *F16C 2362/52* (2013.01)

(58) Field of Classification Search
CPC ...... F16C 11/04; F16C 17/03; F16C 2362/52; F24F 1/005; F24F 1/0087; F24F 13/32; F24F 13/14; F24F 13/1433; F24F 13/11446; F24F 2013/087; F24F 2013/088; F24F 2006/008; F25D 23/006
USPC .................................. 384/312; 312/228, 236
See application file for complete search history.

(56) References Cited

U.S. PATENT DOCUMENTS

| | | | | |
|---|---|---|---|---|
| 5,810,661 A | * | 9/1998 | Bang .................... | F24F 11/79 454/286 |
| 7,399,222 B2 | * | 7/2008 | Moon .................... | F24F 1/0011 454/277 |
| 2001/0053963 A1 | * | 12/2001 | Kim ....................... | F25D 29/00 702/188 |

(Continued)

FOREIGN PATENT DOCUMENTS

| CN | 101578485 A | 11/2009 |
|---|---|---|
| CN | 202993483 U | 6/2013 |
| CN | 104235989 A | 12/2014 |

(Continued)

*Primary Examiner* — James Pilkington
(74) *Attorney, Agent, or Firm* — Bryan Cave Leighton Paisner LLP

(57) ABSTRACT

An indoor unit for an air conditioner enables a water tank to be tilted forward by means of a tilting assembly, and thus enables a user to conveniently separate or mount the water tank to the indoor unit.

20 Claims, 38 Drawing Sheets

(56) References Cited

U.S. PATENT DOCUMENTS

2009/0158935 A1    6/2009   Kim et al.
2016/0010882 A1    1/2016   Lee et al.

FOREIGN PATENT DOCUMENTS

| | | | | |
|---|---|---|---|---|
| CN | 204176846 | U | 2/2015 | |
| CN | 104949214 | A | 9/2015 | |
| CN | 105276712 | A | 1/2016 | |
| CN | 108443973 | A * | 8/2018 | |
| DE | 3616370 | A1 * | 11/1987 | ............... F16F 1/54 |
| JP | S6389876 | U * | 8/1988 | ............... B61D 27/00 |
| JP | 2001227813 | A * | 8/2001 | ............... F24F 12/28 |
| JP | 2004061042 | A | 2/2004 | |
| JP | 4092627 | B2 * | 5/2008 | ............... B60H 1/00 |
| JP | 2013007509 | A | 1/2013 | |
| JP | 2013096585 | A | 5/2013 | |
| JP | 2017161104 | A | 9/2017 | |
| KR | 200154585 | Y1 * | 8/1999 | ............. F24F 13/32 |
| KR | 10-2007-0047102 | A | 5/2007 | |
| KR | 10-0768168 | B1 | 10/2007 | |
| KR | 10-0775612 | B1 | 11/2007 | |
| KR | 20-2009-0000506 | U | 1/2009 | |
| KR | 10-2009-0084474 | A | 8/2009 | |
| KR | 1020090084474 | A | 8/2009 | |
| KR | 10-2010-0061115 | A | 6/2010 | |
| KR | 10-2014-0067310 | A | 6/2010 | |
| KR | 10-2012-0081900 | A | 7/2012 | |
| KR | 10-2013-0019322 | A | 2/2013 | |
| KR | 20140012437 | A * | 2/2014 | ............ F24F 1/0011 |
| KR | 1020150114345 | A | 10/2015 | |
| KR | 1020150146185 | A | 12/2015 | |
| KR | 10-2016-0006562 | A | 1/2016 | |
| KR | 10-1588126 | A | 1/2016 | |
| KR | 101703094 | B1 * | 2/2017 | ............ F16C 11/04 |
| KR | 1020180026984 | A | 3/2018 | |

* cited by examiner

[FIG. 1]
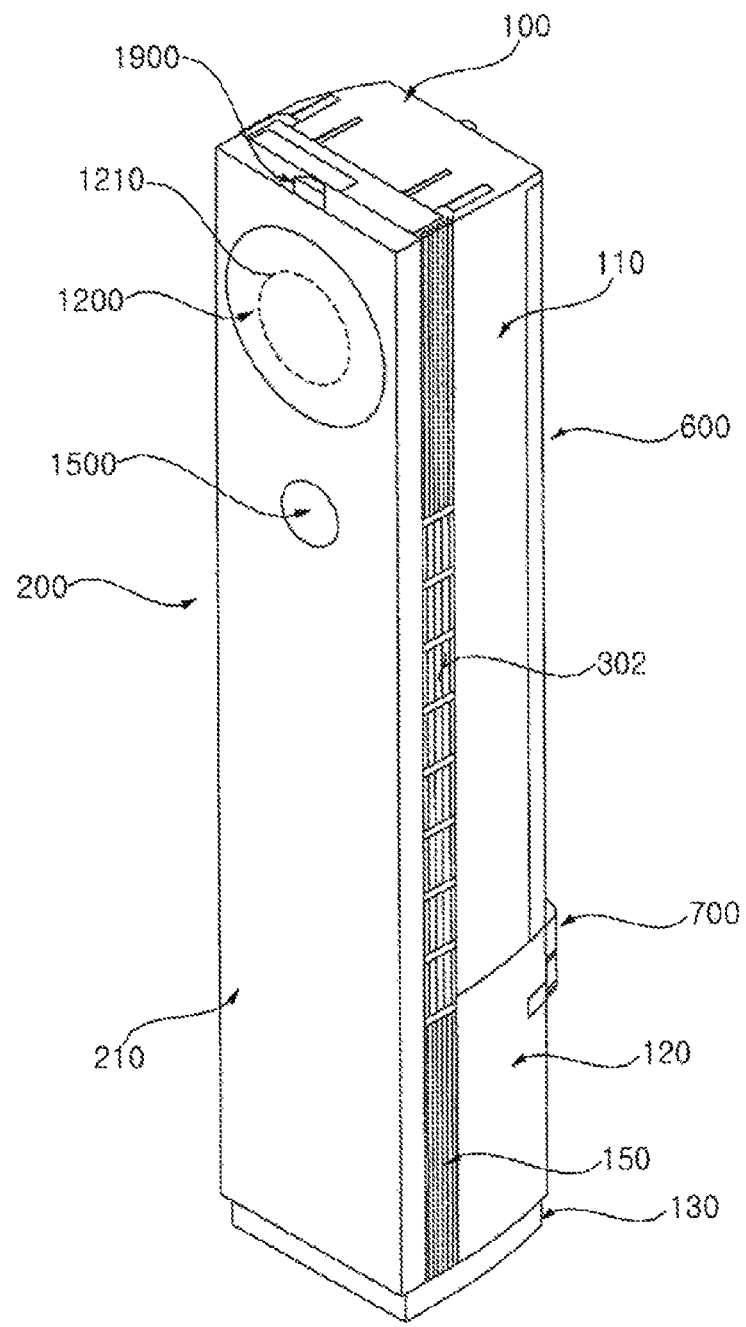

[FIG. 2]
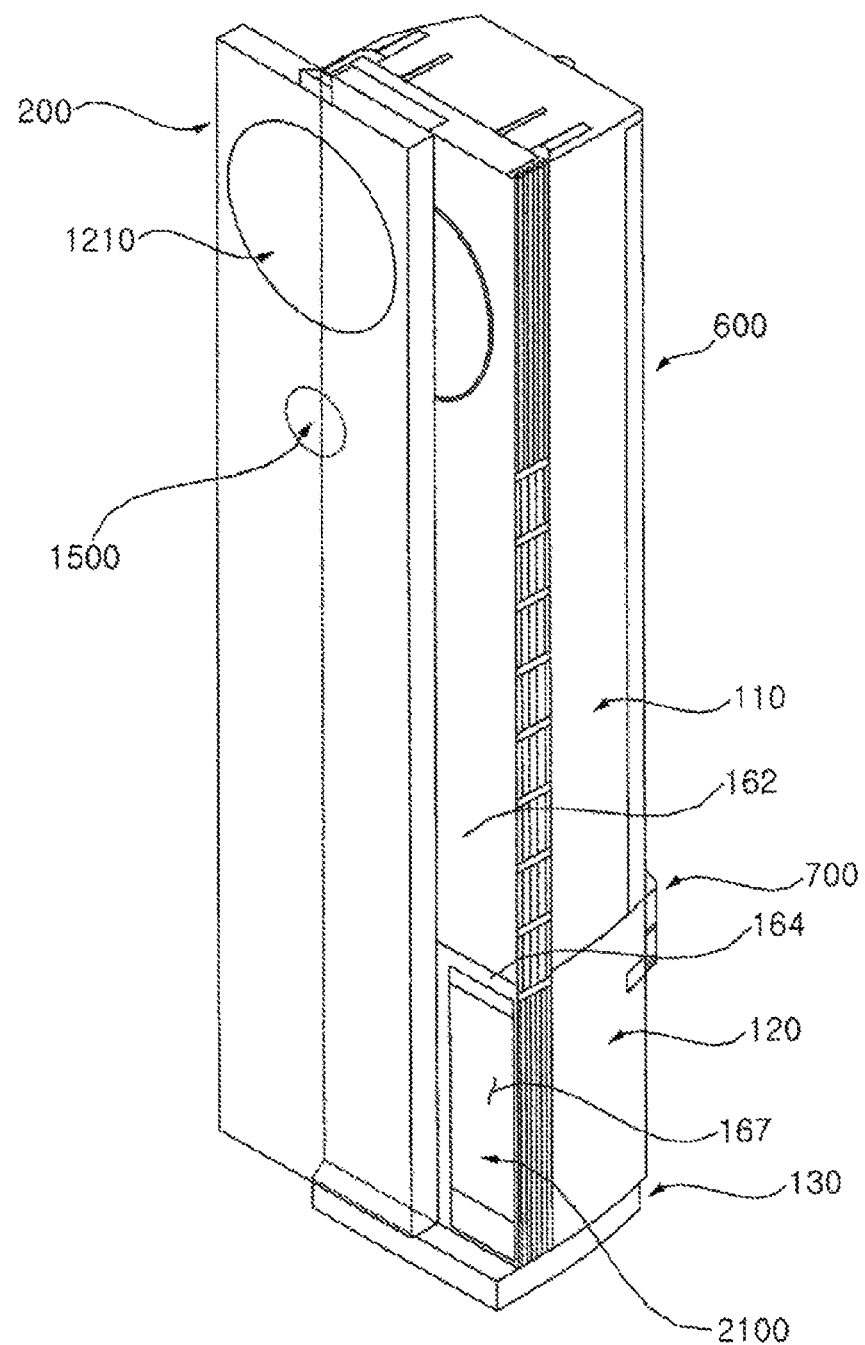

[FIG. 3]
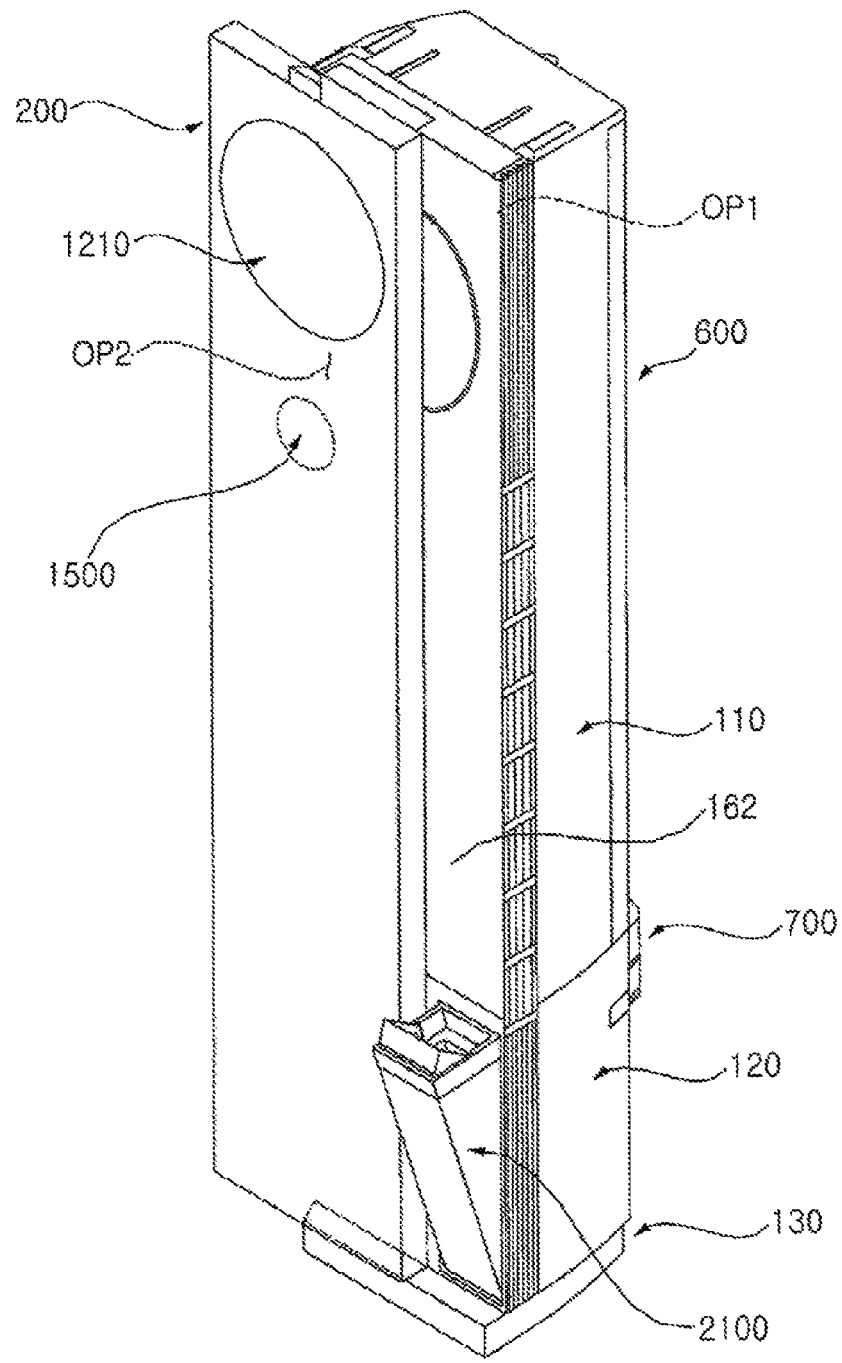

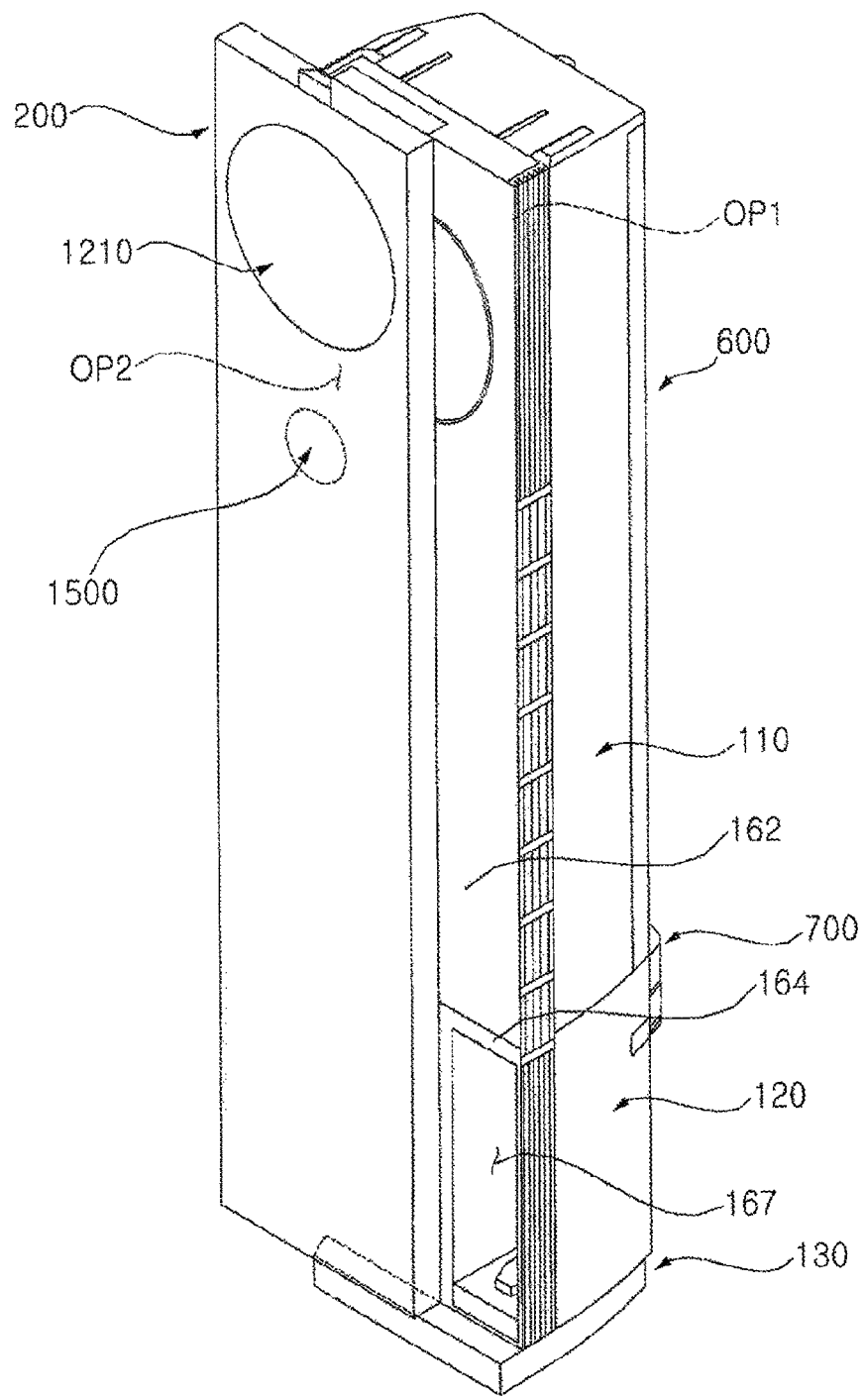
[FIG. 4]

[FIG. 5]
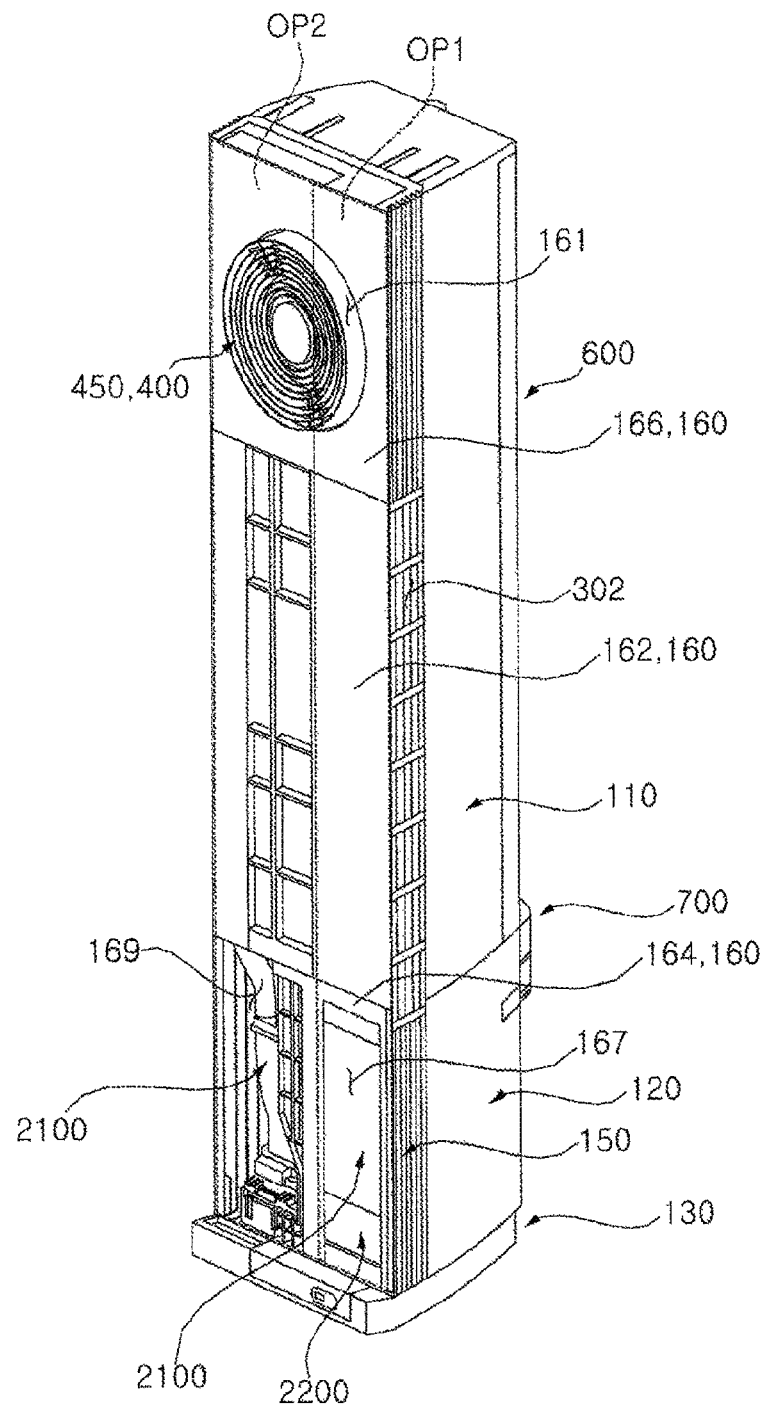

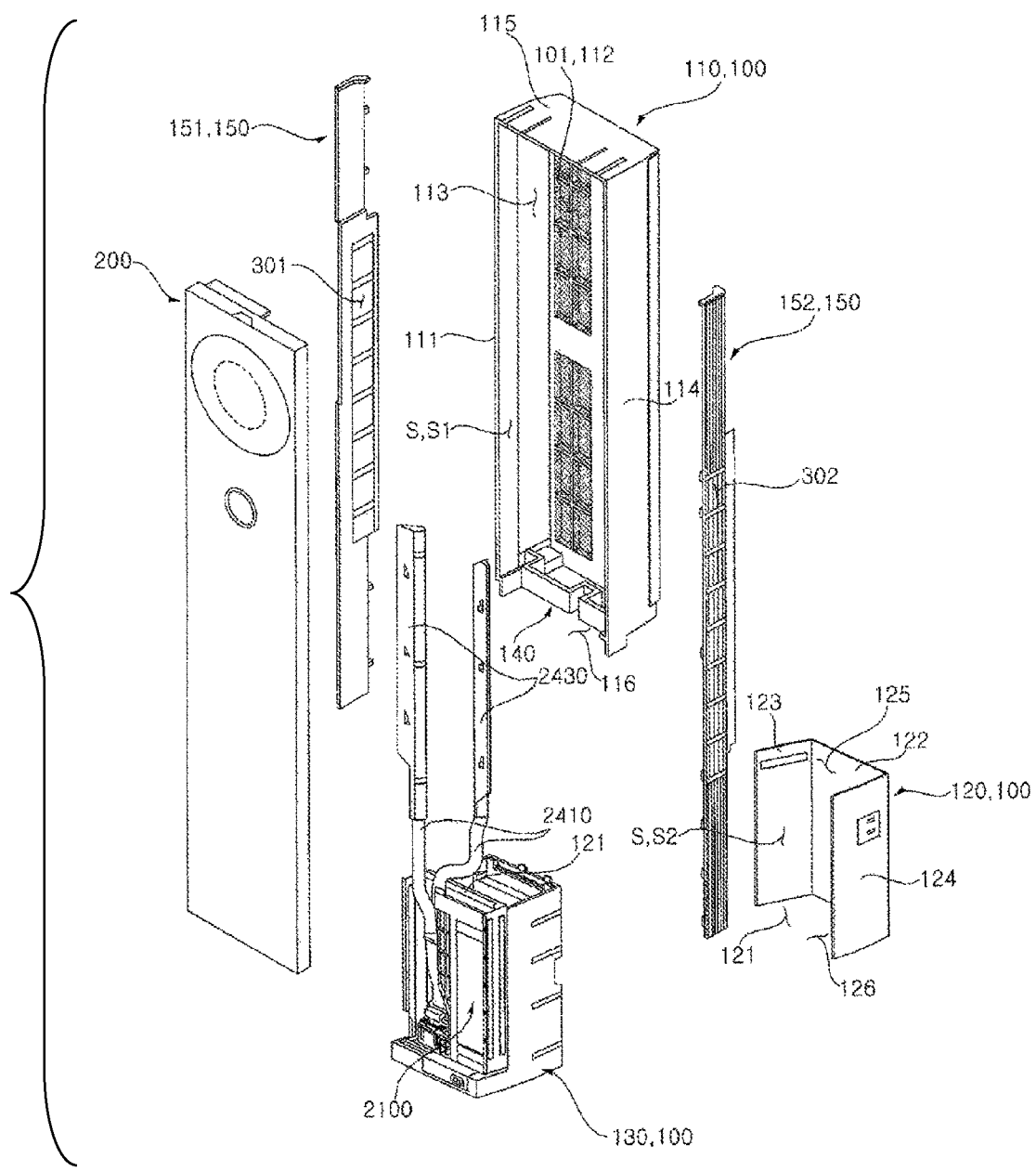
[FIG. 6]

[FIG. 7]
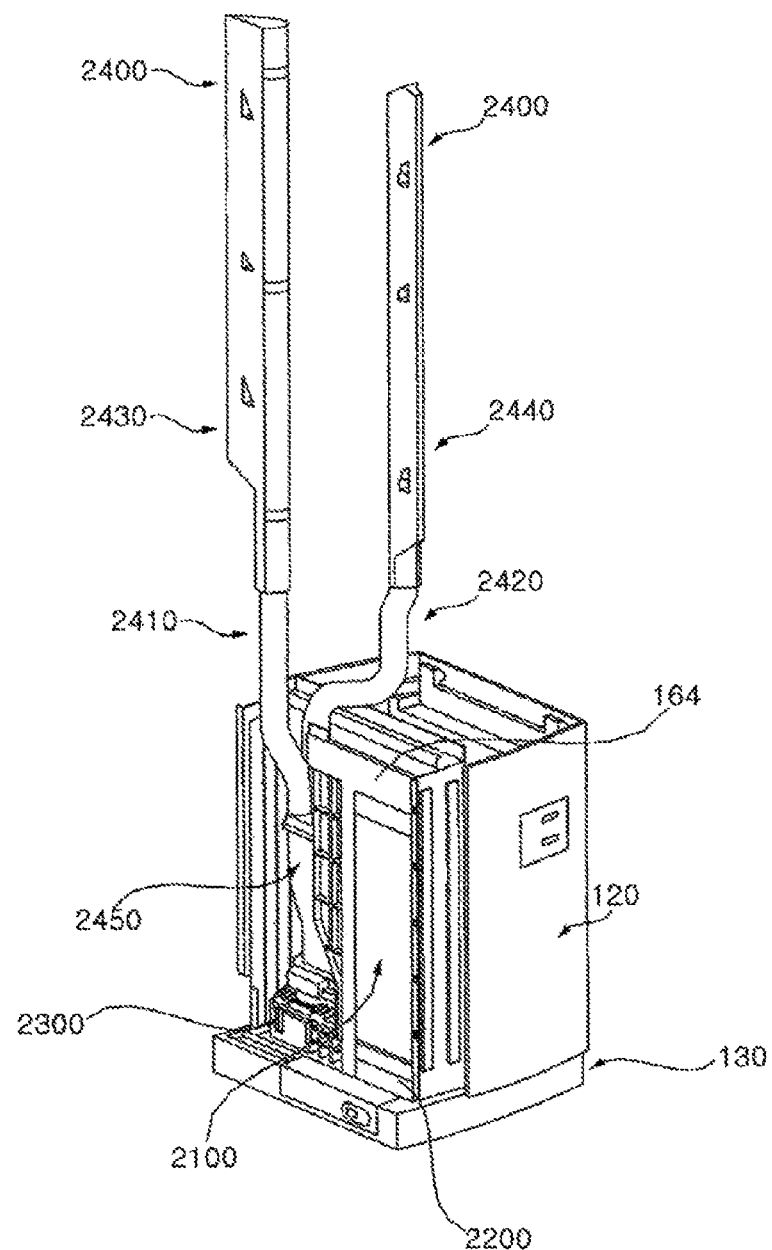

[FIG. 8]
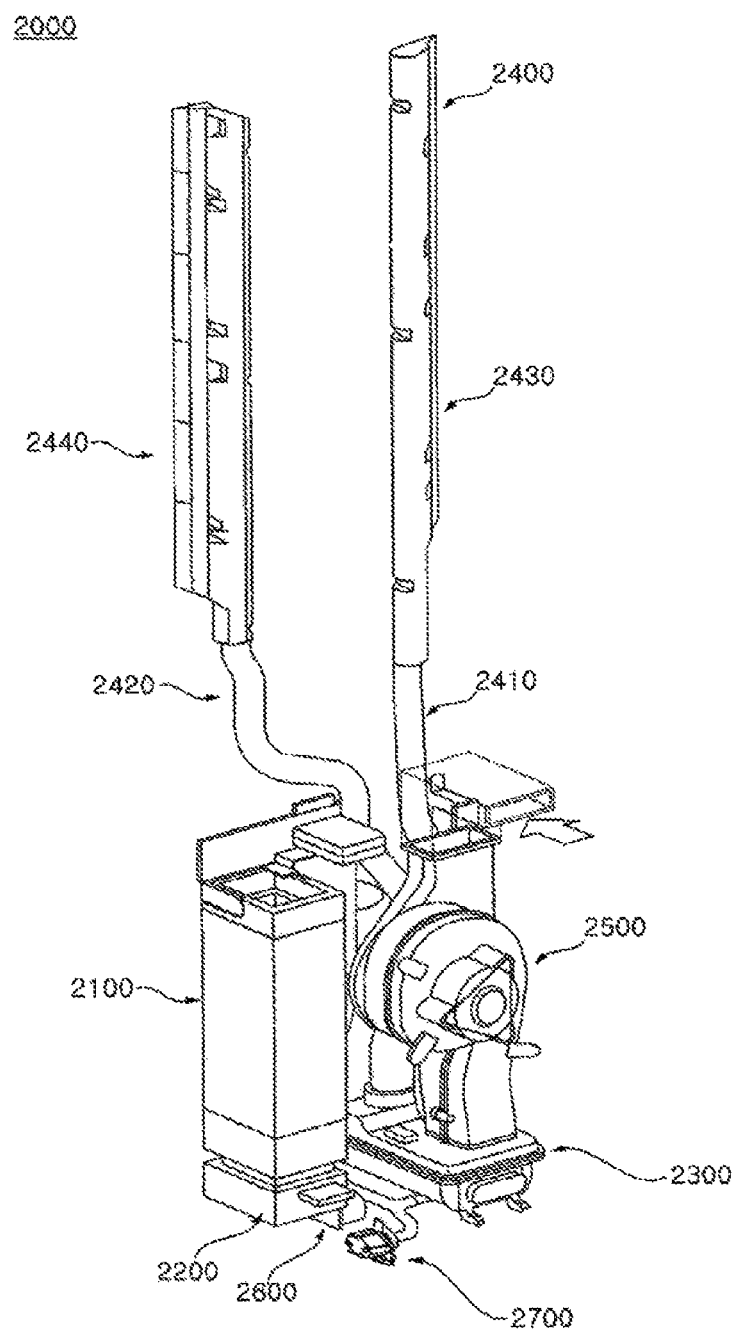

[FIG. 9]
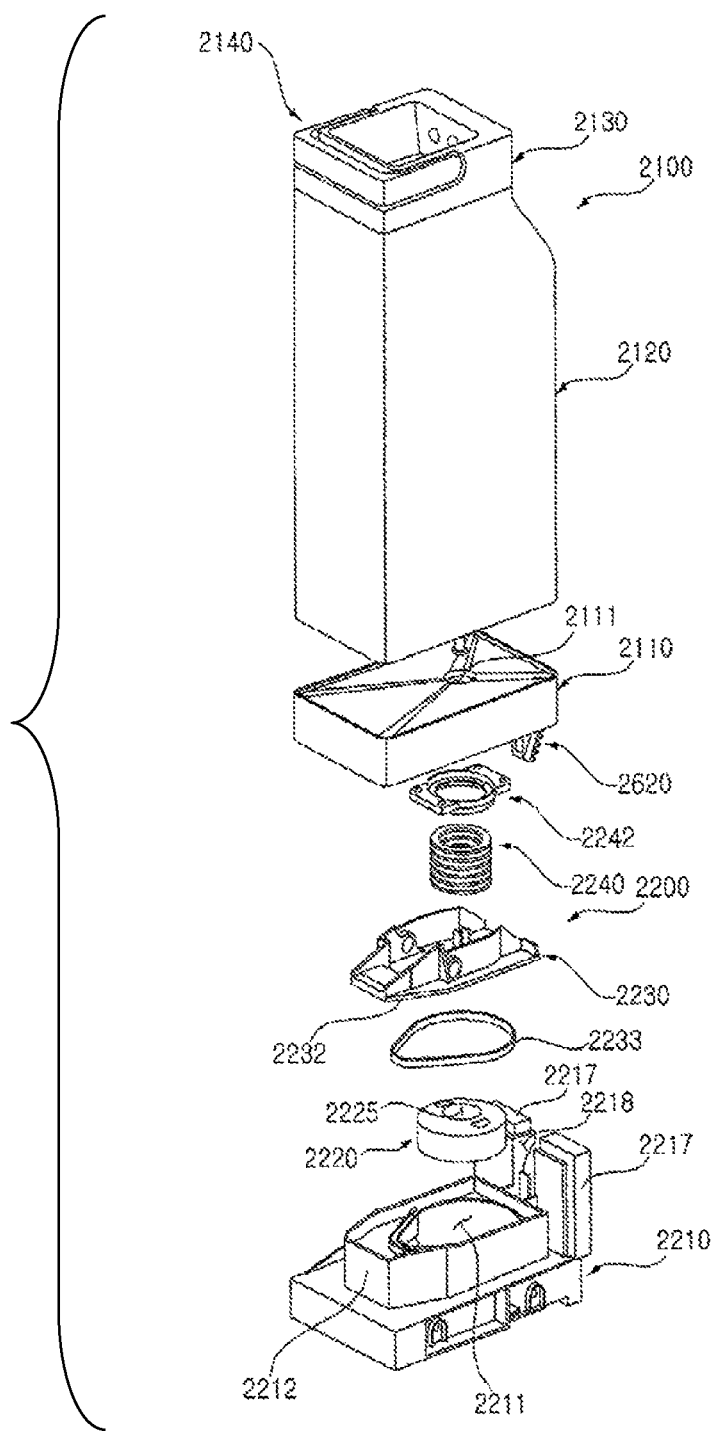

[FIG. 10]
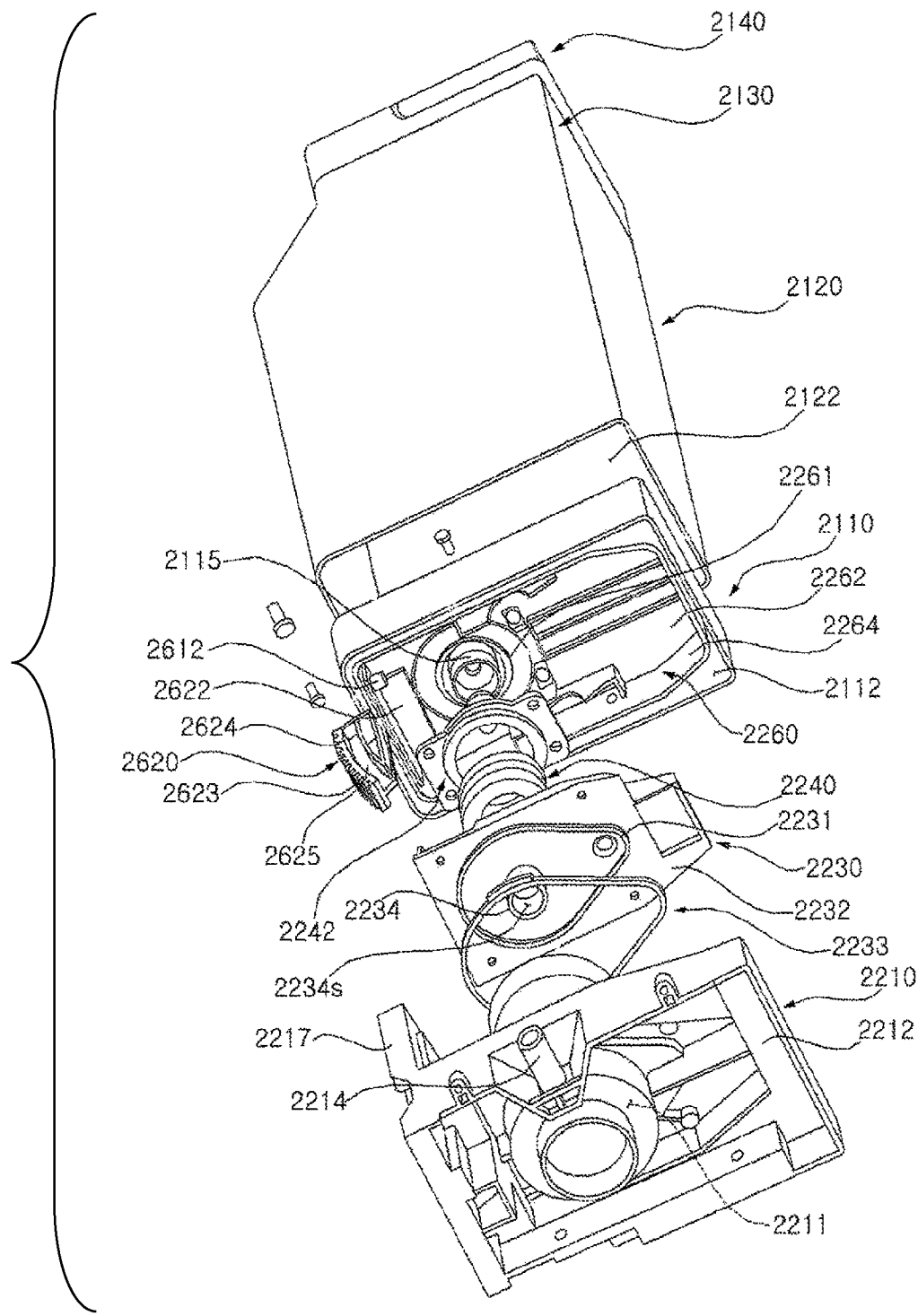

[FIG. 11]
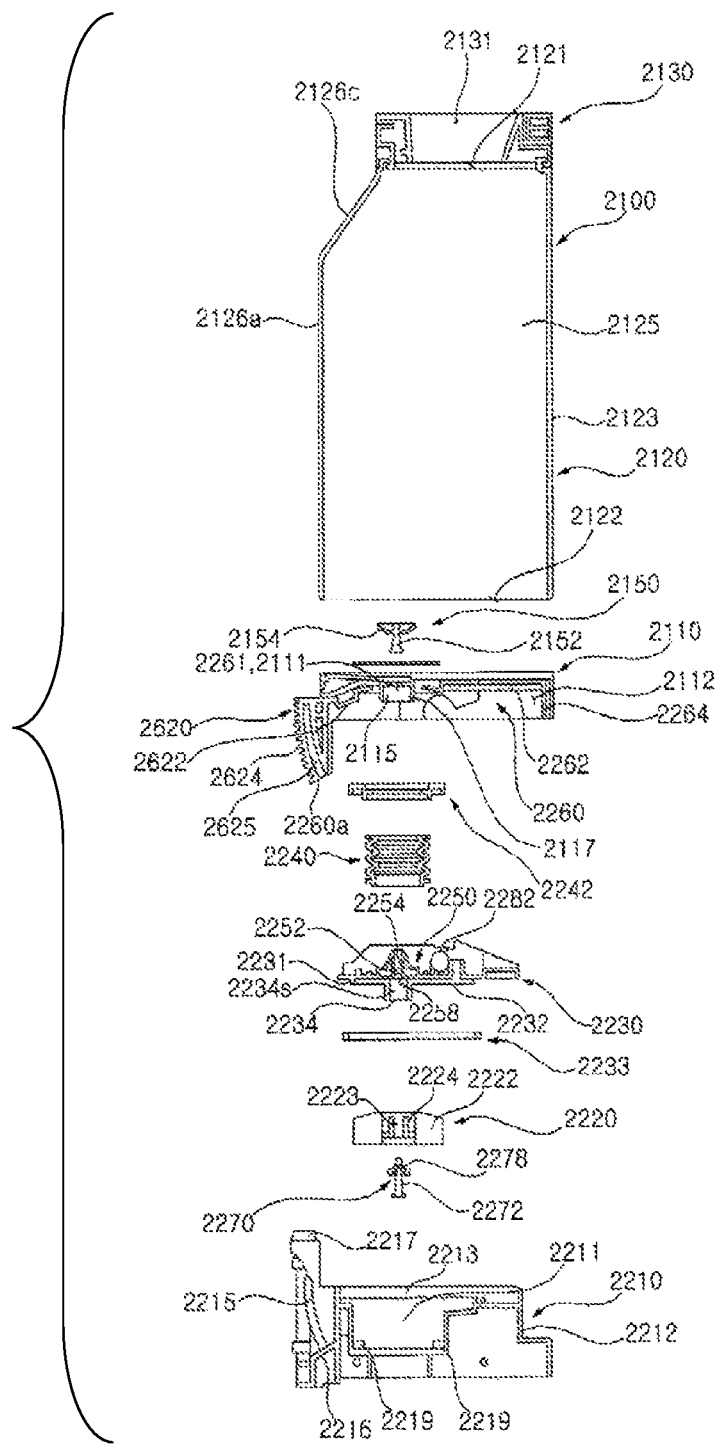

[FIG. 12]
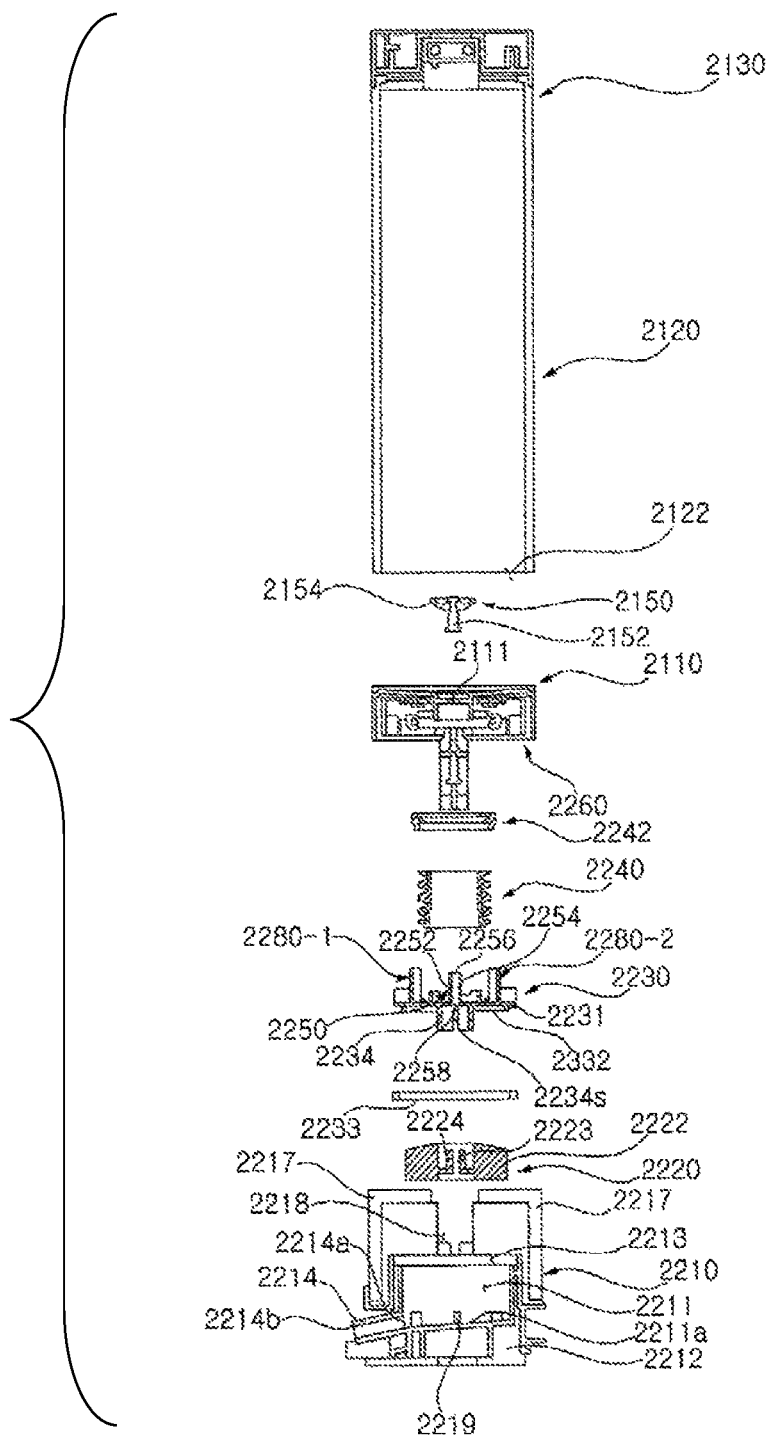

[FIG. 13]
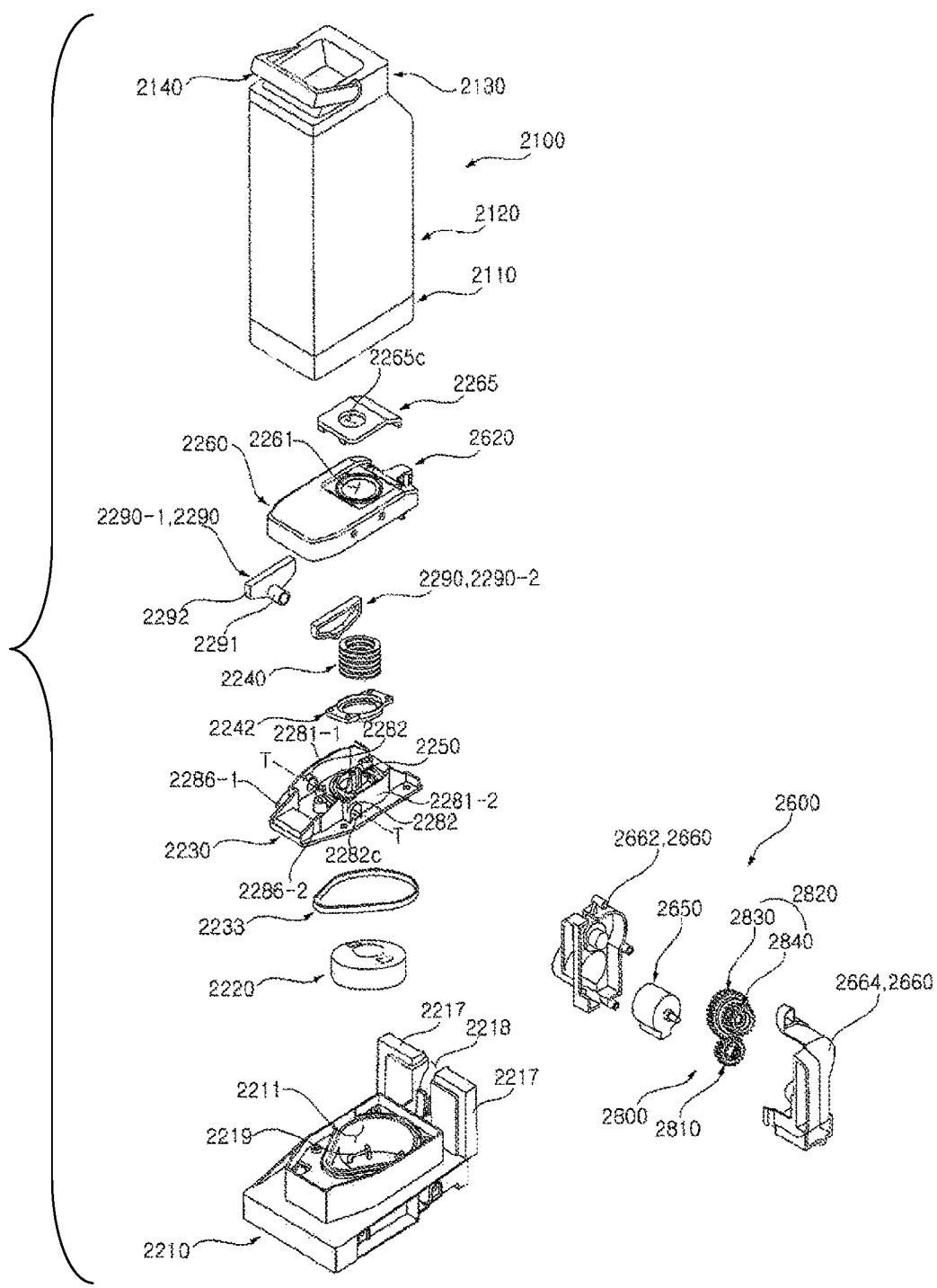

[FIG. 14]
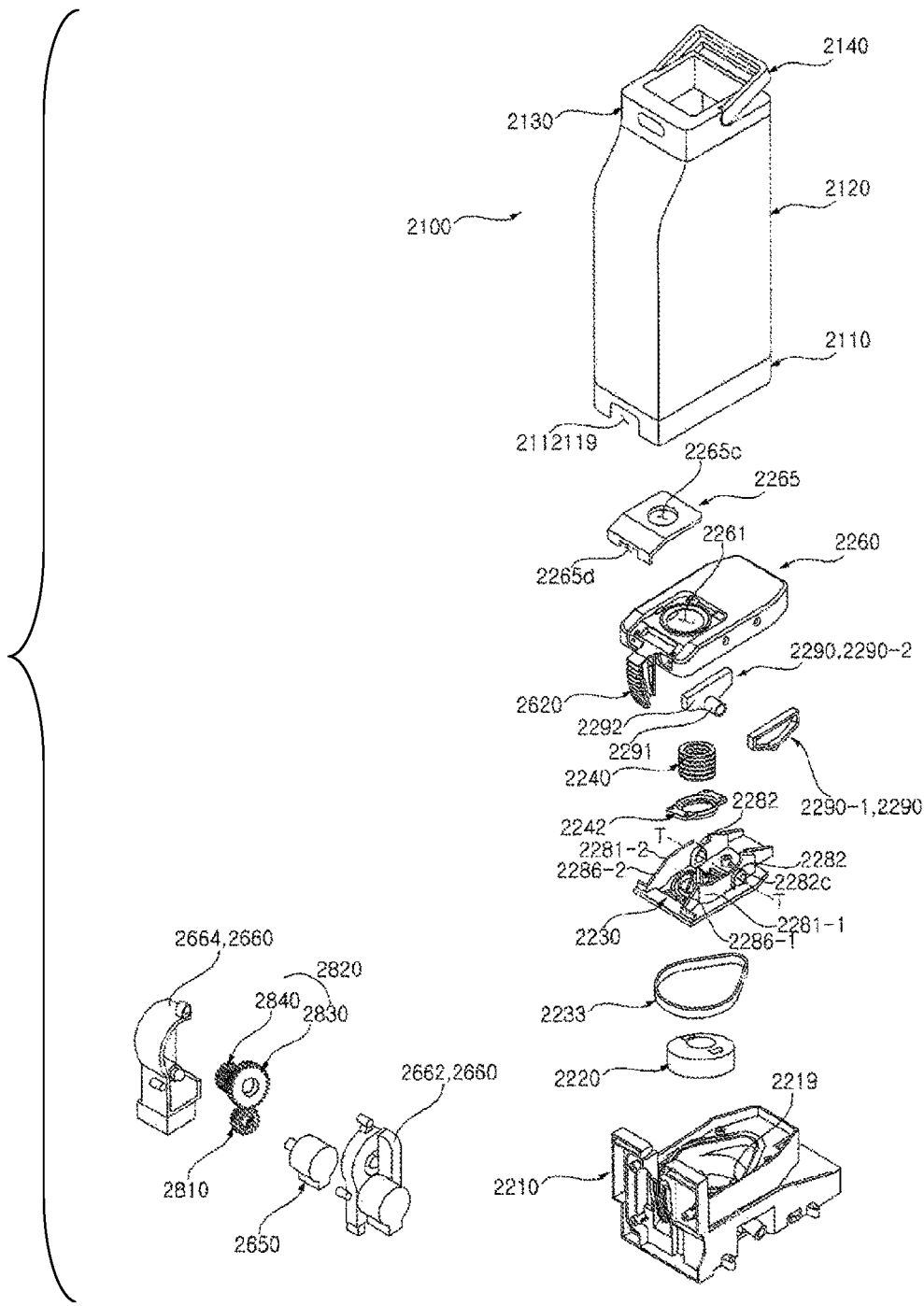

[FIG. 15]
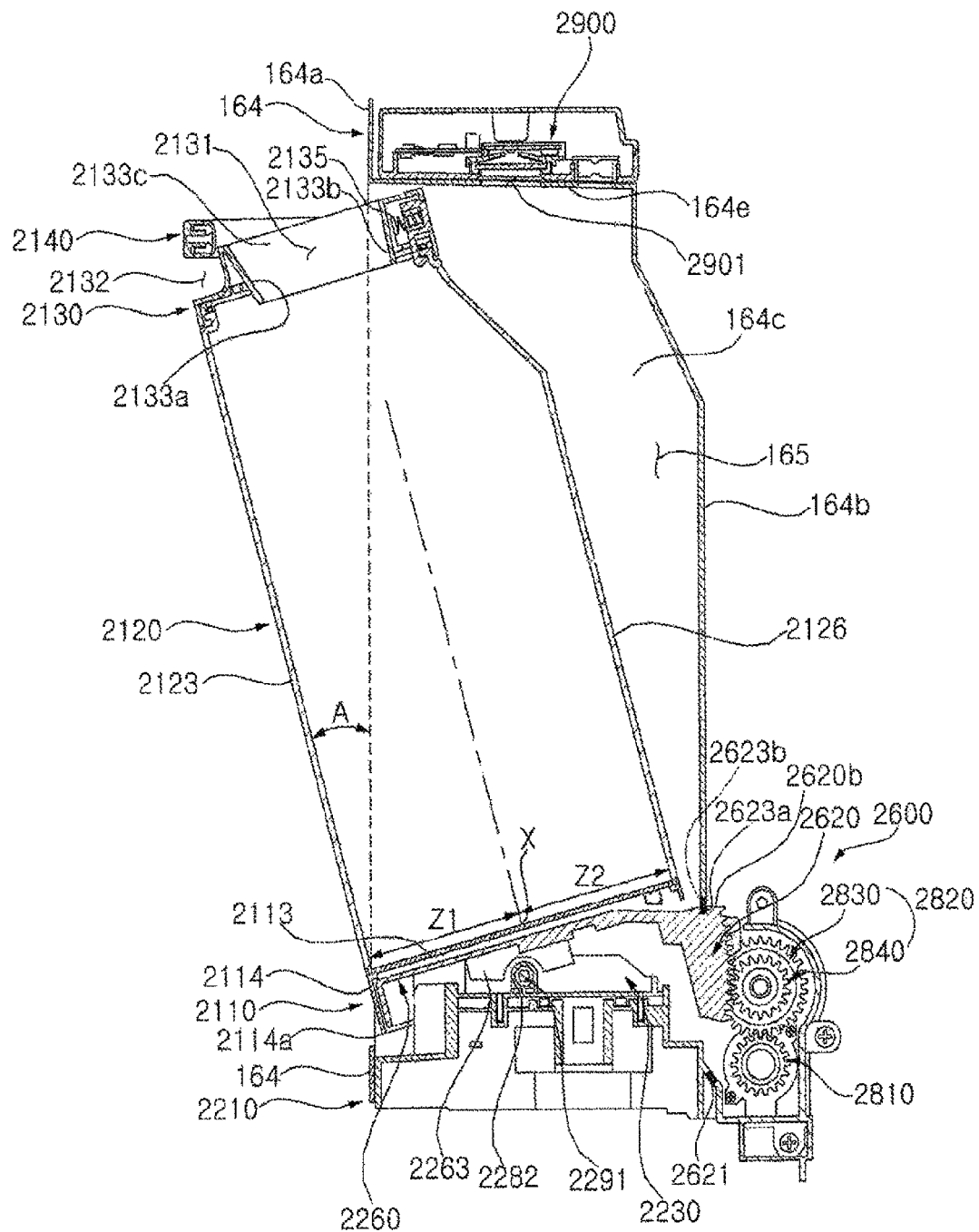

[FIG. 16]
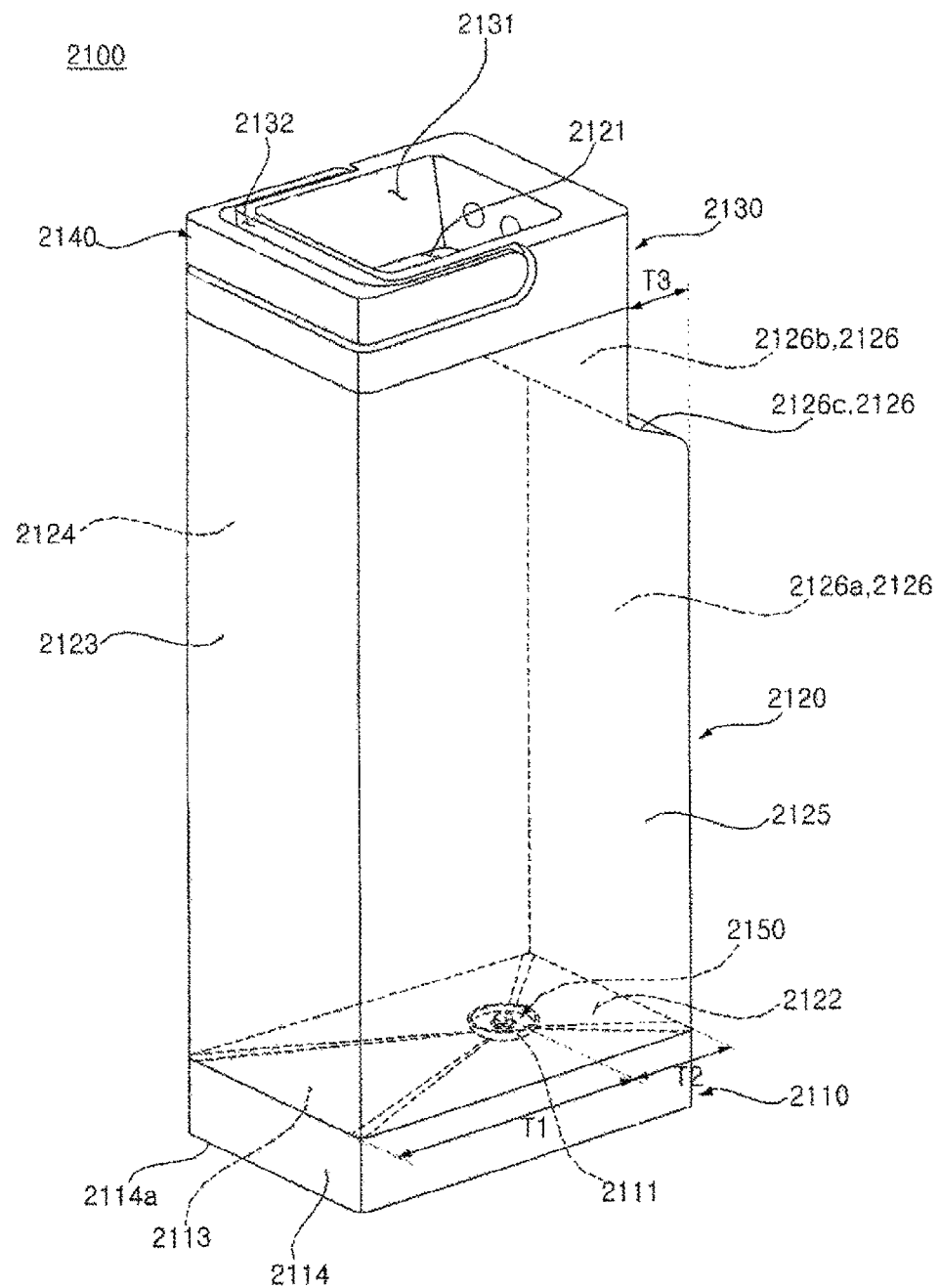

[FIG. 17]
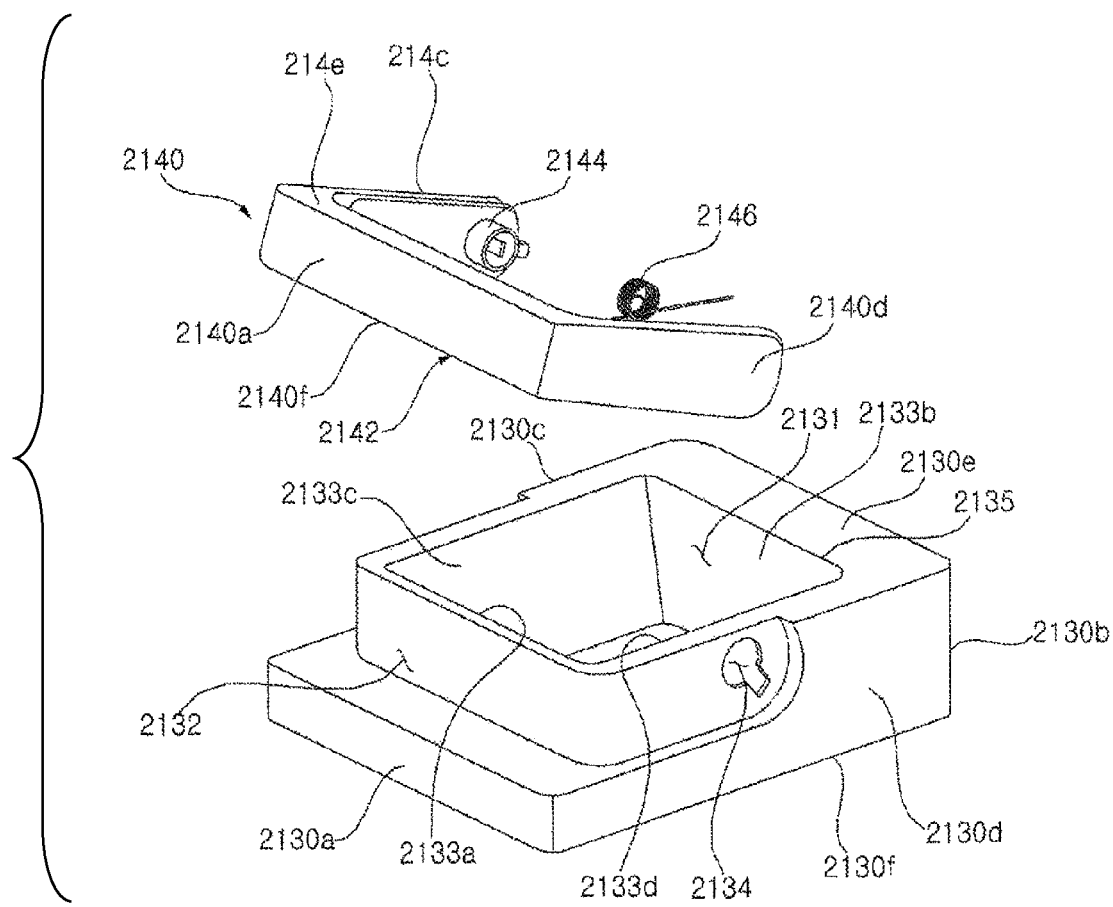

[FIG. 18]
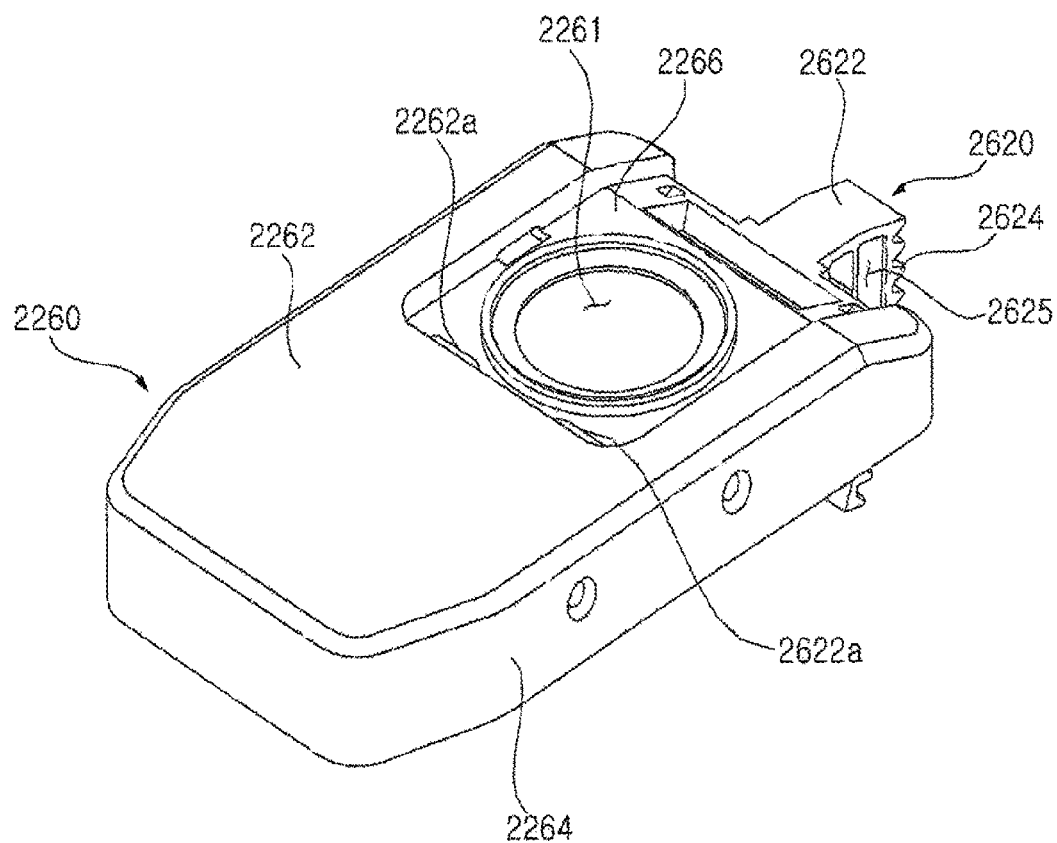

[FIG. 19]
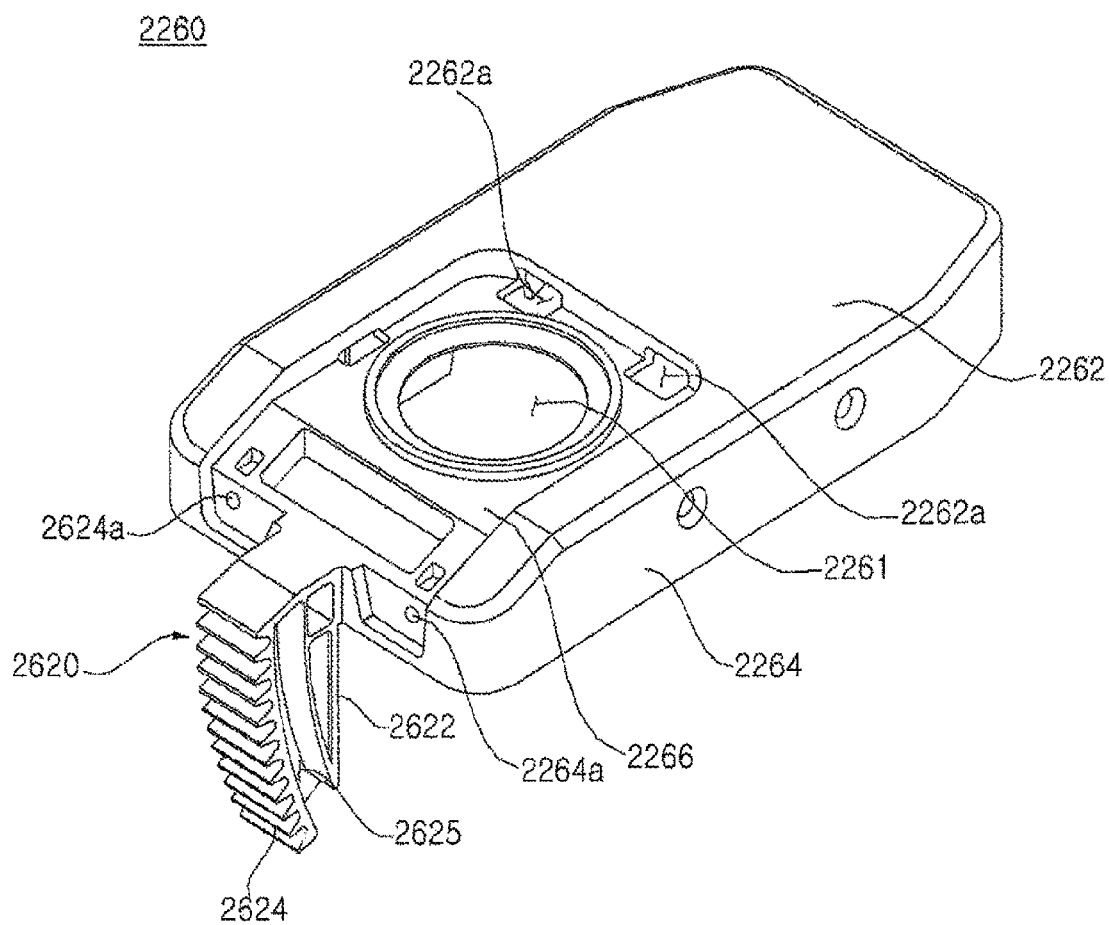

[FIG. 20]
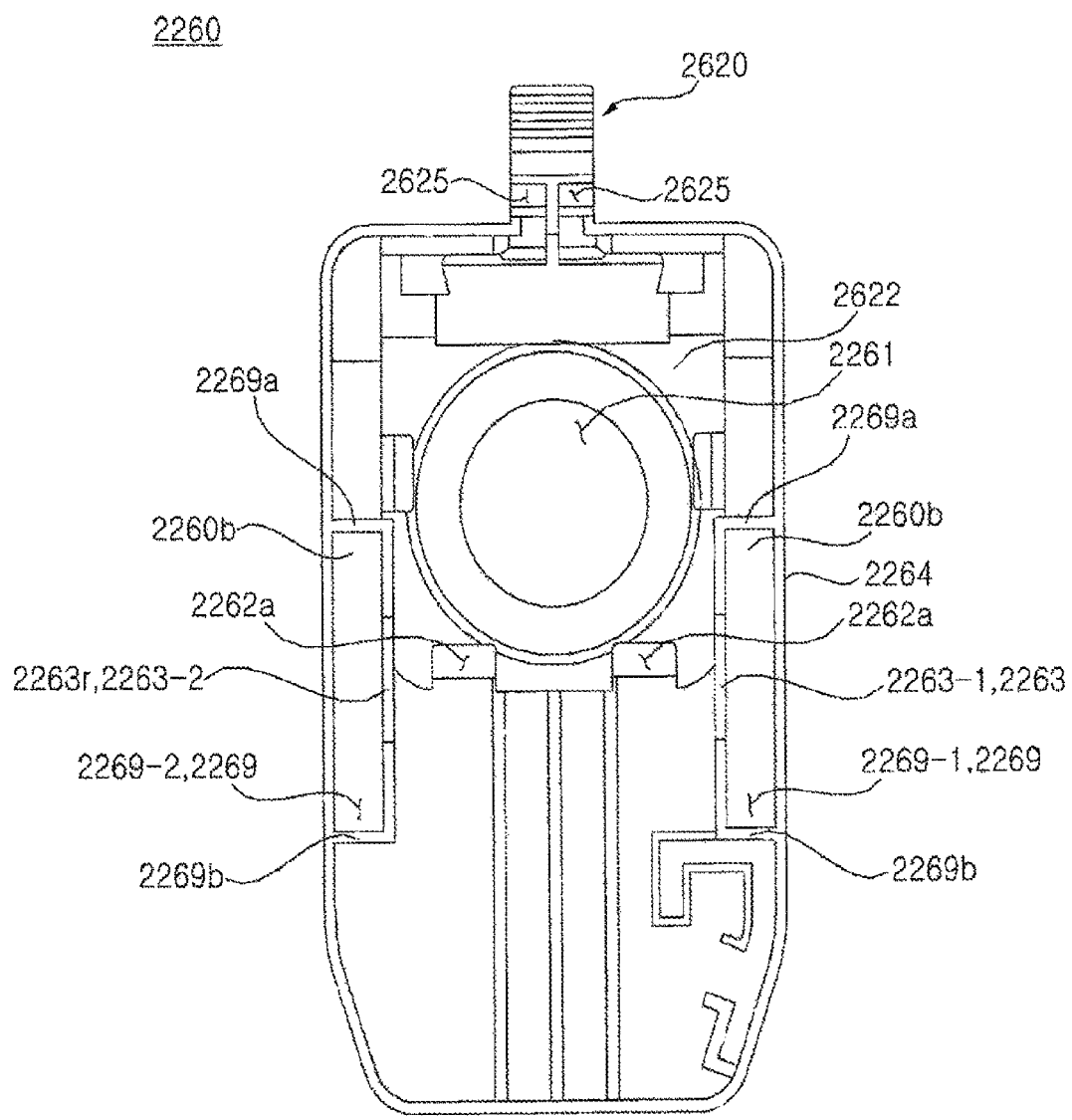

[FIG. 21]
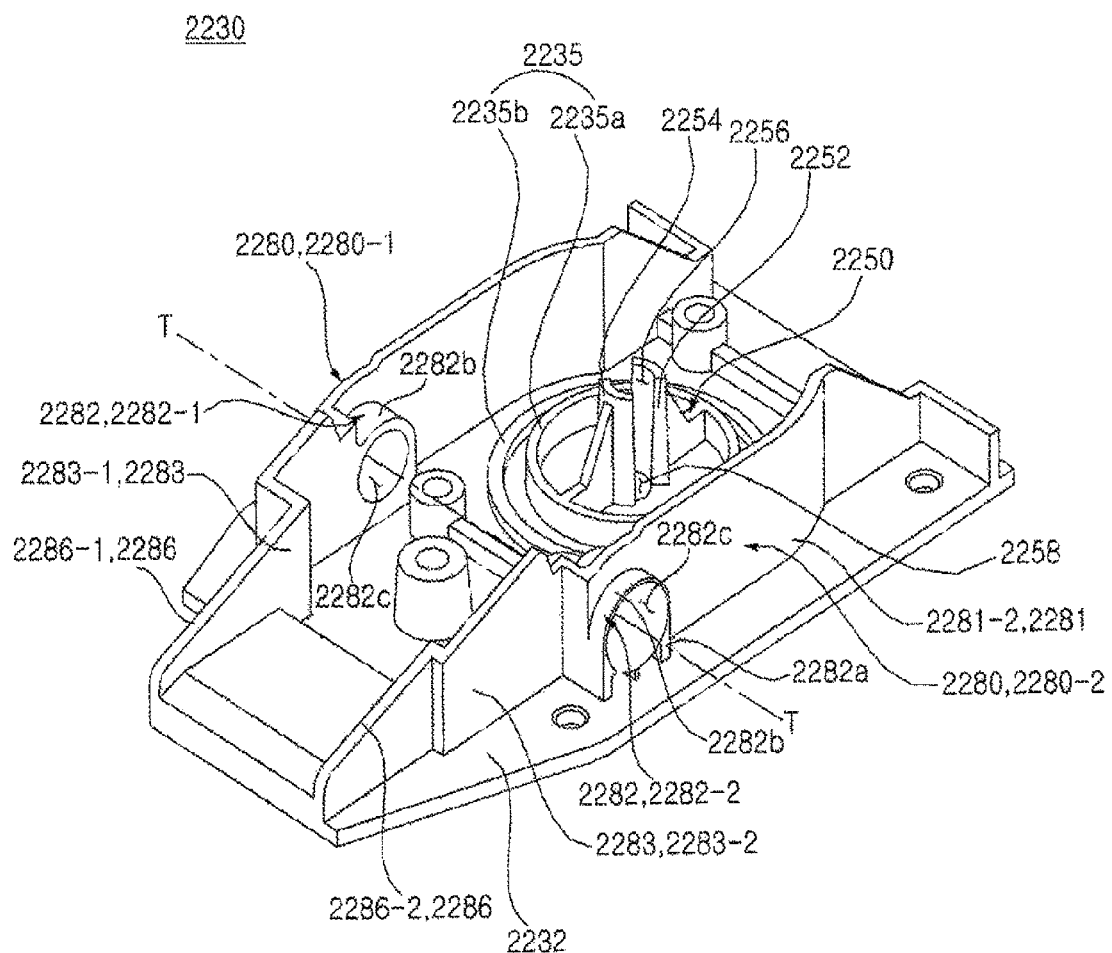

[FIG. 22]
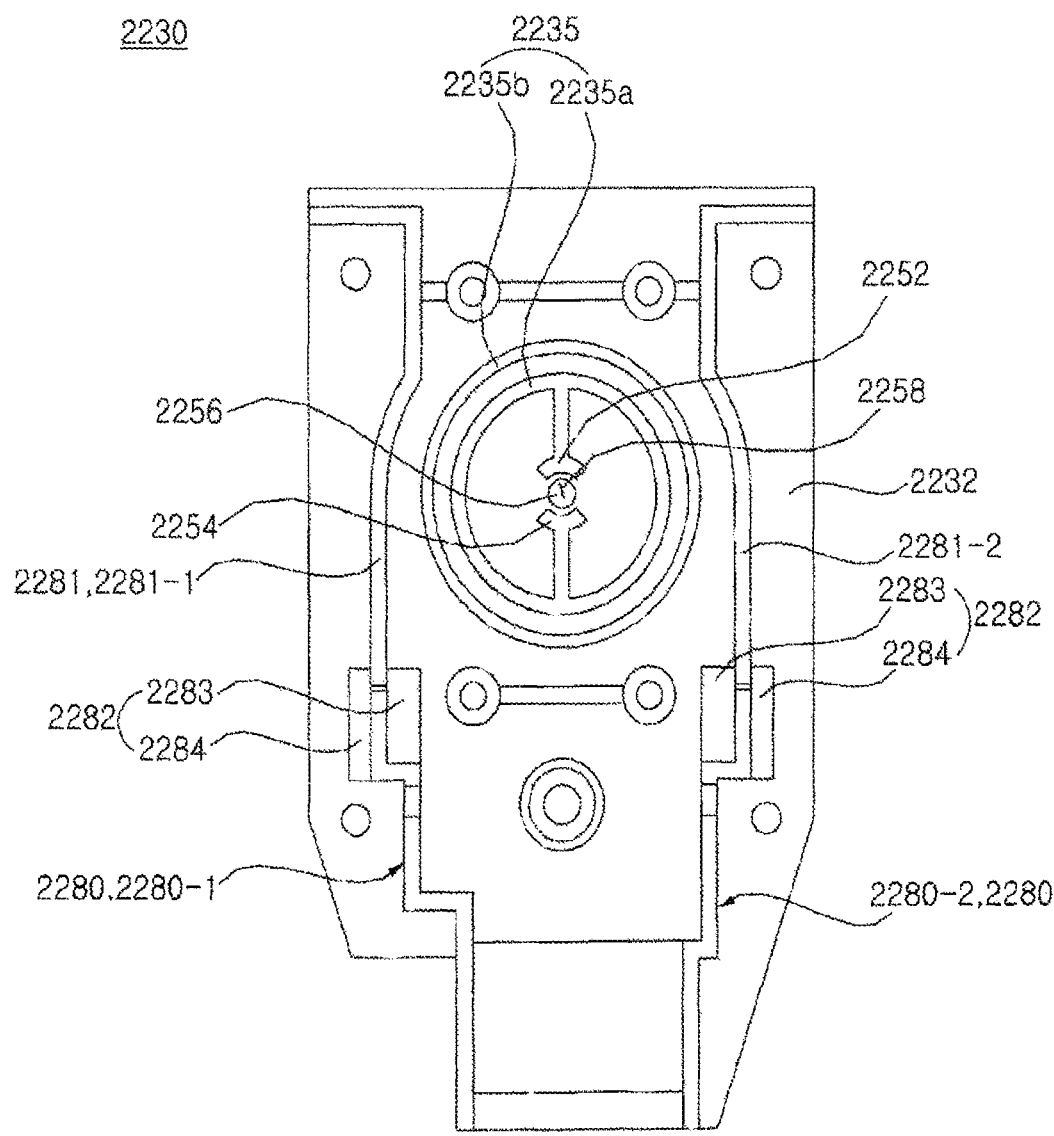

[FIG. 23]
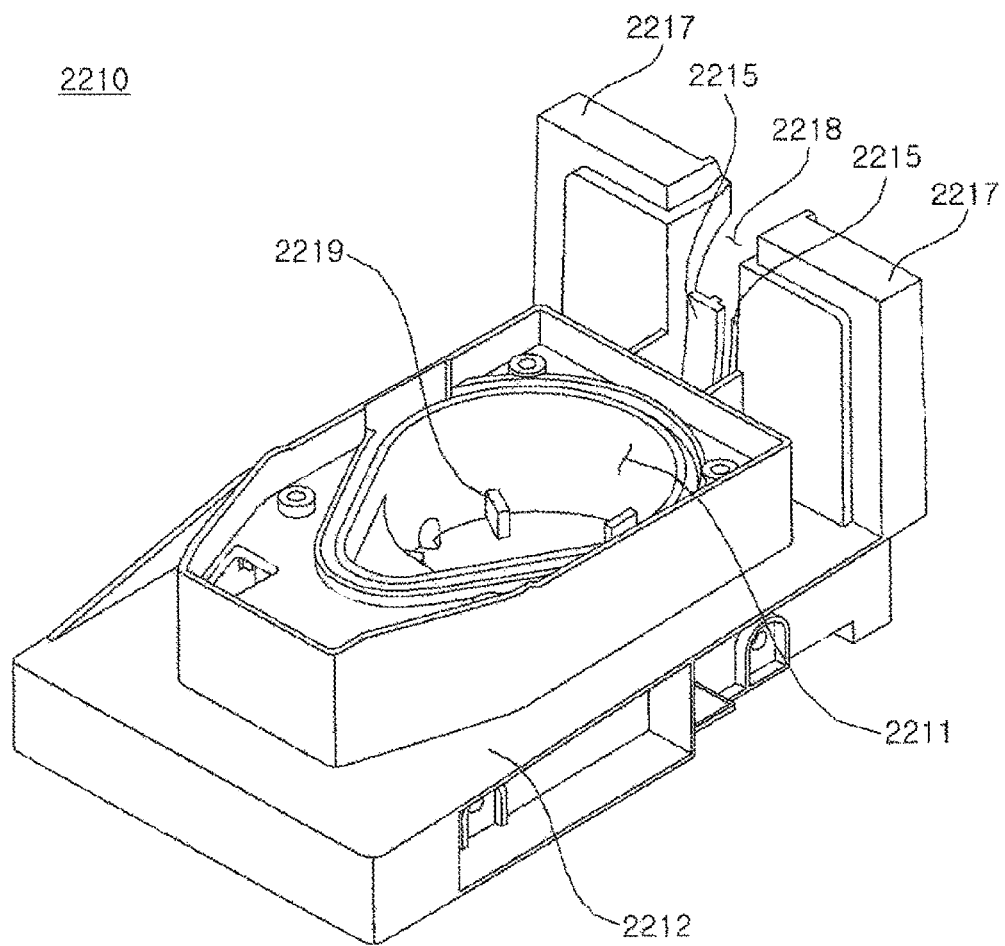

[FIG. 24]
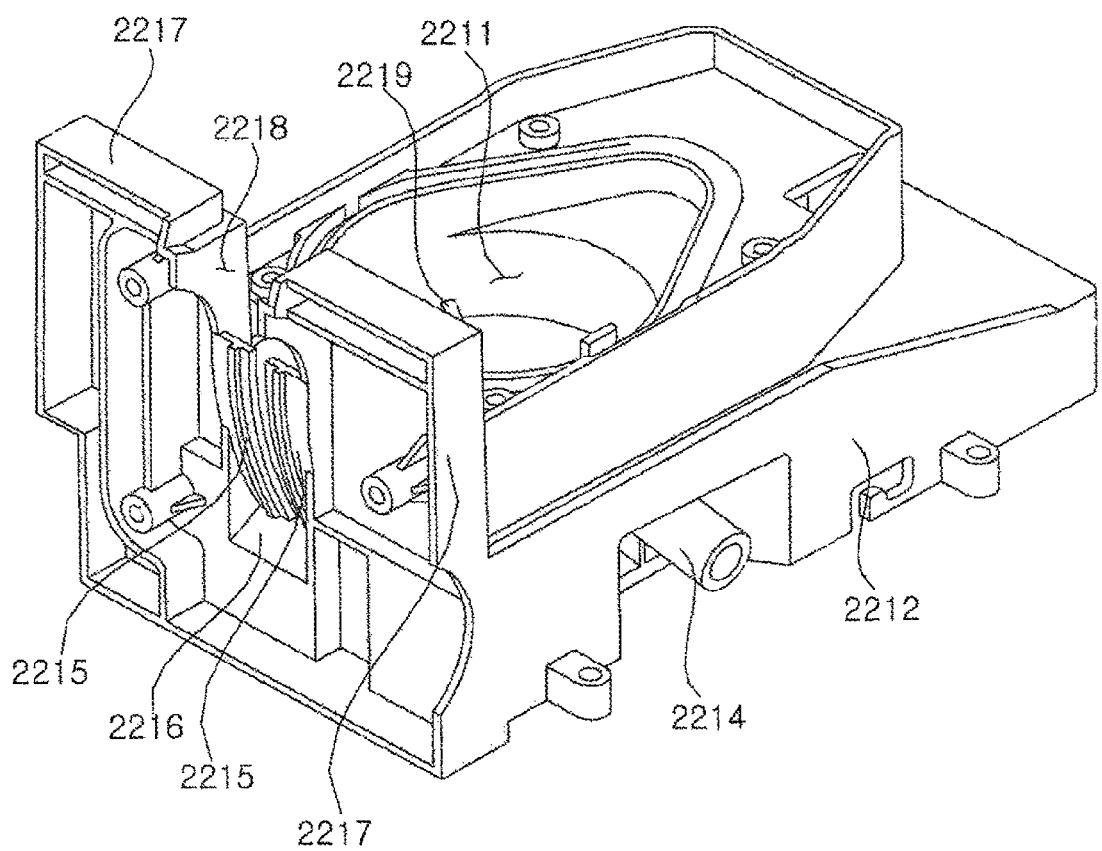

[FIG. 25]
2210
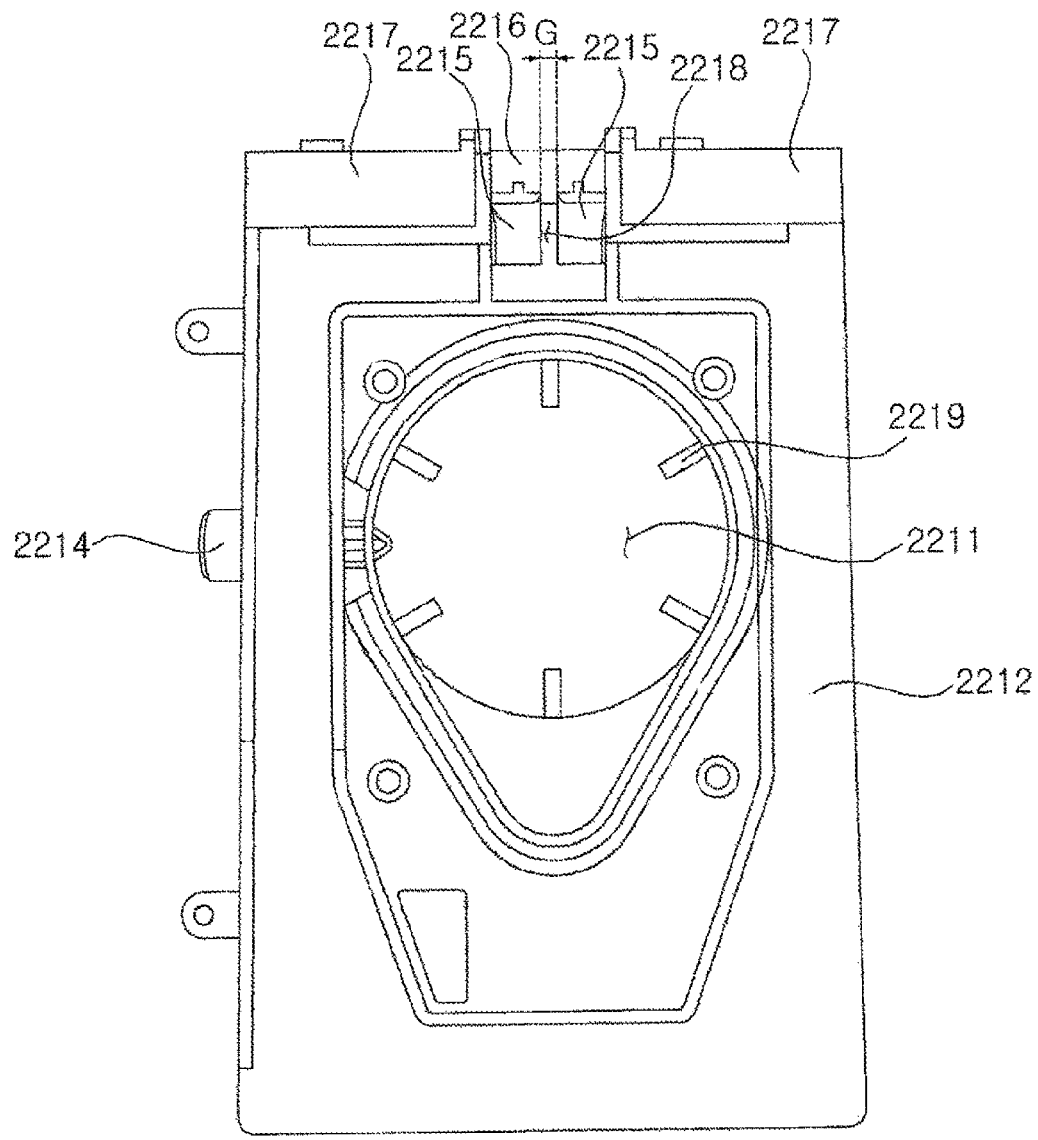

[FIG. 26]
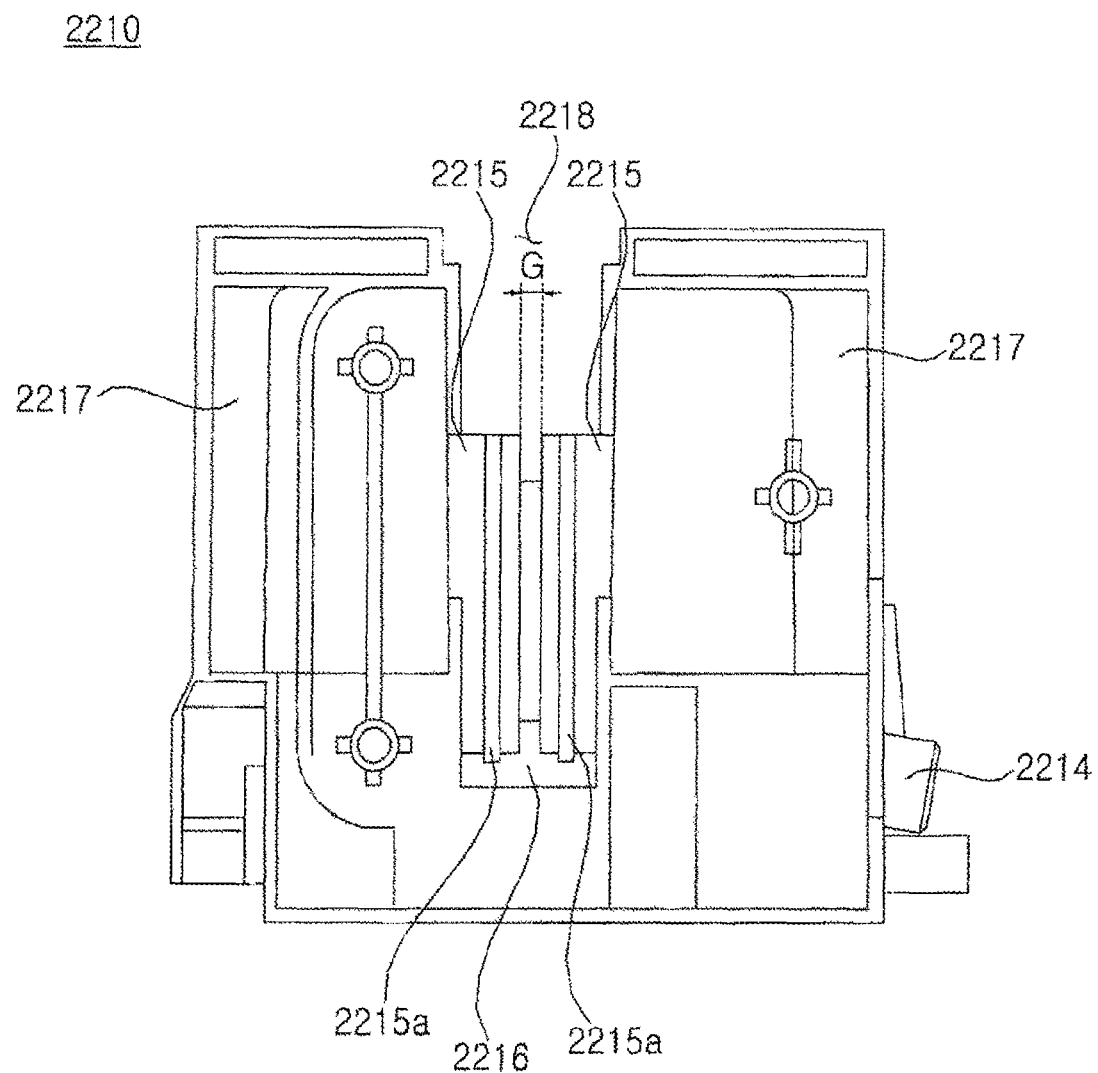

[FIG. 27]
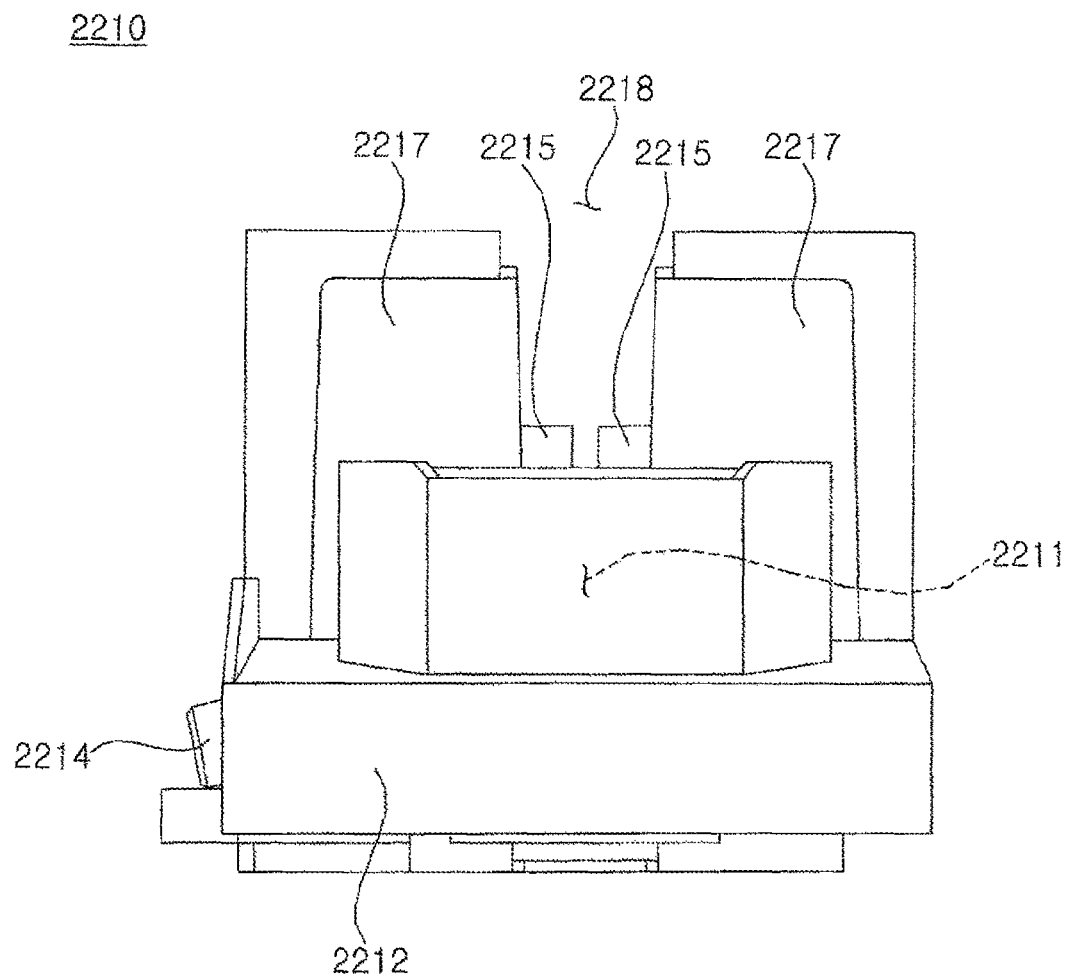

[FIG. 28]
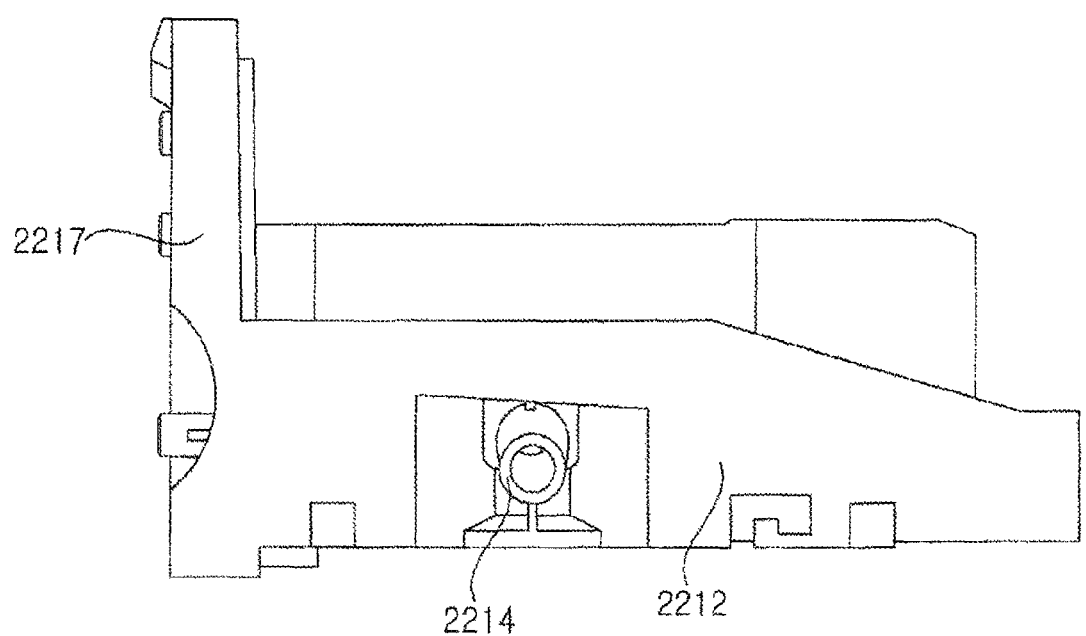

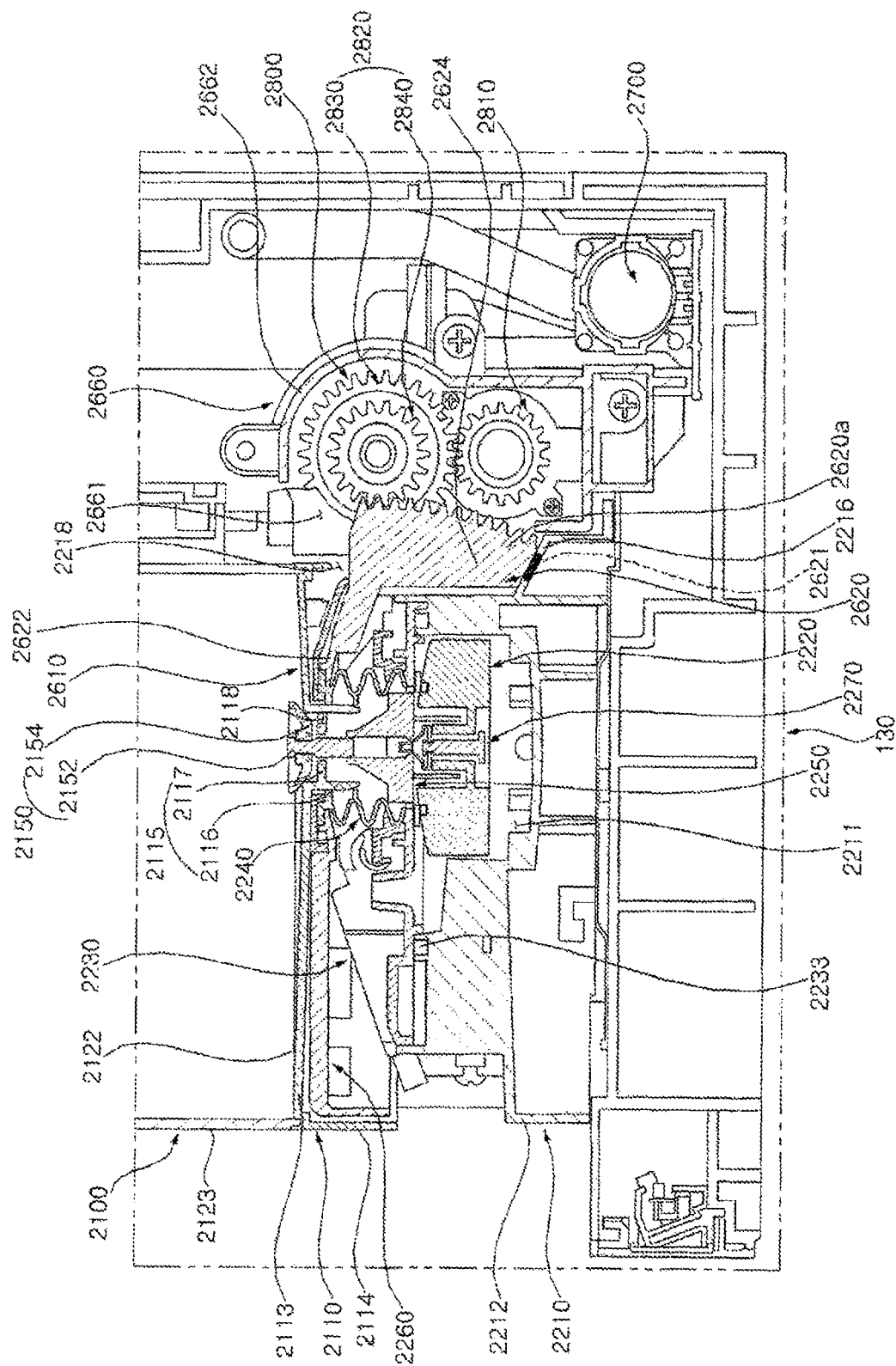
[FIG. 29]

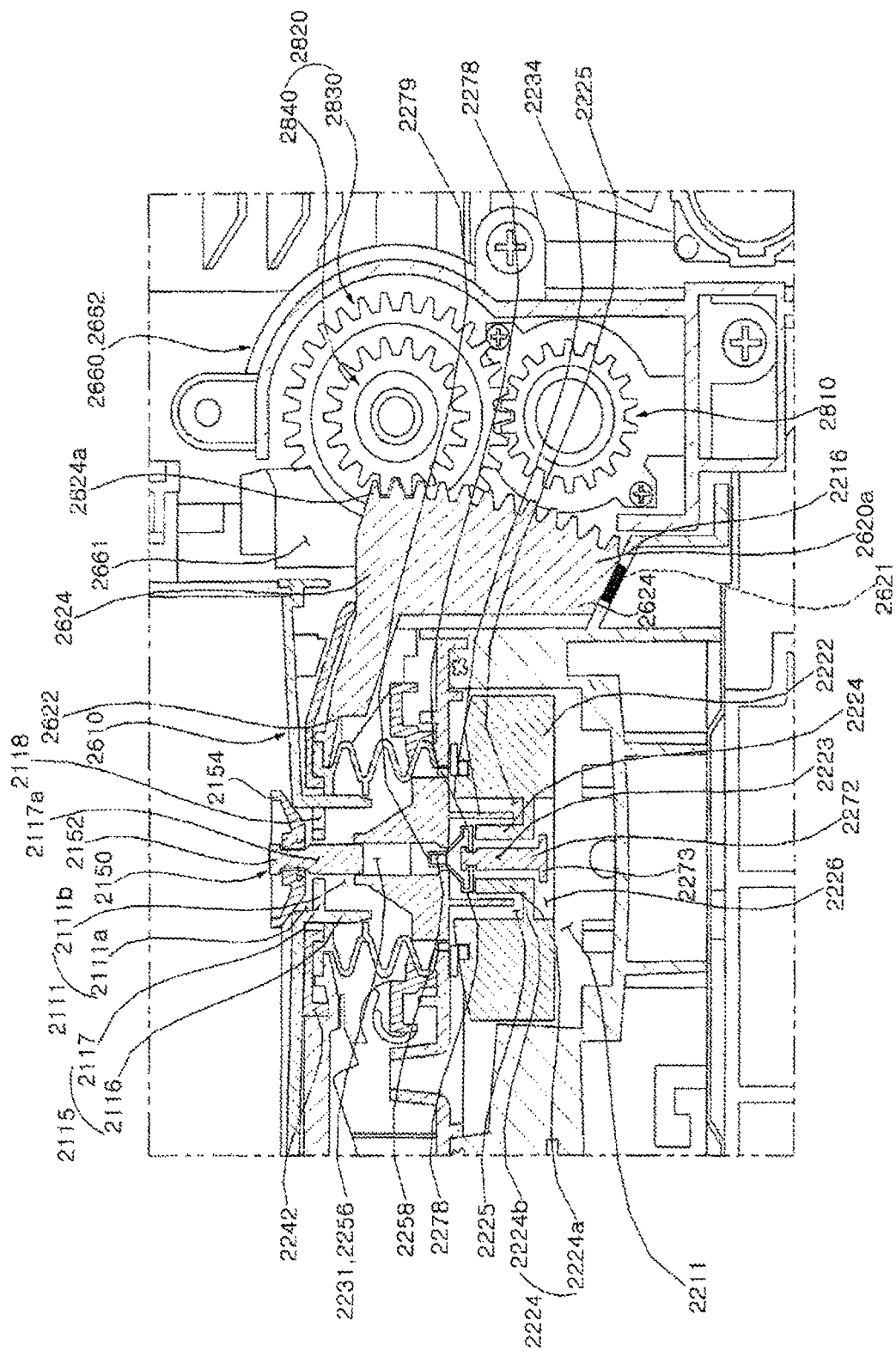
[FIG. 30]

[FIG. 31]
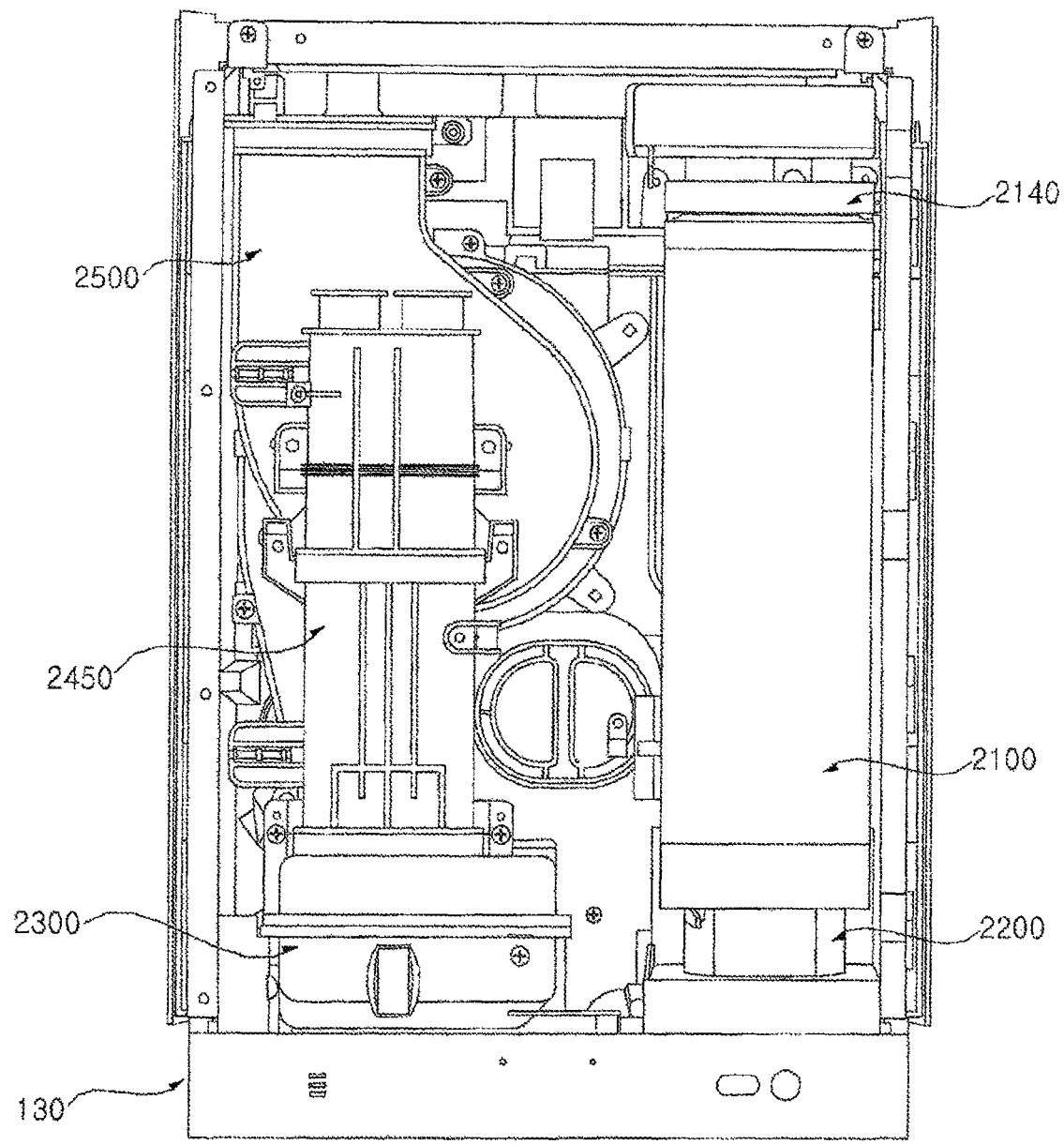

[FIG. 32]
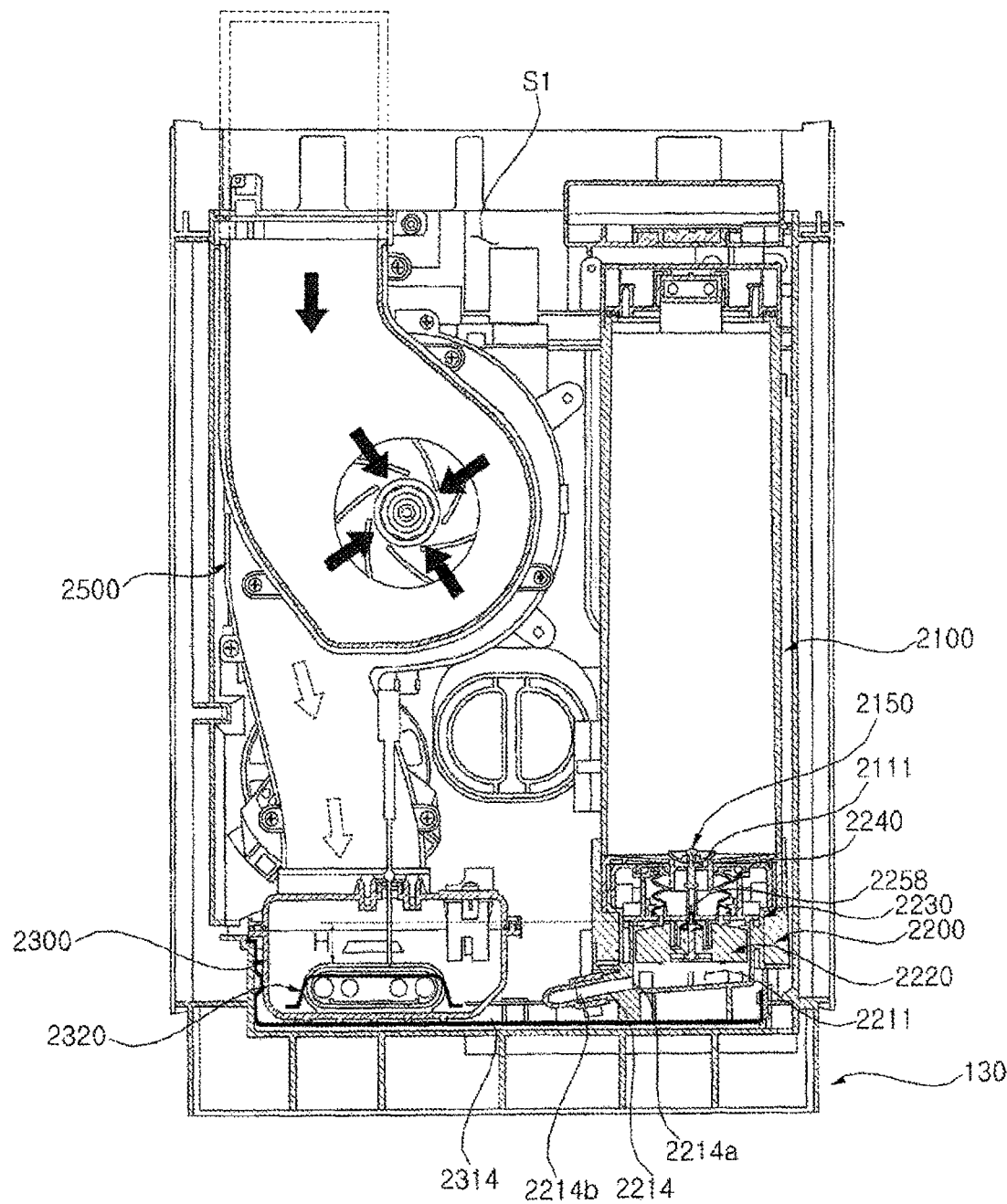

[FIG. 33]
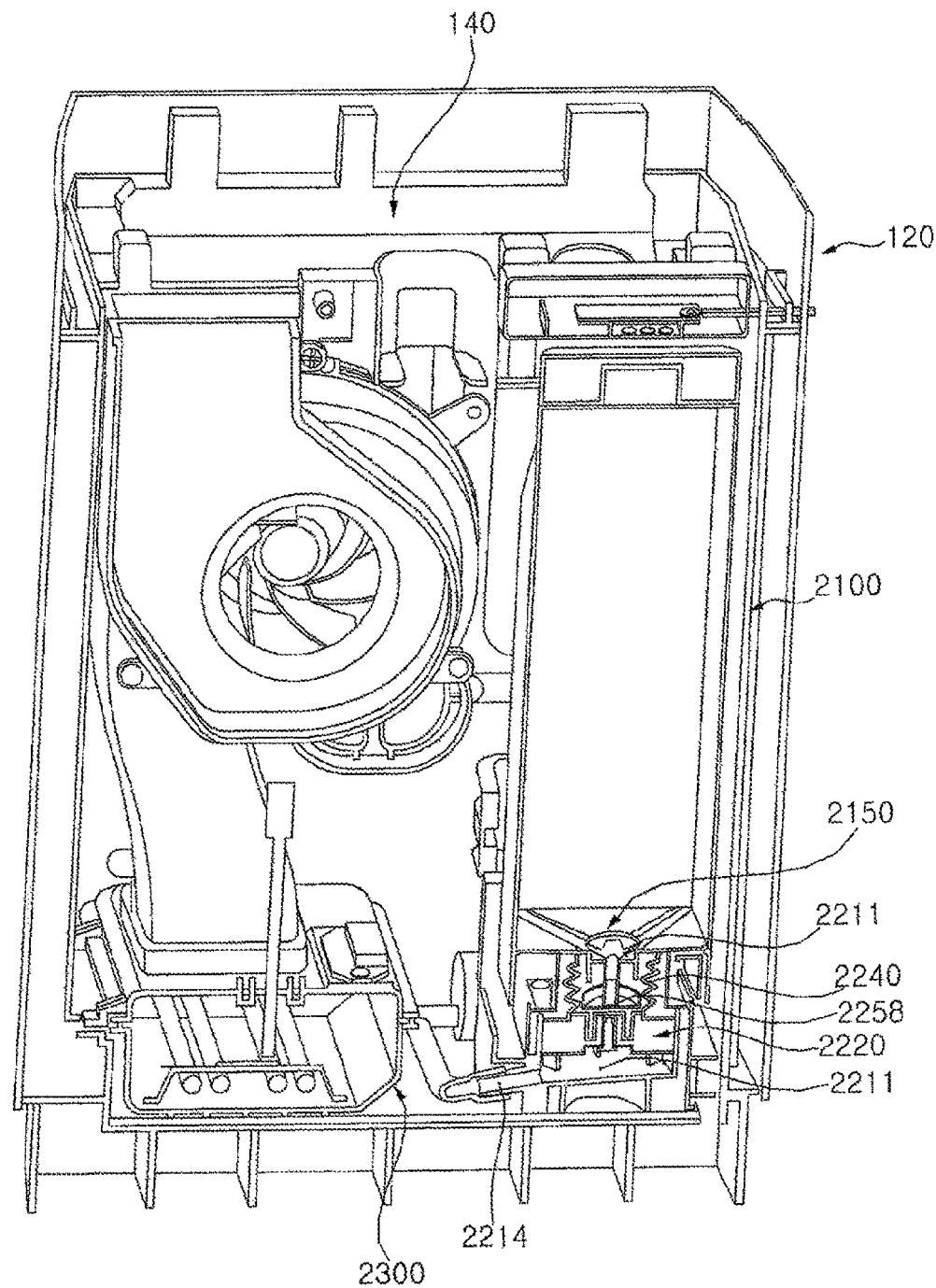

[FIG. 34]
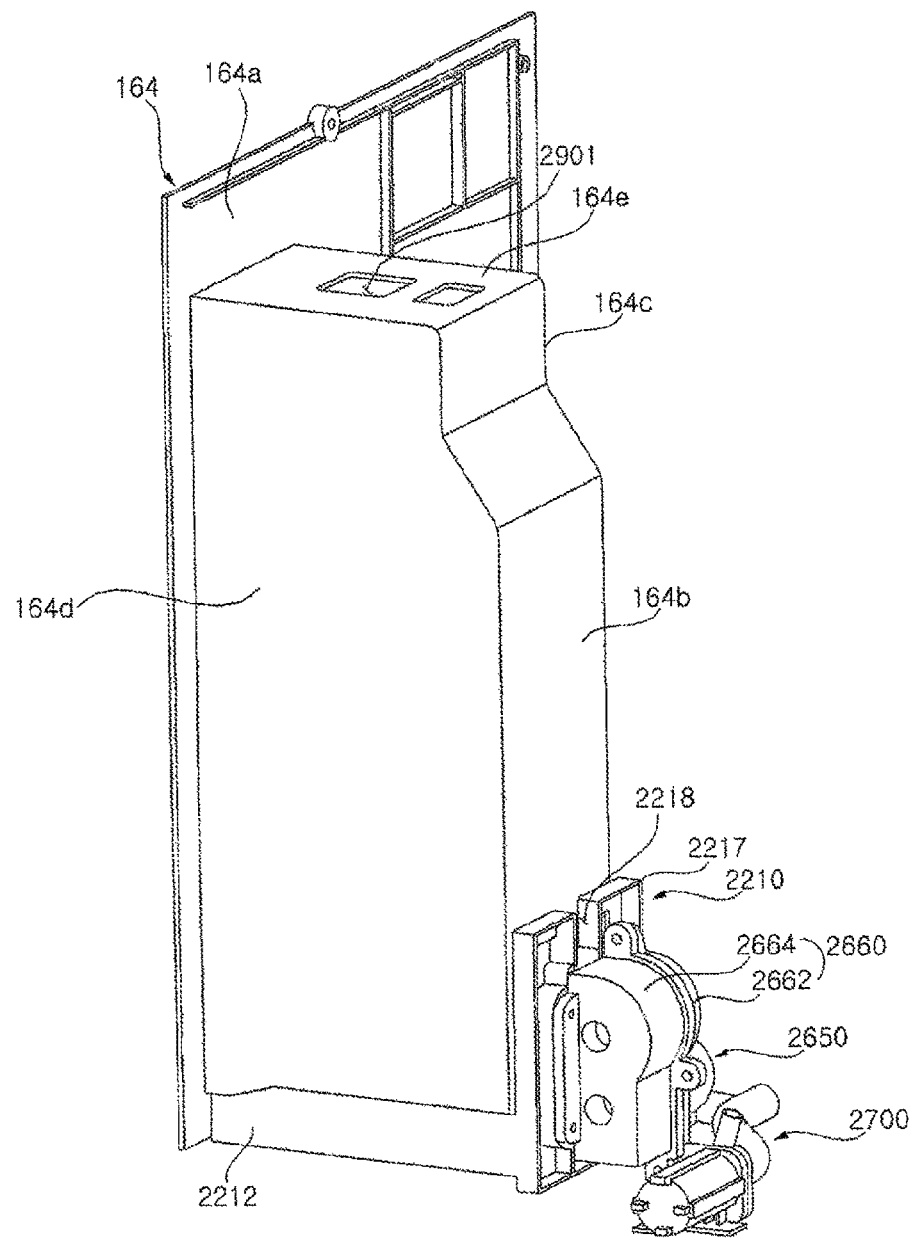

[FIG. 35]
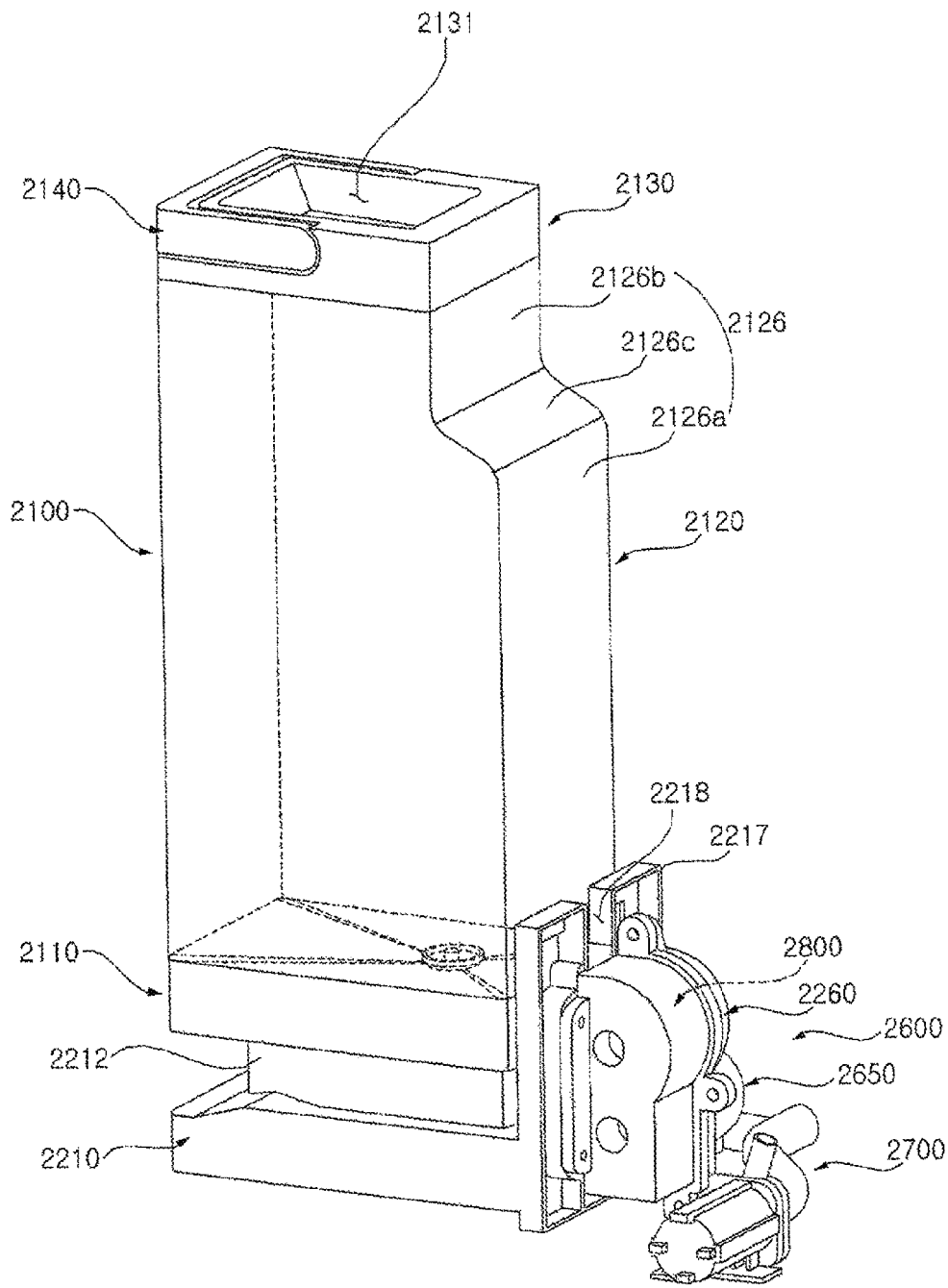

[FIG. 36]
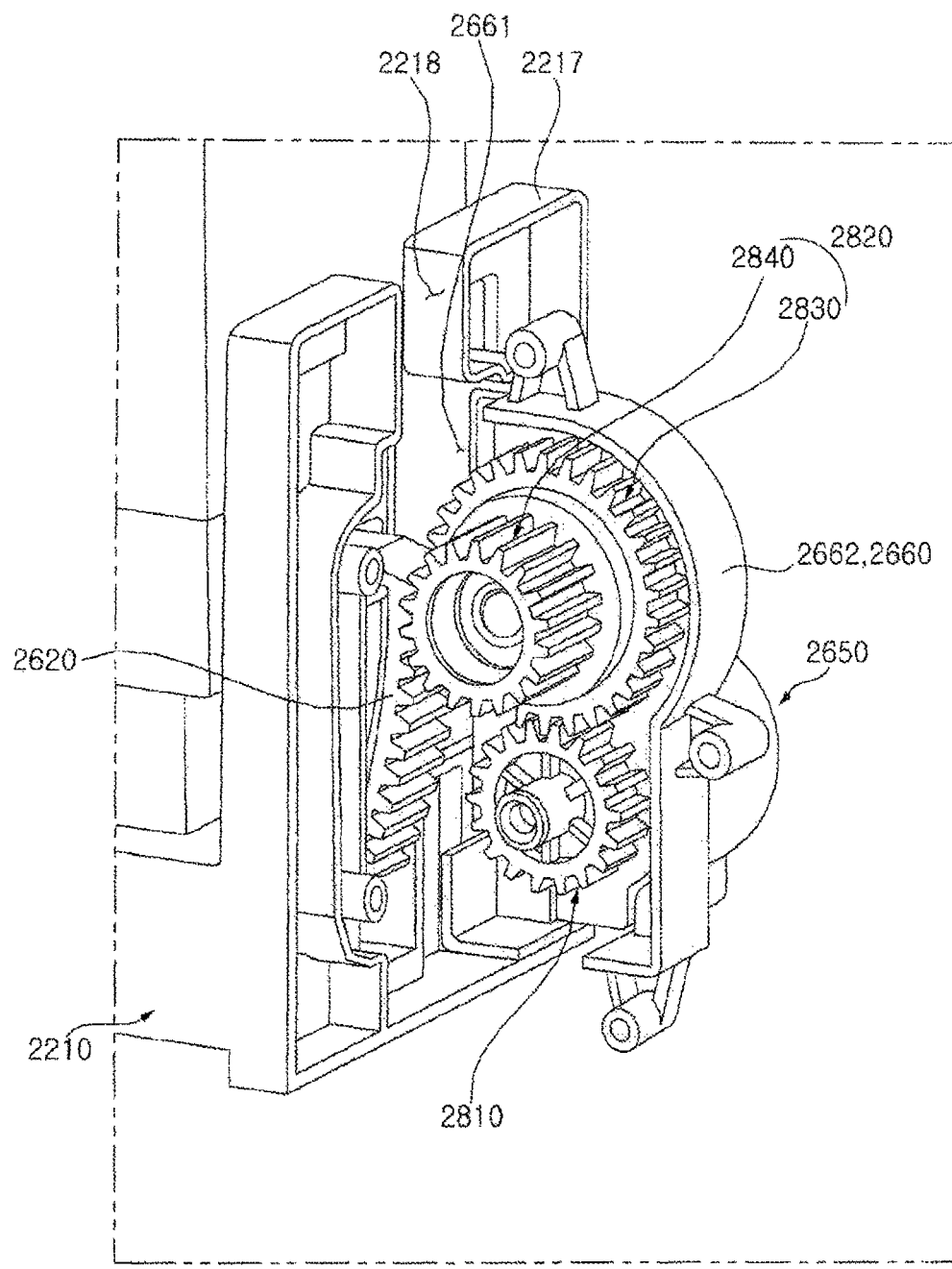

[FIG. 37]
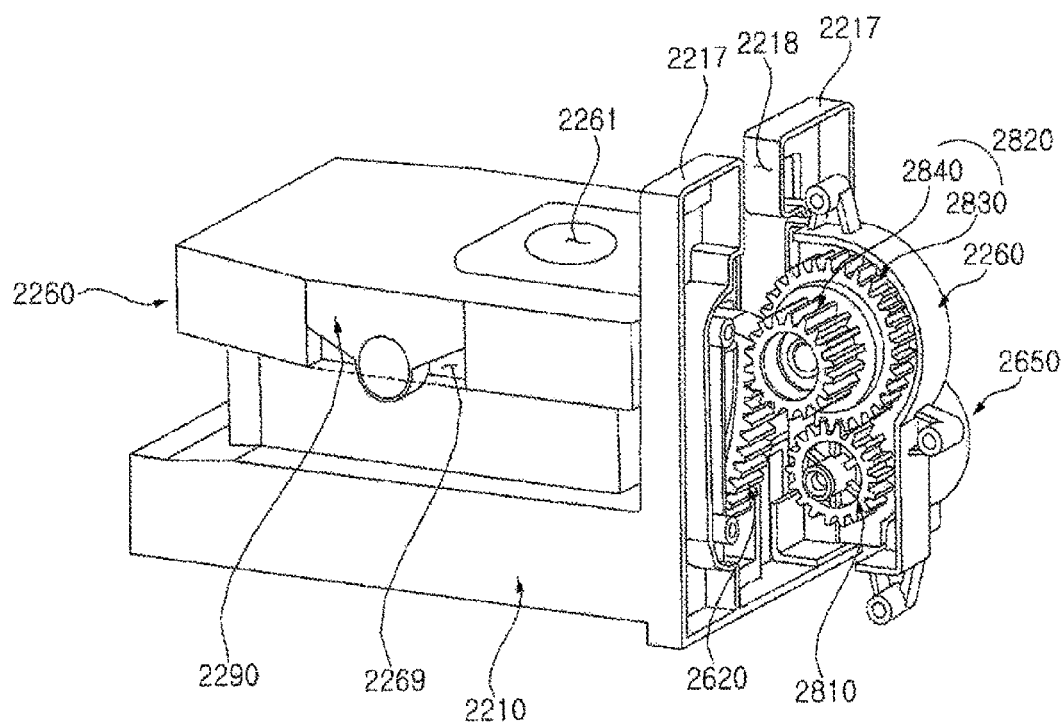

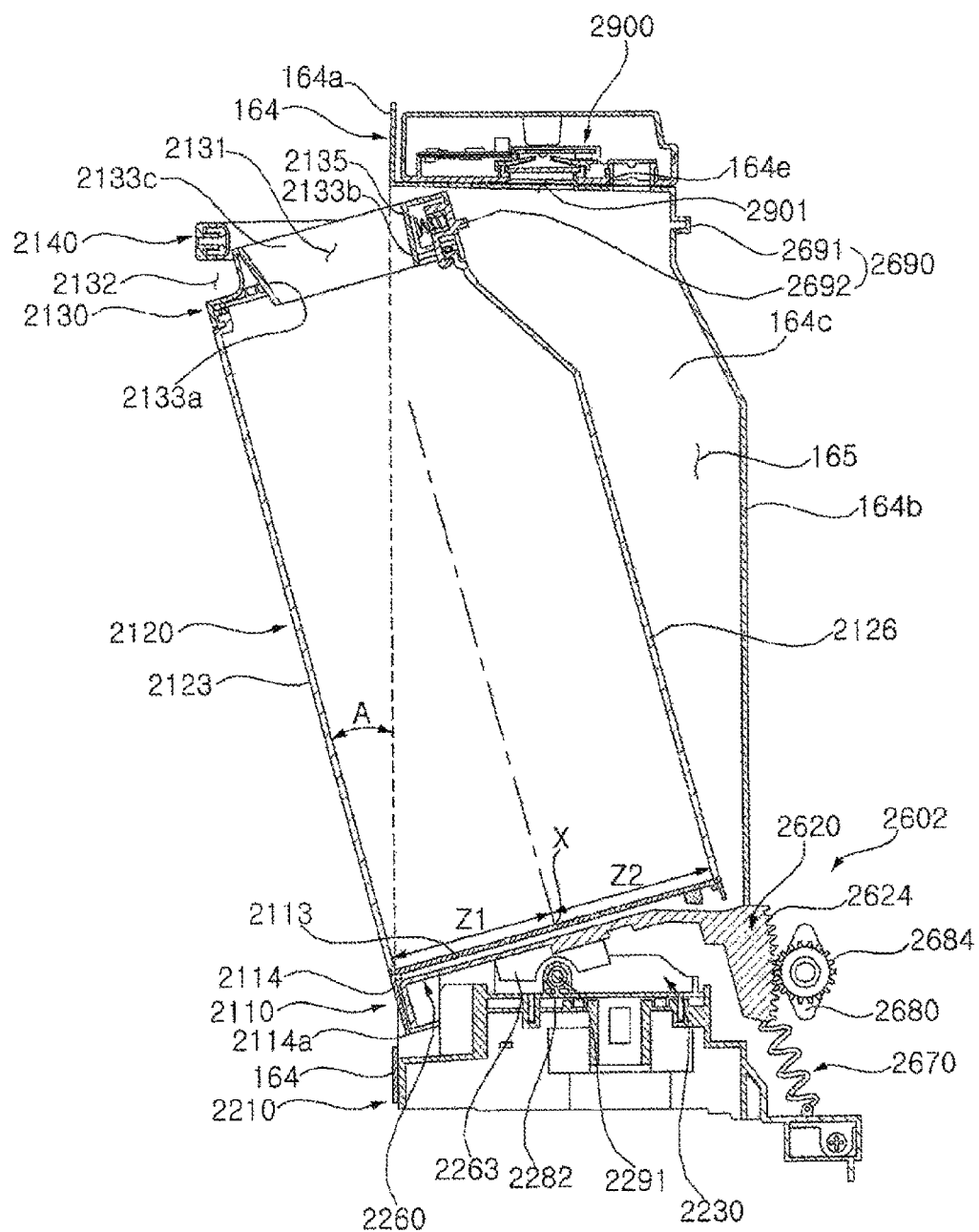
[FIG. 38]

INDOOR UNIT FOR AN AIR CONDITIONER

CROSS REFERENCE TO RELATED APPLICATIONS

This application is a National Stage Application of International Application No. PCT/KR2019/003023 filed on Mar. 15, 2019, which claims the benefits of Korean Patent Application No. 10-2018-0030777 filed on Mar. 16, 2018 and Korean Patent Application No. 10-2019-0024963 filed on Mar. 4, 2019, all of which are hereby incorporated by reference in their entirety for all purposes as if fully set forth herein.

TECHNICAL FIELD

The present disclosure relates to an indoor unit for an air conditioner, and more particularly, to an indoor unit for an air conditioner, capable of tilting a water tank disposed at a cabinet assembly.

BACKGROUND

For split air conditioners, an indoor unit is disposed in an indoor space, and an outdoor unit is disposed in an outdoor space. Air in the indoor space can be cooled, heated or dehumidified, using refrigerants circulating in the indoor unit and the outdoor unit.

The indoor unit of the split air conditioner can be classified as a standing indoor unit that stands on the floor, a wall-mounted indoor unit that is mounted on the wall in an indoor space, a ceiling-mounted indoor unit that is installed on the ceiling in an indoor space and the like, based on methods for installation.

A standing indoor unit of the related art can dehumidify air in an indoor space in a cooling mode, but cannot humidify air in an indoor space in a heating mode. A standing air conditioner provided with a humidification apparatus capable of performing humidification functions is described in Korean Patent Publication No. 10-2013-0109738 (referred to as prior art document 1).

The standing indoor unit according to the prior art document 1 is provided with a humidification apparatus in a main body forming an exterior of the indoor unit. The humidification apparatus according to the prior art document 1 has a structure in which water of a drain pan is stored in a water tank, the stored water is used to wet an absorption member, and the absorption member evaporates the absorbed water naturally.

The humidification apparatus according to the prior art document 1 uses condensate flowing from a heat exchanger, instead of clean water. Accordingly, water in the water tank can contain a large amount of foreign substances separated from a surface of the heat exchanger, and the foreign substances can be a breeding ground for fungi or germs.

In the humidification apparatus according to the prior art document 1, the water tank is disposed in the main body. Accordingly, the main body has to be detached to dismount the water tank.

SUMMARY

The present disclosure is directed to an indoor unit for an air conditioner, which may perform a humidification function, and onto which a water tank may be easily mounted or from which the water tank may be easily detached.

The present disclosure is directed to an indoor unit for an air conditioner, where a water tank may tilt towards a user when a door assembly is opened.

The present disclosure is directed to an indoor unit for an air conditioner, which may automatically separate a water tank and a water supply assembly when the water tank tilts.

The present disclosure is directed to an indoor unit for an air conditioner, which may automatically block water from being supplied to a water supply assembly when the water tank tilts.

The present disclosure is directed to an indoor unit for an air conditioner, which may automatically deploy a handle of a water tank towards a user when the water tank tilts.

The present disclosure is directed to an indoor unit for an air conditioner, which may prevent a water tank from falling forward when the water tank tilts.

The present disclosure is directed to an indoor unit for an air conditioner, which may automatically return a water tank to an initial position thereof when the water tank is mounted to the indoor unit.

Objectives are not limited to the above-described ones, and other objectives that have not been mentioned can be clearly understood by one having ordinary skill in the art to which the present disclosure pertains from the following descriptions.

Technical Solutions

According to the present disclosure, a water tank may tilt in a forward direction where a user is positioned, through a tilting assembly, thereby enabling the user to easily mount the water tank onto an indoor unit or to easily detach the water tank from the indoor unit.

According to the present disclosure, the tilting assembly may automatically operate when a door assembly opens, thereby making it possible to tilt the water tank towards the user.

According to the present disclosure, the tilting assembly may tilt the water tank forward, and a water supply valve of the water tank may be spaced apart from a valve supporter of a water supply assembly, thereby making it possible to prevent water from being discharged from the water tank at the time of tilting of the water tank.

According to the present disclosure, a center of gravity of the water tank may be placed further rearward than a lower cover when the water tank tilts, thereby making it possible to prevent the water tank from falling forward.

According to the present disclosure, the indoor unit for an air conditioner may include: a cabinet assembly including a base; a water tank disposed at an upper side of the base; a tiling journal disposed between the base and the water tank, configured to support the water tank, and when the water tank tilts, configured to provide a tilt axis of the water tank; a supply tilt cover at which the water tank is detachably held, which supports a lower side of the water tank, and which is supported by the tilting journal; a tilt move gear configured to support the supply tilt cover and to move a rear of the supply tilt cover in an up-down direction; a tilt drive gear assembly engaged with the tilt move gear, configured to supply a driving force to the tilt move gear and configured to move the tilt move gear in the up-down direction; and a tilt motor configured to supply a driving force to the tilt drive gear assembly. On the basis of operation of the tilt drive gear assembly, the tilt move gear may move in the up-down direction, and on the basis of the up-down movement of the tilt move gear, the water tank may tilt in a front-rear direction with respect to the tilting journal.

When the water tank tilts, water may be supplied from a top of the water tank through an upper body opening formed at an upper portion of the water tank. When the water tank tilts, a handle of the water tank may be automatically deployed towards the user by an elastic force of a handle elastic member.

The indoor unit may further include a supply support body disposed at the upper side of the base, the tilting journal may be disposed at the supply support body, and the supply tilt cover may be disposed at an upper side of the supply support body. The supply tilt cover may tilt in the front-rear direction with respect to the tilting journal in a state of being supported by the tilting journal.

When viewed laterally, the tilting journal may be disposed at a lower side of a center of gravity of the water tank, thereby making it possible to minimize generation of eccentricity even when the water tank tilts.

The indoor unit may further include a tilt part protruding downward from a lower surface of the supply tilt cover and supported by the tilting journal. The tilting journal may protrude upward from an upper surface of the supply support body, and the tilt part may be provided with a groove into which the tilting journal is inserted, thereby making it possible to minimize friction between the tilt part and the tilting journal.

An upper surface of the tilting journal may have a curved shape, and the tilt part may have an arc shape into which the tilting journal is inserted, thereby making it possible to minimize friction between the tilt part and the tilting journal.

The tilting journal may include: a first tilting journal disposed on a left side of the supply support body and configured to support a lower end on a left side of the supply tilt cover; and a second tilting journal disposed on a right side of the supply support body and configured to support a lower end on a right side of the supply tilt cover. The tilt axis of the water tank may be formed on an extension line connecting the first tilting journal and the second tilting journal, thereby making it possible to minimize eccentricity or moment that is generated when the water tank tilts.

A direction in which the first tilting journal and the second tilting journal are disposed may be orthogonal to a direction in which the water tank tilts.

The indoor unit may further include an extra supporter rotatably assembled to the supply support body and configured to support a lower surface of the supply tilt cover. The extra supporter may include: a first extra supporter rotatably assembled to the first tilting journal and configured to support the lower surface of the supply tilt cover; and a second extra supporter rotatably assembled to the second tilting journal and configured to support the lower surface of the supply tilt cover. The first extra supporter and the second extra supporter may effectively distribute a load of the water tank, applied to the tilting journal.

The first tilting journal may be provided therein with a first hollow hole, and the second tilting journal may be provided therein with a second hollow hole, and the first hollow hole and the second hollow hole may be disposed in a left-right direction. The first extra supporter may be rotatably assembled to the first hollow hole and the second extra supporter may be rotatably assembled to the second hollow, thereby making it possible to minimize friction of the first extra supporter and the second extra supporter and to effectively distribute a load applied to the first extra supporter and the second extra supporter.

The tilt move gear and the supply tilt cover may be integrated, the tilt move gear may protrude further rearward than a back surface of the water tank, and the tilt drive gear assembly may be disposed at a rear of the tilt move gear, thereby making it possible to minimize a driving force required for pushing up a rear end of the water tank and to ensuring a space required for the tilt move gear to operate.

The tilt move gear may be formed into an arc shape, and a center of curvature of the tilt move gear may be disposed to face the tilting journal, thereby making it possible to uniformly maintain a distance between the tilt move gear and the tilt drive gear assembly even when the tilt move gear moves.

A lower end of the tilt move gear may protrude further downward than the supply support body, and a portion, where the tilt move gear and the tilt drive gear assembly are engaged, may be disposed at a height the same as or lower than the tilting journal, thereby making it possible to support a load of the water tank stably when the water tank tilts.

When seen from a front, the tilt move gear may be disposed between the first tilting journal and the second tilting journal, thereby making it possible to minimize generation of eccentricity or moment on a left or a right of the water tank.

The indoor unit may further include a tilt guide disposed at a structure at the base side and configured to guide a direction of movement of the tilt move gear. The tilt guide may be inserted into a tilt guide groove, and when the water tank tilts, the tilt guide groove may move along the tilt guide, thereby making it possible to maintain engagement between the tilt move gear and the tilt drive gear assembly even when an external force is applied to the tilt move gear.

The tilt guide groove and the tilt guide may be formed into an arc shape, and a center of curvature of the tilt guide groove and the tilt guide may be disposed to face the tilting journal, thereby making it possible to minimize interference between the tilt move gear and the tilt drive gear assembly when the tilt move gear moves.

The indoor unit may further include a tilt move gear supporter disposed at a structure at the base side and configured to support the lower end of the tilt move gear, thereby making it possible to prevent the tilt move gear from excessively moving downward and to maintain the engagement of the tilt move gear and the tilt drive gear assembly.

The indoor unit may include: a supply chamber housing disposed at the base, disposed at a lower side of the supply support body and configured to support the supply support body; a supply chamber disposed inside the supply chamber housing and configured to store water; a valve insertion hole which is disposed at an upper portion of the supply chamber, which is configured to pass through the supply tilt cover in the up-down direction and through which water discharged from the water tank passes; and a middle hole disposed between the valve insertion hole and the supply chamber, configured to pass through the supply support body in the up-down direction and allowing water, supplied through the valve insertion hole, to flow to the supply chamber. The water discharged from the water tank may be stored in the supply chamber through the valve insertion hole and the middle hole. The supply support body and the supply tilt cover for a tilt of the water tank may also be used as a component of a water supply assembly for supplying water to a steam generator.

The indoor unit may further include a water bellows which is disposed between the supply tilt cover and the supply support body, an upper end of which is fixed to the supply tilt cover and a lower end of which is fixed to the supply support body. The valve insertion hole may be disposed at an upper side of the water bellows, and the middle hole may be disposed at a lower side of the water bellows. The water bellows may be made of an elastic material and may be provided therein with a supply flow channel configured to guide water, supplied through the valve insertion hole, to the middle hole. When the supply tilt cover tilts, the water bellows may keep itself coupled to the supply tilt cover and the supply support body, thereby making it possible to prevent water from leaking out of the supply flow channel.

Advantageous Effects

An indoor unit for an air conditioner according to the present disclosure has one or more advantages that are described hereunder.

A water tank may tilt in a forward direction where a user is positioned, through a tilting assembly, thereby enabling the user to easily mount the water tank onto the indoor unit or dismount the water tank from the indoor unit.

When a door assembly opens, the tilting assembly may automatically operate, thereby making it possible to tilt the water tank towards the user.

The tilting assembly may tilt the water tank forward and a water supply valve of the water tank may be spaced apart from a valve supporter of a water supply assembly, thereby making it possible to prevent water from being discharged from the water tank at the time of a tilt of the water tank.

When the water tank tilts, a center of gravity of the water tank may be disposed further rearward than a lower cover, thereby making it possible to prevent the water tank from falling forward.

On the basis of operation of a tilt drive gear assembly, a tilt move gear may move in an up-down direction, and on the basis of the up-down movement of the tilt move gear, the water tank may tilt in a front-rear direction with respect to a tilting journal, thereby enabling the water tank to be detachably installed and to tilt.

When the water tank tilts, water may be supplied from a top of the water tank through an upper body opening formed at an upper portion of the water tank.

When the water tank tilts, a handle of the water tank may be automatically deployed towards the user by an elastic force of a handle elastic member.

A supply tilt cover may tilt in the front-rear direction with respect to the tilting journal in a state of being supported by the tilting journal.

When viewed laterally, the tilting journal may be disposed at a lower side of a center of gravity of the water tank, thereby making it possible to minimize generation of eccentricity even when the water tank tilts.

The tilting journal may protrude upward from an upper surface of a supply support body, and a tilt part may be provided with a groove into which the tilting journal is inserted, thereby making it possible to minimize friction between the tilt part and the tilting journal.

An upper surface of the tilting journal may have a curved shape, and the tilt part may have an arc shape into which the tilting journal is inserted, thereby making it possible to minimize friction between the tilt part and the tilting journal.

A tilt axis of the water tank may be formed on an extension line connecting a first tilting journal and a second tilting journal, thereby making it possible to minimize eccentricity or moment that is generated when the water tank tilts.

A first extra supporter and a second extra supporter may effectively distribute a load of the water tank, applied to the tilting journal.

The first extra supporter may be rotatably assembled to a first hollow hole and the second extra supporter may be rotatably assembled to a second hollow, thereby making it possible to minimize friction of the first extra supporter and the second extra supporter and to effectively distribute a load applied to the first extra supporter and the second extra supporter.

The tilt drive gear assembly may be disposed at a rear of the tilt move gear, thereby making it possible to minimize a driving force required for pushing up a rear end of the water tank and to ensuring a space required for the tilt move gear to operate.

The tilt move gear may be formed into an arc shape, and a center of curvature of the tilt move gear may be disposed to face the tilting journal, thereby making it possible to uniformly maintain a distance between the tilt move gear and the tilt drive gear assembly even when the tilt move gear moves.

A lower end of the tilt move gear may protrude further downward than the supply support body, and a portion, where the tilt move gear and the tilt drive gear assembly are engaged, may be disposed at a height the same as or lower than the tilting journal, thereby making it possible to support a load of the water tank stably when the water tank tilts.

When seen from a front, the tilt move gear may be disposed between the first tilting journal and the second tilting journal, thereby making it possible to minimize generation of eccentricity or moment on a left side or a right side of the water tank.

A tilt guide may be inserted into a tilt guide groove, and when the water tank tilts, the tilt guide groove may move along the tilt guide, thereby making it possible to maintain engagement between the tilt move gear and the tilt drive gear assembly even when an external force is applied to the tilt move gear.

The tilt guide groove and the tilt guide may be formed into an arc shape, and a center of curvature of the tilt guide groove and the tilt guide may be disposed to face the tilting journal, thereby making it possible to minimize interference between the tilt move gear and the tilt drive gear assembly when the tilt move gear moves.

The indoor unit may further include a tilt move gear supporter disposed at a structure at the base side and configured to support the lower end of the tilt move gear, thereby making it possible to prevent the tilt move gear from excessively moving downward and to maintain the engagement of the tilt move gear and the tilt drive gear assembly.

The supply support body and the supply tilt cover for a tilt of the water tank may also be used as a component of a water supply assembly for supplying water to a steam generator.

When the supply tilt cover tilts, a water bellows may keep itself coupled to the supply tilt cover and the supply support body, thereby making it possible to prevent water from leaking out of a supply flow channel.

DESCRIPTION OF DRAWINGS

FIG. 1 is a perspective view illustrating an exemplary indoor unit for an air conditioner.

FIG. 2 is a view illustrating an example where the door assembly in FIG. 1 is slid.

FIG. 3 is a view illustrating an example where the water tank in FIG. 2 tilts.

FIG. 4 is a view illustrating an example where the water tank in FIG. 3 is separated.

FIG. 5 is a perspective view illustrating a state where a door assembly is removed from FIG. 1.

FIG. 6 is an exploded perspective view of FIG. 1.

FIG. 7 is a perspective view illustrating the humidification assembly and the water tank in FIG. 6 assembled to a lower cabinet.

FIG. 8 is a perspective view illustrating a rear of an exemplary humidification assembly.

FIG. 9 is an exploded perspective view illustrating an exemplary water tank and an exemplary water supply assembly.

FIG. 10 is an exploded perspective view seen from a lower side of FIG. 9.

FIG. 11 is a left-side sectional view of FIG. 9.

FIG. 12 is a front sectional view of FIG. 9.

FIG. 13 is an exploded perspective view illustrating an exemplary water tank, an exemplary water supply assembly, and an exemplary tilting assembly.

FIG. 14 is an exploded perspective view seen from a rear of FIG. 13.

FIG. 15 is a right-side sectional view illustrating a water tank, a water supply assembly, and a tilting assembly in a state where the water tank tilts.

FIG. 16 is a perspective view illustrating the water tank in FIG. 9.

FIG. 17 is an exploded perspective view illustrating an upper portion of the water tank in FIG. 16.

FIG. 18 is a perspective view illustrating the supply tilt cover in FIG. 10.

FIG. 19 is a perspective view seen from a rear of FIG. 18.

FIG. 20 is a bottom view of FIG. 18.

FIG. 21 is a perspective view illustrating the supply support body in FIG. 9.

FIG. 22 is a plan view of FIG. 21.

FIG. 23 is a perspective view illustrating the supply chamber housing in FIG. 9.

FIG. 24 is a perspective view seen from a rear of FIG. 23.

FIG. 25 is a plan view of FIG. 23.

FIG. 26 is a rear view of FIG. 23.

FIG. 27 is a front view of FIG. 23.

FIG. 28 is a left-side view of FIG. 23.

FIG. 29 is a cross-sectional view illustrating an exemplary water tank, an exemplary water supply assembly and exemplary tilting assembly.

FIG. 30 is an enlarged view of FIG. 29.

FIG. 31 is a front view illustrating an inside of the lower cabinet in FIG. 5.

FIG. 32 is a cross-sectional view illustrating the humidification assembly in FIG. 31.

FIG. 33 is a perspective view of FIG. 32.

FIG. 34 is a perspective view illustrating a rear surface of a tilting assembly for an exemplary water tank.

FIG. 35 is a perspective view illustrating a water tank, a water supply assembly and a tilting assembly in a state where the lower cover in FIG. 34 is removed.

FIG. 36 is a perspective view illustrating an inside of the tilting assembly in FIG. 35.

FIG. 37 is a perspective view illustrating the tilting assembly in FIG. 35.

FIG. 38 is a right-side sectional view illustrating a second exemplary water tank and a second exemplary tilting assembly.

DETAILED DESCRIPTION

Advantages and features according to the present disclosure, and a method of achieving the same may be clearly understood from the following embodiments that are described with reference to the accompanying drawings. However, the present disclosure is not intended to be limited to the embodiments. Rather, the present disclosure is intended to cover various modifications and is provided so that it may be thorough and complete and its scope may be fully conveyed to one having ordinary skill in the art to which the disclosure pertains. Additionally, throughout the specification, like reference numerals may denote like components.

Below, an indoor unit for an air conditioner according to the present disclosure is described with reference to the accompanying drawings.

FIG. 1 is a perspective view illustrating an exemplary indoor unit for an air conditioner. FIG. 2 is a view illustrating an example where the door assembly in FIG. 1 is slid. FIG. 3 is a view illustrating an example where the water tank in FIG. 2 tilts. FIG. 4 is a view illustrating an example where the water tank in FIG. 3 is separated. FIG. 5 is a perspective view illustrating a state where a door assembly is removed from FIG. 1. FIG. 6 is an exploded perspective view of FIG. 1.

The exemplary air conditioner may include an indoor unit, and an outdoor unit (not illustrated) connected to the indoor unit through a refrigerant pipe in which refrigerants circulate.

The outdoor unit may include a compressor (not illustrated) configured to compress refrigerants, an outdoor heat exchanger (not illustrated) configured to receive the refrigerants from the compressor and to heat exchange using the refrigerants, an outdoor fan (not illustrated) configured to supply air to the outdoor heat exchanger, and an accumulator (not illustrated) configured to receive the refrigerants discharged from the indoor unit and then to supply gaseous refrigerants to the compressor.

The outdoor unit may further include a four-way valve (not illustrated) to operate the indoor unit in a cooling mode or in a heating mode. In the cooling mode, the refrigerants are evaporated in the indoor unit 10 to cool air in an indoor space. In the heating mode, refrigerants are condensed in the indoor unit to heat air in an indoor space.

<<Configuration of Indoor Unit>>

The indoor unit 10 may include a cabinet assembly 100, a front surface of which is opened and which is provided with a suction port 101 on a rear surface thereof, a door assembly 200 assembled to the cabinet assembly 100, configured to cover the front surface of the cabinet assembly 100 and configured to open and close the front surface of the cabinet assembly 100, a fan assembly 300, 400 disposed in an inner space (S) of the cabinet assembly 100 and configured to discharge air in the inner space (S) to an indoor space, a heat exchange assembly 500 disposed between the fan assembly 300, 400 and a rear of the cabinet assembly 100 and allowing heat exchange between suctioned indoor air and refrigerants, a humidification assembly 2000 disposed at the cabinet assembly 100 and configured to supply moisture to the indoor space, a filter assembly 600 disposed at a back surface of the cabinet assembly 100 and configured to filter air flowing to the suction port 101, and a moving cleaner 700 moving in an up-down direction along the filter assembly 600 and configured to separate and collect foreign substances from the filter assembly 600.

The indoor unit may include a suction port 101 disposed on a back surface with respect to the cabinet assembly 100, lateral discharge ports 301, 302 disposed on lateral surfaces with respect to the cabinet assembly 100, and a front discharge port 1210 disposed on a front surface with respect to the cabinet assembly 100.

The suction port 101 may be disposed on the back surface of the cabinet assembly 100.

The lateral discharge ports 301, 302 may be disposed respectively on the left side and on the right side with respect to the cabinet assembly 100. In the embodiment, when seen from the front surface of the cabinet assembly 100, the lateral discharge port on the left side is referred to as a first lateral discharge port 301, and the lateral discharge port on the right side is referred to as a second lateral discharge port 302.

The front discharge port 1210 may be disposed at the door assembly 200, and the door assembly 200 may further include a door cover assembly 1200 configured to automatically open and close the front discharge port 1210.

The door cover assembly 1200 may open the front discharge port 1210 and then may move downward along the door assembly 200. The door cover assembly 1200 may move in the up-down direction with respect to the door assembly 200.

After the door cover assembly 1200 moves downward, a long-distance fan assembly 400 may move forward and pass through the door assembly 200.

The fan assembly 300, 400 may include a short-distance fan assembly 300 and the long-distance fan assembly 400. The heat exchanger assembly 500 may be disposed at a rear of the short-distance fan assembly 300 and the long-distance fan assembly 400.

The heat exchange assembly 500 may be disposed inside the cabinet assembly 100 and may be disposed adjacent to the suction port 101. The heat exchange assembly 500 may cover the suction port 101 and may be disposed perpendicularly.

The short-distance fan assembly 300 and the long-distance fan assembly 400 may be disposed at a front of the heat exchange assembly 500. Air suctioned into the suction port 101 may pass through the heat exchange assembly 500 and then may flow to the short-distance fan assembly 300 and the long-distance fan assembly 400.

The heat exchange assembly 500 may be manufactured to have a length corresponding to a height of the short-distance fan assembly 300 and the long-distance fan assembly 400.

The short-distance fan assembly 300 and the long-distance fan assembly 400 may be vertically stacked. In the embodiment, the long-distance fan assembly 400 may be disposed at an upper side of the short-distance fan assembly 300. When the long-distance fan assembly 400 is disposed at the upper side of the short-distance fan assembly 300, discharged air may be sent to a far corner of the indoor space.

The short-distance fan assembly 300 may discharge air in a lateral direction with respect to the cabinet assembly 100. The short-distance fan assembly 300 may supply indirect air flow to a user. The short-distance fan assembly 300 may discharge air in leftward and rightward directions of the cabinet assembly 100 at the same time.

The long-distance fan assembly 400 may be disposed at the upper side of the short-distance fan assembly 300, and may be disposed at an upper side in the cabinet assembly 100.

The long-distance fan assembly 400 may discharge air in a forward direction with respect to the cabinet assembly 100. The long-distance fan assembly 300 may supply direct air flow to the user. Additionally, the long-distance fan assembly 300 may discharge air to a far corner of the indoor space to improve air circulation of the indoor space.

In the embodiment, the long-distance fan assembly 400 may be exposed to the user when operating. When the long-distance fan assembly 400 operates, the long-distance fan assembly 400 may be exposed to the user by passing through the door assembly 200. When the long-distance fan assembly 400 does not operate, the long-distance fan assembly 400 may be hidden in the cabinet assembly 100.

The long-distance fan assembly 400 may control a direction where air is discharged. The long-distance fan assembly 400 may discharge air upwards, downwards, leftwards, rightwards or diagonally with respect to the front surface of the cabinet assembly 100.

The door assembly 200 may be disposed at a front of the cabinet assembly 100 and may be assembled to the cabinet assembly 100.

The door assembly 200 may slide in a left-right direction with respect to the cabinet assembly 100, and may expose a part of the front surface of the cabinet assembly 100 to the outside.

The door assembly 200 may move in any one of the leftward or rightward direction to open the inner space (S). Additionally, the door assembly 200 may move in any one of the leftward or rightward direction to open only a part of the inner space (S).

In the embodiment, the door assembly 200 may be opened and closed in two stages.

In the first stage opening and closing, the door assembly 200 may be partially opened to supply water to the humidification assembly 2000, and a surface area of the cabinet assembly 100 may be exposed to the extent that a water tank 2100 of the humidification assembly 2000 is exposed.

In the second stage opening and closing, the door assembly 200 may be opened to a maximum level for installation and repairs. To this end, the door assembly 200 may include a door stopper structure to control the second stage opening.

The filter assembly 600 may swivel to a lateral portion of the cabinet assembly 100 in a state where the filter assembly 600 is disposed on the rear surface of the cabinet assembly 100. A user may separate only the filter from the filter assembly 600 moved to the lateral portion of the cabinet assembly 100.

In the embodiment, the filter assembly 600 includes two parts, and each part may swivel to the left side or the right side.

The moving cleaner 700 is a device for cleaning the filter assembly 600. The moving cleaner 700 may clean the filter assembly 600 while moving in the up-down direction. The moving cleaner 700 may suction air and may separate foreign substances attached to the filter assembly 600 while moving, and the separated foreign substances may be stored in the moving cleaner 700.

The moving cleaner 700 may be installed as a structure that does not interfere with the filter assembly 600 when the filter assembly 600 swivels.

The humidification assembly 2000 may supply moisture to the inner space (S) of the cabinet assembly 100, and the supplied moisture may be discharged to the indoor space through the short-distance fan assembly 300. The humidification assembly 2000 may include a detachable water tank 2100.

In the embodiment, the humidification assembly 2000 may be disposed at a lower side in the cabinet assembly 100. A space in which the humidification assembly 2000 is disposed, and a space in which the heat exchange assembly 500 is disposed may be divided.

The humidification assembly 2000 may perform humidification using air filtered and steam sterilized through the filter assembly 600, and by doing so, may prevent harmful substances such as germs or fungi from contacting the water tank.

<<Configuration of Cabinet Assembly>>

The cabinet assembly 100 may include a base 130 mounted onto the ground, a lower cabinet 120 disposed at an upper side of the base 130, having a front surface 121, an upper surface 125 and a lower surface 126 that are open, and having a left surface 123, a right surface 124 and a back surface 122 that are closed, and an upper cabinet 110 disposed at an upper side of the lower cabinet 120, having a back surface 112, provided with a suction port 101, a front surface 111 and a lower surface 116 that are open, and having a left surface 113, a right surface 114, and an upper surface 115 that are closed.

An inside of the upper cabinet 110 is referred to as a first inner space (S1), and an inside the lower cabinet 120 is referred to as a second inner space (S2). The first inner space (S1) and the second inner space (S2) may constitute an inner space (S) of the cabinet assembly 100.

The short-distance fan assembly 300, the long-distance fan assembly 400 and the heat exchange assembly 500 may be disposed inside the upper cabinet 110.

The humidification assembly 2000 may be disposed inside the lower cabinet 120.

A drain pan 140 configured to support the heat exchange assembly 500 may be disposed between the upper cabinet 110 and the lower cabinet 120. In the embodiment, the drain pan 140 may close a part of the lower surface 116 of the upper cabinet 110.

When the cabinet assembly 100 is assembled, the bottom surface 116 of the upper cabinet 110 may be shielded by the humidification assembly 2000 and the drain pan 140, and air in the upper cabinet 110 may be blocked from flowing to the lower cabinet side.

The door assembly 200 may be disposed at a front of the cabinet assembly 100, and may slide in a left-right direction with respect to the cabinet assembly 100.

When the door assembly 200 moves, a part of the left or the right of the cabinet assembly 100 may be exposed to the outside.

A discharge grille 150 may be disposed at an edge of a front of the upper cabinet 110. The discharge grille 150 may be disposed at a rear of the door assembly 200.

The discharge grille 150 and the upper cabinet 110 may be integrally formed. In the embodiment, the discharge grille 150 may be separately manufactured through an injection molding process and then may be assembled to the upper cabinet 110.

The discharge grille disposed at a front of the left surface 113 is referred to as a left side grille 151, and the discharge grille disposed at a front of the right surface 114 is referred to as a right side grille 152.

The left discharge grille 151 and the right discharge grille 152 may be respectively provided with lateral discharge ports 301, 302. The lateral discharge ports 301, 302 may be formed by penetrating the left discharge grille 151 and the right discharge grille 152, respectively.

In the embodiment, a cover 160 may be disposed at a front of the upper cabinet 110 and the lower cabinet 120, and may prevent air in the cabinet 100 from contacting the door assembly 200 directly.

When cold air directly contacts the door assembly 200, dew may be formed, and may adversely affect the electric circuit at the door assembly 200.

Accordingly, the cover 160 may be disposed at the front of the upper cabinet 110 and at a front of the lower cabinet 120, and may allow air in the cabinet assembly 100 to flow only to a front discharge port 201 or the lateral discharge ports 301, 302.

The cover 160 may include an upper cover 162 configured to cover the front surface of the upper cabinet 110, a lower cover 164 configured to cover the front surface of the lower cabinet 120, and a long-distance fan cover 166 configured to cover a front surface of the long-distance fan assembly 400.

The long-distance fan cover 166 and the upper cover 162 may be integrally formed. In the embodiment, the long-distance fan cover 166 and the upper cover 166 may be separately manufactured and then may be assembled to each other.

The long-distance fan cover 166 may be disposed at a front of the long-distance fan assembly 400, and may be disposed at an upper side of the upper cover 162. Front surfaces of the long-distance fan cover 166 and the upper cover 162 may form a continuous flat surface.

The long-distance fan cover 166 may be provided with a fan cover discharge port 161 that is open in a front-rear direction. The fan cover discharge port 161 may communicate with the front discharge port 201 and may be disposed at a rear of the front discharge port 201. A discharge grille 450 of the long-distance fan assembly 400 may pass through the fan cover discharge port 161 and the front discharge port 201 to move to a front of the door assembly 200.

The door assembly 200 may be disposed at the front of the fan cover discharge port 161, and the fan cover discharge port 161 may be disposed at a rear of a below-described panel discharge port 1101. When the long-distance fan assembly 400 moves forwards, the discharge grille 450 may consecutively pass through the fan cover discharge port 161, the panel discharge port 1101 and the front discharge port 201.

That is, the panel discharge port 1101 may be disposed at the rear of the front discharge port 201, and the fan cover discharge port 161 may be disposed at the rear of the panel discharge port 1101.

The long-distance fan cover 166 may be coupled to an upper side of the front of the upper cabinet 110, and the upper cover 162 may be coupled to a lower side of the front of the upper cabinet 110.

The lower cover 164 may be disposed at a lower side of the upper cover 162 and may be assembled to the lower cabinet 120 or the humidification assembly 2000. After the lower cover 164 is assembled, front surfaces of the lower cover 164 and the upper cover 162 may form a continuous surface.

The lower cover 164 may be provided with a water tank opening 167 that is open in the front-rear direction. A water tank 2100 may be separated or installed through the water tank opening 167.

The lower cover 165 may be disposed at a lower side of a front of the drain pan 140. Although a front surface of the lower cabinet 120 is not entirely covered, air in the upper cabinet 110 may not leak. Accordingly, the front surface of the lower cabinet 120 may not be entirely covered.

A water tank storage 165, in which the water tank 2100 is stored, may be formed in the lower cover 164. The water tank opening 167 may be formed on a front surface of the water tank storage 165. The water tank storage 165 may be a space that is concaved from a cover front wall 164a rearward.

The lower cover 164 may include a cover front wall 164a where a water tank opening 167 is formed, a cover left wall 164c forming a left side of the water tank storage 165 and extending from the cover front wall 164a rearward, a cover right wall 164d forming a right side of the water tank storage 165 and extending from the cover front wall 164a rearward, a cover top wall 164e forming an upper side of the water tank storage 165 and extending from the cover front wall 164a rearward, and a cover rear wall 164b forming a rear of the water tank storage 165 and connecting the cover left wall 164c, the cover right wall 164d and the cover top wall 164e.

A front and a lower side of the water tank storage 165 may be open. The water tank 2100 may be inserted or separated through the water tank opening 167 formed on the front surface of the water tank storage 165. A water supply assembly 2200 may be inserted through a lower surface of the water tank storage 165.

A UV lamp 2900, configured to radiate ultraviolet rays to the water tank 2100, may be disposed at an upper portion of the cover top wall 164e. A radiation opening 2901 passing through the cover top wall 164e in an up-down direction may be formed, and ultraviolet rays of the UV lamp 2900 may be emitted to an upper body opening 2131 through the radiation opening 2901. When the water tank 2100 is mounted, the upper body opening 2131 may be disposed at a lower side of the radiation opening 2901. When the water tank 2100 tilts, the UV lamp 2900 may be powered off.

For repairs, services and replacements of the humidification assembly 2000, a part of the front surface of the lower cabinet 120 may be opened. In the embodiment, a part of the front surface of the lower cabinet 120 may be provided with an open surface 169 that is not shielded by the lower cover 164.

When the door assembly 200 is opened to a first stage, only the lower cover 164, where the water tank opening 167 is formed, is exposed to the user, and when the door assembly 200 is opened to a second stage, the open surface 169 may also be exposed to the user.

The door assembly 200 may slide in the left-right direction as a door slide module (not illustrated) operates. A state, in which the water tank opening 167 is entirely exposed as the door assembly 200 slides, is referred to as a first stage opening, and a state, in which the open surface 169 is exposed, is referred to as a second stage opening.

A front surface of the cabinet assembly 100, which is exposed at the time of the first stage opening, is referred to as a first open surface (OP1), and a front surface of the cabinet assembly, which is exposed at the time of the second stage opening, is referred to as a second open surface (OP2).

<<Configuration of Short-Distance Fan Assembly>>

The short-distance fan assembly 300 is a component for discharging air laterally with respect to a cabinet assembly 100. The short-distance fan assembly 300 may supply indirect air flow to a user.

The short-distance fan assembly 300 may be disposed at a front of the heat exchange assembly 500.

For the short-distance fan assembly 300, a plurality of fans 310 may be vertically stacked. In the embodiment, three fans 310 may be provided and vertically stacked.

In the embodiment, a mixed-flow centrifugal fan may be used as the fan 310.

The fan 310 may suction air in an axial direction and may discharge air in a circumferential direction.

The fan 310 may suction air from a rear thereof and then may discharge the air circumferentially and forward. The fan 310 may discharge air flow having directionality towards a front, while discharging air circumferentially.

The short-distance fan assembly 300 may have an open front and an open rear, and may include a fan casing 320 coupled to the cabinet assembly 100, a plurality of fans 310 coupled to the fan casing 320 and disposed in the fan casing 320, and a fan guide 330 coupled to the fan casing 320 and configured to guide air, discharged from the fan 310, laterally with respect to the cabinet assembly 100.

The fan casing 320 may be formed in a box shape with an open front surface and an open rear surface. The fan casing 320 may be coupled to the cabinet assembly 100.

The front surface of the fan casing 320 may be disposed to face a door assembly 200, and the rear surface of the fan casing 320 may be disposed to face a heat exchanger assembly 500.

The front surface of the fan casing 320 may be closed by closely contacting the door assembly 200.

In the embodiment, a part of a lateral surface of the fan casing 320 may be exposed to the outside. Lateral discharge ports 301, 302 may be formed at the part of the fan casing 320, which is exposed to the outside. Discharge vanes, capable of controlling a direction of discharge of air, may be disposed at the lateral discharge ports 301, 302. The lateral discharge ports 301, 302 may be disposed respectively on a left and right sides of the fan casing 320.

The fan 310 may be disposed in the fan casing 320. The plurality of fans 310 may be disposed on the same flat surface, and may be stacked in a line with respect to the up-down direction.

As a centrifugal fan is used as the fan 310, the fan 310 may suction air from the rear surface of the fan casing 320 and then may discharge the air circumferentially.

The fan guide 330 may guide the air, discharged from the fan 310, to the lateral discharge ports 301, 302. As a centrifugal fan is used as the fan 310, air discharged to an upper side and a lower side may be guided to the lateral discharge ports 301, 302 by the fan guide 330.

<<Configuration of Long-Distance Fan Assembly>>

The long-distance fan assembly 400 is a component for discharging air forwards with respect to the cabinet assembly 100. The long-distance fan assembly 400 may supply direct winds to a user.

The long-distance fan assembly 400 may be disposed at a front of the heat exchange assembly 500. The long-distance fan assembly 400 may be stacked at an upper side of the short-distance fan assembly 300.

The long-distance fan assembly 400 may discharge air through a front discharge port 201 formed at the door assembly 200. The long-distance fan assembly 400 may provide a structure that may rotate upwards, downwards, leftwards, rightwards or diagonally. The long-distance fan assembly 400 may discharge air to a far corner of an indoor space to improve air circulation in the indoor space.

The long-distance fan assembly 400 may further include a tilting assembly that allows a discharge grille 450 to make relative movements freely in all directions including an upper side, a lower side, a leftward side, a rightward side, an orthogonal direction and the like with respect to a fan housing assembly.

<<<Configuration of Door Assembly>>>

The door assembly 200 may include a front panel 210 where a front discharge port 201 is formed, a panel module (not illustrated) coupled to a back surface of the front panel 210 and provided with a panel discharge port communicating with the front discharge port 201, a door cover assembly 1200 disposed at the panel module and configured to open and close the panel discharge port and the front discharge port 201, a door slide module (not illustrated) disposed at the panel module and configured to move the panel module in a left-right direction with respect to a cabinet assembly 100, a camera module 1900 disposed at an upper side of the panel module and configured to capture an image of an indoor space, and a cable guide (not illustrated), an upper end of which is assembled to the door cover assembly 1200 to move relative to the door cover assembly 1200, a lower end of which is assembled to the panel module to move relative to the panel module, and in which a cable connected to the door cover assembly 1200 is stored.

The front discharge port 201 may be disposed on the front panel 210, and may be open in a front-rear direction. The panel discharge port may be disposed at the panel module and may be open in the front-rear direction.

Surface areas and shapes of the front discharge port 201 and the panel discharge port may be the same, and the front discharge port 201 may be disposed further forward than the panel discharge port.

The door assembly 200 may further include a display module 1500 installed at the panel module and configured to provide information of an indoor unit to the front panel 210 visually.

The display module 1500 may be disposed on a back surface of the front panel and may provide visual information to a user through the front panel.

Alternatively, the display module 1500 may be partially exposed by passing through the front panel and may provide the visual information to the user through an exposed display.

In the embodiment, information of the display module 1500 may be delivered to a user through a display opening 202 formed on the front panel 210.

FIG. 7 is a perspective view illustrating the humidification assembly and the water tank in FIG. 6 assembled to a lower cabinet. FIG. 8 is a perspective view illustrating a rear of an exemplary humidification assembly. FIG. 9 is an exploded perspective view illustrating an exemplary water tank and an exemplary water supply assembly. FIG. 10 is an exploded perspective view seen from a lower side of FIG. 9. FIG. 11 is a left-side sectional view of FIG. 9. FIG. 12 is a front sectional view of FIG. 9. FIG. 13 is an exploded perspective view illustrating an exemplary water tank, an exemplary water supply assembly, and an exemplary tilting assembly. FIG. 14 is an exploded perspective view seen from a rear of FIG. 13. FIG. 15 is a right-side sectional view illustrating a water tank, a water supply assembly, and a tilting assembly in a state where the water tank tilts. FIG. 16 is a perspective view illustrating the water tank in FIG. 9. FIG. 17 is an exploded perspective view illustrating an upper portion of the water tank in FIG. 16. FIG. 18 is a perspective view illustrating the supply tilt cover in FIG. 10. FIG. 19 is a perspective view seen from a rear of FIG. 18. FIG. 20 is a bottom view of FIG. 18. FIG. 21 is a perspective view illustrating the supply support body in FIG. 9. FIG. 22 is a plan view of FIG. 21. FIG. 23 is a perspective view illustrating the supply chamber housing in FIG. 9. FIG. 24 is a perspective view seen from a rear of FIG. 23. FIG. 25 is a plan view of FIG. 23. FIG. 26 is a rear view of FIG. 23. FIG. 27 is a front view of FIG. 23. FIG. 28 is a left-side view of FIG. 23. FIG. 29 is a cross-sectional view illustrating an exemplary water tank, an exemplary water supply assembly and exemplary tilting assembly. FIG. 30 is an enlarged view of FIG. 29. FIG. 31 is a front view illustrating an inside of the lower cabinet in FIG. 5. FIG. 32 is a cross-sectional view illustrating the humidification assembly in FIG. 31. FIG. 33 is a perspective view of FIG. 32. FIG. 34 is a perspective view illustrating a rear surface of a tilting assembly for an exemplary water tank. FIG. 35 is a perspective view illustrating a water tank, a water supply assembly and a tilting assembly in a state where the lower cover in FIG. 34 is removed. FIG. 36 is a perspective view illustrating an inside of the tilting assembly in FIG. 35. FIG. 37 is a perspective view illustrating the tilting assembly in FIG. 35.

<<<Configuration of Humidification Assembly>>>

The humidification assembly 2000 may supply moisture into a discharge flow channel of the fan assembly 300, 400, and the supplied moisture may be discharged to an indoor space. The humidification assembly 2000 may optionally operate according to an operation signal of a controller.

In the embodiment, moisture supplied by the humidification assembly 2000 may be directly supplied to lateral discharge ports 301, 302. The moisture supplied by the humidification assembly 2000 may be mist or steam. In the embodiment, the humidification assembly 2000 may convert water of a water tank 2100 into steam to supply the steam.

In the embodiment, the humidification assembly 2000 may be disposed at a lower side in the cabinet assembly 100, and specifically, may be disposed in the lower cabinet 120.

The humidification assembly 2000 may be installed at the base 110 and may be surrounded by the lower cabinet 120. A drain pan 140 may be disposed at an upper side of the humidification assembly 2000, and steam generated in the humidification assembly 2000 may directly flow to the lateral discharge ports 301, 302 through a steam guide 2400. That is, a space, in which the humidification assembly 2000 is disposed, and a space in an upper cabinet 110 are divided.

The humidification assembly 2000 may include a water tank 2100 disposed at the cabinet assembly 100 and configured to store water, a steam generator 2300 disposed at the cabinet assembly 100, supplied with water stored in the water tank 2100, and configured to convert water stored therein into steam and to generate humidified air, a humidification fan 2500 disposed at the cabinet assembly 100, coupled to the steam generator 2300 and configured to supply air, passing through the filter assembly 600, to the steam generator 2300, the steam guide 2400 disposed at the cabinet assembly 100 and configured to guide humidified air, generated in the steam generator 2300, to the lateral discharge ports 301, 302 of the cabinet assembly 100 through an independent flow channel, a water supply assembly 2200 disposed at the cabinet assembly 100, detachably holding the water tank 2100 and configured to supply water of the water tank 2100 to the steam generator 2300, a tilting assembly 2600 disposed at the cabinet assembly 100 or the water supply assembly 2200, configured to optionally tilt the water tank 2100 forward according to an electric signal, and configured to return the water tank tilted forward to an initial position, and a drain assembly 2700 connected to the water supply assembly 2200 and the steam generator 2300 and configured to drain water of the water supply assembly 2200 and the steam generator 2300 to the outside.

<<Configuration of Water Tank>>

The water tank 2100 may be exposed to the outside at the time of the first stage opening of the door assembly 200, and when the door assembly 200 is not opened, the water tank 2100 is not exposed to the outside.

The door assembly 200 may slide in a left-right direction as a door slide module (not illustrated) operates. A state, in which the water tank opening 167 is entirely exposed as the door assembly 200 slides, is referred to as the first stage opening, and a state, in which the open surface 169 is exposed, is referred to as the second stage opening.

A front surface of the cabinet assembly 100, which is exposed at the time of the first stage opening, is referred to as the first open surface (OP1), and a front surface of the cabinet assembly, which is exposed at the time of the second stage opening, is referred to as the second open surface (OP2).

In the embodiment, at least part of a front surface of the water tank 2100 may be made of a material (e.g., transparent material) allowing the water in the water tank 2100 to be seen. The water tank 2100 may be disposed on the first open surface (OP1), and specifically, may be disposed at the water tank opening 167. The water tank 2100 may inserted into a lower cabinet 120 through the water tank opening 167.

The water tank 2100 may include a tank lower body 2110 held at a water supply assembly 2200, a tank middle body 2120, an upper side and a lower side of which are open, coupled to an upper side of the tank lower body 2110, a lower surface of which is closed by the tank lower body 2110, and configured to store water therein, a tank upper body 2130 an upper side and a lower side of which are open to form a water tank opening 2101 and coupled to the upper side of the tank middle body 2120, a water tank handle 2140 rotatably assembled to the tank upper body 2130, and a water tank valve 2150 assembled to the tank lower body 2110 and configured to optionally supply water therein to the water supply assembly 2200.

The tank lower body 2110 may provide a bottom of the water tank 2100. The tank lower body 2110 may be provided with a valve hole 2111 penetrated in an up-down direction, and the water tank valve 2150 may be assembled to the valve hole 2111. The valve hole 2111 may be disposed at a rear when seen from a lateral surface of the water tank 2100.

A distance from a center of the valve hole 2111 to a front surface (a below-described tank front wall in the embodiment) of the water tank is defined as T1, and a distance from the center of the valve hole 2111 to a back surface (a below-described first rear wall in the embodiment) of the water tank is defined as T2. Herein, T1 may be longer than T2. When the valve hole 2111 is disposed at a rear of the water tank 2100, leakage of water from the water tank valve 2150 may be minimized at the time of operation of a tilting assembly 2600.

Only when the water tank 2100 is rapidly spaced apart from the water supply assembly 2200 at the time of operation of the tilting assembly 2600, the water tank valve 2150 may be rapidly closed. As the water tank 2100 tilts forwards with respect to a lower end of a front thereof, the water tank valve 2150 may be preferably disposed at the rear.

In the embodiment, the tank lower body 2110 may have a rectangular shape from a top view perspective. The tank lower body 2110 may be entirely formed into a rectangular cuboid shape, and its lower side may be open.

The tank lower body 2110 may be provided with a lower body space 2112 therein, and the lower body space 2112 may be open downward. Some components of the water supply assembly 2200 may be inserted into the lower body space 2112.

The tank lower body 2110 may be detachably held at the water supply assembly 2200. A front surface, a left surface, a right surface and an upper surface of the tank lower body 2110 may be closed. A rear surface of the tank lower body 2110 may be partially opened to be assembled to the tilting assembly 2600. A structure, where the tilting assembly 2600 and the water tank 2100 are assembled, is descried hereunder.

The tank middle body 2120 may include a middle body upper opening 2121, an upper side of which is open, and a middle body lower opening 2122, a lower side of which is open.

For the tank middle body 2120, a front surface, a left surface, a right surface and a back surface may be closed, and an upper surface and a lower surface may be open. The tank middle body 2120 may include a tank front wall 2123, a tank left wall 2124, a tank right wall 2125, and a tank rear wall 2126.

The tank front wall 2123, the tank left wall 2124 and the tank right wall 2125 may be perpendicularly disposed in the up-down direction. The tank rear wall 2126 may be curved in a front-rear direction while being disposed perpendicularly.

The tank rear wall 2126 may include a first rear wall 2126a coupled to the tank lower body 2110 and forming a continuous surface along with a back surface of the tank lower body 2110, a second rear wall 2126b coupled to the tank upper body 2130, forming a continuous surface along with the tank upper body 2130 and disposed further forward than the first rear wall 2126a, and a connection wall 2126c connecting the first rear wall 2126a and the second rear wall 2126b.

The connection wall 2126c may be formed to tilt in the up-down direction. For the connection wall 2126c, a front may be disposed high, and a rear may be disposed low.

The first rear wall 2126a may be disposed at a rear of the connection wall 2126c, and the second rear wall 2126b may be at a front of the connection wall 2126c. The first rear wall 2126a may be spaced a distance of T3 apart from the second rear wall 2126b in a front-rear direction.

A planar cross section of the tank middle body 2120 including the first rear wall 2126a may be larger than that of the tank middle body 2120 including the second rear wall 2126b. With this structure, a center of gravity of the water tank 2100 may be formed further rearward when water is stored in the water tank 2100.

Accordingly, the water tank 2100 may be prevented from tilting and falling forward even when the water tank 2100 is tilted forward by the tilting assembly 2600.

The tank upper body 2130 may be coupled to an upper end of the tank middle body 2120. From a top view perspective, the tank upper body 2130 may have an upper body opening 2131 in the shape of "□".

The upper body opening 2131 may pass through the tank upper body 2130 in the up-down direction. The upper body opening 2131 may communicate with the middle body upper opening 2121. The middle body upper opening 2121 may be disposed at a lower side of the upper body opening 2131.

A user may supply water to the water tank 2100 through the upper body opening 2131. The user may supply water to the water tank 2100 through the upper body opening 2131 of the water tank 2100 without separating the water tank 2100.

When the water tank 2100 tilts, the water tank 2100 may tilt forward. Then the upper body opening 2131 may be exposed to the user. Accordingly, the user may supply water from the upper side. When the water tank 2100 tilts, the upper body opening 2131 may be disposed further forward than a lower cover 164.

The water tank handle 2140 may be rotatably assembled to the tank upper body 2130. Outer surfaces of the tank upper body 2130 may include a front surface 2130a, a rear surface 2130b, a left surface 2130c, a right surface 2130d, an upper surface 2130e, and a lower surface 2130f.

Inner surfaces of the tank upper body 2130 may include an inner front wall 2133a, inner side walls 2133c, 2133d and an inner rear wall 2133b. The upper body opening 2131 may be surrounded and formed by the inner front wall 2133a, the inner side walls 2133c, 2133d and the inner rear wall 2133b.

The inner front wall 2133a may be formed to incline with respect to the up-down direction. For the inner front wall 2133a, an upper end may be disposed further rearward than a lower end. Accordingly, the lower end of the inner front wall 2133a may be disposed to incline towards a lower side of the rear of it.

When the water tank 2100 tilts, the inner front wall 2133a may form a gentle inclination and may guide the water, supplied from the top of the water tank 2100, into the water tank 2100.

The inner rear wall 2133b may be disposed perpendicularly, and when the water tank 2100 tilts, may be disposed to incline by a tilt angle (A).

When the water tank 2100 tilts, an upper end 2135 of the inner real wall 2133b may be disposed at a lower side of a perpendicular line of the lower cover 164 or may be disposed further rearward than the lower cover 164. When the water tank 2100 tilts, the inner front wall 2133a may be disposed further forward than the lower cover 164. When the water tank 2100 tilts, a lower end 2114a of a front surface of a lower body side wall 2114 may be disposed further rearward than the lower cover 164.

When the water tank 2100 tilts, each position of the water tank 2100 may place a center of gravity of the water tank 2100 at a rear of the lower cover 164. Accordingly, the water tank 2100 may be prevented from falling forwards.

The water tank handle 2140 may be rotatably disposed at the tank upper body 2130. A handle installation groove 2132, where the water tank handle 2140 is installed, may be formed at the tank upper body 2130.

The handle installation groove 2132 may be formed along an outer edge of the tank upper body 2130. Specifically, the handle installation groove 2131 may be formed at a front of the tank upper body 2130.

From a top view perspective, the handle installation groove 2132 may be disposed outside the tank upper body 2130, and may be concaved downward from the upper surface of the tank upper body 2130. The handle installation groove 2132 may be formed in a "☐" shape.

In the embodiment, the handle installation groove 2132 may be concaved from the front surface 2130a, the left surface 2130c and the right surface 2130d of the tank upper body 2130 towards the upper body opening 2131.

An outer surface of the water tank handle 2140 and an outer surface of the tank upper body 2130 may provide a continuous flat surface. Also, an upper surface of the water tank handle 2140 and the upper surface 2130e of the tank upper body 2130 may form a continuous flat surface.

Unlike the embodiment, the handle installation groove 2132 may also be disposed inside the tank upper body 2130.

The water tank handle 2140 may include a handle body 2142 having a "☐" shape, a handle shaft 2144 configured to rotatably couple the handle body 2142 and the tank upper body 2130, and a handle elastic member 2146 disposed at any one of the handle body 2142 or the handle shaft 2144 and supported by the tank upper body 2130.

The handle elastic member 2146 may supply elastic force in a direction where an end of a front of the handle body 2142 is lifted. In the embodiment, a torsion spring may be used as the handle elastic member 2146.

When the water tank 2100 tilts forward, the water tank handle 2140 may be rotated out of the handle installation groove 2132 by the handle elastic member 2146.

When the water tank 2100 is inserted into the water tank opening 167, the water tank handle 2140 may overcome the elastic force of the handle elastic member 2146 due to interference between the water tank handle 2140 and a lower cover 164 and be stored in the handle installation groove 2132.

From a top view perspective, the handle body 2142 may be formed into a "E" shape.

The water tank handle 2140 may include a front surface 2140a, a left surface 2140c, a right surface 2140d, an upper surface 2140e and a lower surface 2140f.

A height of the handle body 2142 may be the same as a depth of the handle installation groove 2132. A width of the handle body 2142 may be the same as that of the handle installation groove 2132. A length of the handle body 2142 in a front-rear direction may be the same as that of the handle installation groove 2132 in the front-rear direction. That is, the shape of the handle body 2142 may correspond to that of the handle installation groove 2132.

The handle shaft 2144 may protrude from an inner surface of the handle body 2142 towards the tank upper body 2130. Two handle shafts 2144 may be disposed to face each other in a left-right direction.

A handle shaft hole 2134, into which the handle shaft 2144 is inserted, may be formed at the tank upper body 2130. The handle shaft hole 2134 may be formed at the handle installation groove 2132.

For the handle elastic member 2146, one end may be inserted into and supported by the handle shaft hole 2134, and the other end may support the handle shaft 2144. In the embodiment, the handle elastic member 2146 may be implemented as a torsion spring, and the handle shaft 2144 may pass through the torsion spring and may be inserted into the same.

The tank lower body 2110 may include a lower body top wall 2113 brought into contact with the middle body lower opening 2122 and configured to seal the middle body lower opening 2122, a lower body side wall 2114 extending downward from the lower body top wall 2113 and mounted onto the water supply assembly 2200, and a valve installation part 2115 protruding downward from the lower body top wall 2113 and forming a valve hole 2111 passing through the lower body top wall 2113 in the up-down direction.

The lower body top wall 2113 may form an upper surface of the tank lower body 2110 and may close the middle body lower opening 2122. In the embodiment, the lower body top wall 2113 and the middle body 2120 may be ultrasonically welded to prevent leakage of water, and may seal a bottom surface of the middle body 2120.

The valve installation part 2115 may form a valve hole 2111 passing through the lower body top wall 2113 in the up-down direction. The valve installation part 2115 may be formed in a cylindrical shape.

The water tank valve 2150 may be assembled to the valve installation part 2115. The water tank valve 2150 may be moved by a predetermined distance in the up-down direction in a state where the water tank valve 2150 is assembled to the valve installation part 2115. By doing so, the valve hole 2111 may be opened.

The water tank valve 2150 may serve as a check valve functionally, and may be optimized in accordance with the structure of the embodiment.

The valve installation part 2115 may include a cylinder-shaped extended installation part 2116 which is long and extended downwards from the lower body top wall 2113, and an assembly installation part 2117 which is disposed in the extended installation part 2116 and to which the water tank valve 2150 is assembled.

The extended installation part 2116 may have a cylindrical shape, and its upper and lower sides may be open. The assembly installation part 2117 may be formed across an inside of the extended installation part 2116. In the embodiment, the assembly installation part 2117 may be formed horizontally.

The assembly installation part 2117 may divide the valve hole 2111 into an upper side and a lower side.

The upper side of the assembly installation part 2117 is referred to as an upper valve hole 2111a, and the lower side of the assembly installation part 2117 is referred to as a lower valve hole 2111b.

The tank lower body 2110 may further include an assembly hole 2117a which passes through the assembly installation part 2117 in the up-down direction and to which the water tank valve 2150 is assembled, and an installation part hole 2118 which passes through the assembly installation part 2117 in the up-down direction and which allows the upper valve hole 2111a to communicate with the lower valve hoe 2111b.

The tank lower body 2110 may further include an assembly hole 2117a which passes through the assembly installation part 2117 in the up-down direction and to which the water tank valve 2150 is assembled, and an installation part hole 2118 which passes through the assembly installation part 2117 in the up-down direction and which allows the upper valve hole 2111a to communicate with the lower valve hole 2111b.

The assembly hole 2117a and the installation part hole 2118 may all be disposed in the valve installation part 2115.

The assembly hole 2117a may be disposed at a center of the valve installation part 2115, and the installation part hole 2118 may be disposed further outward than the assembly hole 2117a. The installation part hole 2118 may be disposed between the extended installation part 2116 and the assembly hole 2117a.

As the water tank valve 2150 is assembled to the assembly hole 2117a, the flow of water through the water tank valve 2150 may be not smooth. The water in the water tank 2100 may flow to the water supply assembly 2200 through the installation part hole 2118.

<Configuration of Water Tank Valve>

The water tank valve 2150 may include a valve core 2152 movably assembled to the valve installation part 2115 of the tank lower body 2110 in the up-down direction, and a diaphragm 2154 made of an elastic material, assembled to the valve core 2152 and configured to optionally open and close the valve hole 2111 when the valve core 2152 moves in the up-down direction.

From a top view perspective, the diaphragm 2154 may have a cylindrical shape, and may have a diameter larger than that of the valve hole 2111. An upper end of the diaphragm 2154 may be disposed at an upper side of the valve hole 2111, and a lower end of the diaphragm 2154 may be disposed in the valve hole 2111.

In the embodiment, the diaphragm 2154 may have a bowl shape that is concaved downward. The valve core 2152 may pass through the center of the diaphragm 2154 in the up-down direction.

The diaphragm 2154 may supply elastic force that helps restoration from a center to the outside.

When the water tank valve 2150 installed at the water tank 2100 is held at the water supply assembly 2200, a lower end of the valve core 2152 may contact a below-described valve supporter 2250.

When the valve core 2152 contacts the valve supporter 2250 and is supported by the valve supporter 2250, the water tank valve 2150 including the diaphragm 2154 may be disposed at the valve supporter 2250, and the rest of the components of the water tank 2100 may move downward except the water tank valve 2150.

When the water tank valve 2150 is supported by the valve supporter 2250, the diaphragm 2154 may open the valve hole 2111. When the water tank 2100 is separated from the water supply assembly 2200, the diaphragm 2154 may close the valve hole 2111 using the pressure of water.

<<Configuration of Water Supply Assembly>>

The water supply assembly 2200 may supply water in the water tank 2100 to the steam generator 2300. When the water tank 2100 is held at the water supply assembly 2200, the water supply assembly 2200 may open the water tank valve 2150 of the water tank 2100 and may supply water to the steam generator 2300.

The water supply assembly 2200 may support the water tank 2100, and may provide a flow channel allowing water to flow from the water tank 2100 to the steam generator 2300. Additionally, the water supply assembly 2200 may open and close the water tank valve 2150 depending on a level of water stored in the steam generator 2300. In the embodiment, the opening and closing process of the water tank valve 2150 may be implemented through a mechanical disposition instead of an electric signal. In case the opening and closing process of the water tank valve 2150 is implemented in an electromotive manner, electric wires may be exposed to moisture or water. Accordingly, incorrect operation and lack of safety may occur.

In the embodiment, as the opening and closing process of the water tank valve 2150 is implemented on the basis of a mechanical connection relationship, electricity being used in a portion in contact with water may be at a minimum. Accordingly, incorrect operations and safety accidents may be prevented.

The water supply assembly 2200 may include a supply chamber housing 2210 which is disposed at a cabinet assembly 100 (a base in the embodiment), which temporarily stores water supplied by the water tank 2100 in a supply chamber 2211 and which supplies the water stored in the supply chamber 2211 to the steam generator 2300, a supply floater 2220 which is disposed in the supply chamber 2211 of the supply chamber housing 2210 and which moves in an up-down direction depending on a level of the water stored in the supply chamber 2211, a supply support body 2230 which is disposed at an upper side of the supply chamber housing 2210, which covers an upper side of the supply chamber 2211, where a part of a supply flow channel 2231, configured to guide water supplied by the water tank 2100 to the supply chamber 2211, is formed, and which supports the water tank 2100 when the water tank 2100 tilts and forms a tilt angle (A), a valve supporter 2250 which is disposed at the supply support body 2230, which contacts the water tank valve 2150 of the water tank 2100 to open the water tank valve 2150 when the water tank 2100 is held and which provides a part of the supply flow channel 2231 configured to guide water discharged from the water tank valve 2150 to the supply chamber 2111, a supply tilt cover 2260 to which the water tank 2100 is detachably held, which is disposed between the water tank 2100 and the supply support body 2230, which rotates relative to the supply support body 2230 when the water tank tilts and where the water supply valve of the water tank is disposed to penetrate such that water in the water tank is supplied to the supply chamber 2111, and a water bellows 2240 which is disposed between the supply tilt cover 2260 and the supply support body 2230, which connects the supply tilt cover 2260 and the supply support body 2230, which is provided with the valve supporter 2250 therein and which guides water supplied by the supply tilt cover 2260 to the supply chamber 2211 through the supply flow channel 2231 of the supply support body 2230.

The water tank valve 2150 may be disposed at a lower side of the water tank 2100, the valve supporter 2250 and the supply support body 2230 may be disposed at a lower side of the water tank valve 2150, the supply floater 2220 may be disposed at a lower side of the valve supporter 2250, and the supply floater 2220 may move in the up-down direction within a height of the supply chamber 2211.

The water in the water tank 2100 may flow to the supply chamber 2211 through the water tank valve 2150, the water bellows 2240 and the supply flow channel 2231. The supply chamber 2211 may store the supplied water temporarily, and the water may flow to the steam generator 2300 on the basis of kinetic energy caused by its self-weight.

<Configuration of Supply Chamber Housing>

The supply chamber housing 2210 may be installed on an upper surface of a base 130 of a cabinet assembly 100. The supply chamber housing 2210 may temporarily store water supplied by the water tank 2100, and may supply the stored water to the steam generator 2300. The supply chamber housing 2210 may provide a space for installing the supply floater 2220, and the supply floater 2220 may move in an up-down direction in the supply chamber housing 2210.

The supply chamber housing 2210 may include a chamber housing body 2212 installed at an upper side of the base 130 of the cabinet assembly 100, a supply chamber 2211 disposed inside the chamber housing body 2212, open upward, concaved downward and configured to store water temporarily, a rib 2219 disposed at least one of the chamber housing body 2212 or the supply floater 2220, and configured to space a bottom surface 2220a of the supply floater 2220 from a bottom surface 2211a of the supply chamber 2211, and a chamber housing pipe 2214 disposed at the chamber housing body 2212, communicating with the supply chamber 2211, and configured to supply water stored in the chamber housing 2212 to the steam generator 2300.

The supply chamber 2211 may be open upward. The open upper surface of the supply chamber 2211 is referred to as a chamber open surface 2213. The supply floater 2220 may be disposed in the supply chamber 2211. In the embodiment, the supply chamber 2211 may have a cylindrical shape. The supply floater 2220 may have a circle-shaped planar cross section to correspond to the shape of the supply chamber 2211.

When the shape of the planar cross section of the supply chamber 2211 corresponds to that of the supply floater 2220, the supply floater 2220 may move smoothly. The planar cross section of the supply chamber 2211 may have various shapes. However, when the planar cross section of the supply chamber 2211 have angular shapes, the supply floater 2220 may be caught when moving in the up-down direction, and installation volume may increase.

The bottom surface 2211a of the supply chamber 2211 may be formed to incline. The bottom surface 2211a may be formed to incline towards the chamber housing pipe 2214.

In the embodiment, the rib 2219 may be formed at the chamber housing body 2212. The rib 2219 may protrude upward from the bottom surface 2211a of the supply chamber 2211. The rib 2219 may space the bottom surface 2220a of the supply floater 2220 apart from the bottom surface 2211a of the supply chamber 2211.

When the supply chamber 2211 is filled with water in the absence of the rib 2219, the bottom surface 2220a of the supply floater 2220 and the bottom surface 2211a of the supply chamber 2211 may come into close contact because of surface tension in water. Due to their close contact, the supply floater 2220 may not move in the up-down direction depending on the water level.

The rib 2219 may prevent incorrect operation of the supply floater 2200, caused by the close contact.

Additionally, to prevent a lateral surface 2220b of the supply floater 2220 from being fixing onto an inner wall 2211b of the supply chamber 2211, a distance between the lateral surface 2220b of the supply floater 2220 and the inner wall 2211b of the supply chamber 2211 has to be 1 mm or greater.

The chamber housing pipe 2214 may communicate with an inside of the supply chamber 2211. An inner end 2214a of the chamber housing pipe 2214 may communicate with the supply chamber 2211, and an outer end 2214b of the chamber housing pipe 2214 may protrude out of the supply chamber 2211.

The bottom surface 2211a of the supply chamber 2211 may be formed at a height the same as or higher than the inner end 2214a of the chamber housing pipe 2214. Accordingly, water in the supply chamber 2211 may be prevented from being left behind.

The outer end 2214b of the chamber housing pipe 2214 may be disposed further downward than the bottom surface 2211a of the supply chamber 2211, and water stored in the supply chamber 2211 may flow to the chamber housing pipe 2214 on the basis of its self-weight.

The outer end 2214b of the chamber housing pipe 2214 may be disposed lower than the bottom surface 2211a of the supply chamber 2211.

In the embodiment, the bottom surface 2211a of the supply chamber 2211 may be disposed within a height of the inner end 2214a of the chamber housing pipe 2214.

In case the inner end 2214a of the chamber housing pipe 2214 is higher than the bottom surface of the supply chamber 2211, water may be left behind in the supply chamber 2211, causing germs or fungi to breed. The inner end 2214a of the chamber housing pipe 2214 may be preferably formed at a height the same as or lower than the bottom surface of the supply chamber 2211.

When the humidification assembly 2000 is not used (e.g., in the summer when humidity is high or in case water is stored in the water tank for a long period of time), water in the humidification assembly 2000 including the water tank 2100 may not be left therein but may be drained to the outside.

To this end, provided is a structure, where water supplied by the water tank 2100 may not be left behind while flowing and may move using its self-weight, in the embodiment.

The outer end 2214b of the chamber housing pipe 2214 may connect to the steam generator 2300 and may supply water to the steam generator 2300. In the embodiment, water in the water tank 2100 may flow to the steam generator 2300 using kinetic energy on the basis of its self-weight.

<Configuration of Valve Supporter>

The valve supporter 2250 may be disposed at a lower side of the water tank valve 2150. The valve supporter 2250 may interfere with the water tank valve 2150 when the water tank 2100 is held at the water supply assembly 2200, and may open the water tank valve 2150.

The valve supporter 2250 may have a pointy upper side and may support the valve core 2152 of the water tank valve 2150.

When the water tank 2100 is held at the water supply assembly 2200, the vale supporter 2250 may interfere with the valve core 2152 to push up the water tank valve 2150. Accordingly, the valve hole 2111 may be opened.

When the valve hole 2111 is opened, water in the water tank 2100 may flow to the supply support body 2230.

The valve supporter 2250 may be separately manufactured. However, in the embodiment, the valve supporter 2250 and the supply support body 2230 may be integrally manufactured through an injection molding process. To contact the water tank valve 2150, the valve supporter 2250 has to be exposed upward from the supply support body 2230.

The valve supporter 2250 may be formed in different shapes. In the embodiment, the valve supporter 2250 may include a first valve supporter 2252 and a second valve supporter 2254. The first valve supporter 2252 and the second valve supporter 2254 may be spaced apart from each other to form a valve supporter gap 2256. Water may flow through the valve supporter gap 2256.

The first valve supporter 2252 and the second valve supporter 2254 may be disposed perpendicularly, and the valve supporter gap 2256 may also be disposed in an up-down direction. The valve core 2152 may be disposed at an upper side of the valve supporter gap 2256.

As the first valve supporter 2252 and the second valve supporter 2254 are spaced apart from each other, water discharged from the water tank 2100 may flow into the valve supporter gap 2256 although the first valve supporter 2252 and the second valve supporter 2254 support a lower end of the valve core 2152.

A lower end of the valve supporter gap 2256 may be open. An upper side of the valve supporter gap 2256 may be open towards an upper side of the supply support body 2230, and a lower side of the valve supporter gap 2256 may be open towards a lower side of the supply support body 2230.

In the embodiment, as the valve supporter 2250 and the supply support body 2230 are integrally manufactured, a middle hole 2258 communicating with a supply chamber 2211 may be formed at the lower side of the valve supporter gap 2256. The middle hole 2258 may form a part of the supply flow channel 2231.

In the embodiment, the middle hole 2258 may be formed at the lower side of the valve supporter gap 2256. However, the middle hole 2258 may also be formed at the supply support body 2230 unlike the embodiment. The middle hole 2258 may be formed to pass through the supply support body 2230 in the up-down direction.

The middle hole 2258 may allow an inner space of the water bellows 2240 to communicate with the supply chamber 2211.

The valve supporter 2250 may be disposed in the water bellows 2240. Accordingly, water discharged from the valve hole 2111 may be stored in the water bellows 2240, and may flow to the supply chamber 2111 through the middle hole 2258.

For example, the middle hole 2258 may be disposed inside the water bellows 2240. In case the middle hole 2258 is disposed outside the water bellows 2240, an additional component for guiding water, discharged from the water tank 2100, to the middle hole 2258 or a component for preventing the discharged water from flowing to another component has to be disposed at the supply support body 2230.

A contact portion (a lower end of the valve core and an upper end of the valve supporter) of the water tank valve 2150 and the valve supporter 2250 may be disposed in the water bellows 2240, for example.

The water bellows 2240 may provide a space for temporarily storing water discharged from the water tank 2100 like the supply chamber 2211. A configuration of the space is described during description of a configuration of the water bellows 2240.

<Configuration of Supply Support Body>

The supply support body 2230 may be disposed at an upper side of the supply chamber housing 2210 and may cover an upper side of the supply chamber 2211. The supply support body 2230 may seal an upper surface of the supply chamber 2211 and may prevent water in the supply chamber 2211 from leaking out of the supply chamber housing 2210.

The supply support body 2230 may be used for operating the water supply assembly 2200 and the tilting assembly 2700. In the embodiment, components for the water supply assembly 2200 and components for the tilting assembly 2700 may be disposed together at the supply support body 2230. Among components for the supply support body 2230, the components of the tilting assembly 2700 are described during description of a configuration of the tilting assembly 2700.

Additionally, a part of the supply flow channel 2231, configured to guide water supplied by the water tank 2100 to the supply chamber 2211, may be formed at the supply support body 2230. In the embodiment, a middle hole 2258 of the valve supporter 2250 may be substituted for the supply flow channel 2231.

The supply support body 2230 may support the water tank 2100, and when the water tank 2100 tilts, may support a rotated water tank 2100.

The supply support body 2230 may include a supply body plate 2232 disposed at an upper side of the supply chamber housing 2210 and configured to cover an upper side of the supply chamber 2211, a middle hole 2258 configured to pass through the supply body place 2232 in an up-down direction and forming a part of a supply flow channel 2231 connecting from the water tank 2100 to the supply chamber 2211, a floater guide 2234 which protrudes from a lower side of the supply body plate 2232, which communicates with the middle hole 2258, into which a part of an upper side of the supply floater 2220 is inserted, and which guides a direction of movement of the supply floater 2220, and a tilt supporter 2280, which protrudes upwards from the supply body plate 2232, which forms a predetermined tilt angle (A) along with a bottom surface of the water tank 2100, and which supports the water tank 2100 when the water tank 2100 tilts.

The supply body plate 2232 may be disposed at an upper side of the supply chamber housing 2210, may cover a chamber open surface 2213 forming an upper surface of the supply chamber 2211 and may seal the chamber open surface 2213 of the supply chamber 2211.

In order for the supply body plate 2232 to effectively seal the supply chamber 2211, a sealing rib 2231 protruding downwards from the supply body plate 2232 may be further formed.

The sealing rib 2231 may be formed into a shape corresponding to that of the chamber open surface 2213 of the supply chamber 2211. A supply chamber gasket 2233 for sealing may be further disposed between the sealing rib 2231 and the supply chamber housing 2210.

From a top view perspective, the supply chamber gasket 2233 may have a shape corresponding to a shape of an edge of the chamber open surface 2213. The supply chamber gasket 2233 may be made of an elastic material and may be disposed between the supply chamber housing 2210 and the supply support body 2230.

The middle hole 2258 may pass through the supply body plate 2232 in an up-down direction, and may connect from the water tank 2100 to the supply chamber 2211. The middle hole 2258 may form a part of the supply flow channel 2231 and may allow water, discharged from the water tank 2100, to flow to a lower side of the supply support body 2230.

In the embodiment, the middle hole 2258 may be disposed at the valve supporter 2250. Unlike the embodiment, additional middle holes passing through the supply body plate 2232 may be disposed. In this case, the middle hole 2258 may be disposed in a water bellows 2240. That is, unlike the embodiment, the middle hole 2258 of the valve supporter 250 and additional middle holes may be disposed in the water bellows 2240.

The floater guide 2234 may protrude downward from a bottom surface of the supply body plate 2232. The floater guide 2234 may communicate with the middle hole 2258. In the embodiment, the floater guide 2234 may be disposed at a lower side of the middle hole 2258, and water passing through the middle hole 2258 may be guided into the floater guide 2234.

The floater guide 2234 may have a lower side that is open, and a part of the upper side of the supply floater 2220 may be inserted through the open lower surface. The floater guide 2234 may guide a direction of movement of the supply floater 2220.

The floater guide 2234 may be provided with a floater guide inner space 2234S into which the supply floater 2220 is inserted. The middle hole 2258 may be disposed at an upper side of the floater guide inner space 2234S, and a valve supporter gap 2256 may be disposed at an upper side of the middle hole 2258.

The valve supporter gap 2256, the middle hole 2258 and the floater guide inner space 2234S may be disposed in a line to form a shortest distance moved by water. The middle hole 2258 may be closed when the below-described supply floater 2220 moves up, and may be opened when the supply floater 2220 moves down. The opening and closing process of the middle hole 2258 through the supply floater 2220, and the opening and closing process of the water tank valve 2150 may be performed separately.

A lower end of the water bellows 2240 may be fixed to the supply support body 2230. To fix the lower end of the water bellows 2240, a bellows rib 2235, protruding upward from an upper surface of the supply support body 2230, may be disposed at the supply support body 2230.

In the embodiment, the bellows rib 2235 may include an inner rib 2235a and an outer rib 2235b. A diameter of the inner rib 2235a may be smaller than that of the outer rib 2235b. The inner rib 2235a may protrude further upward than the outer rib 2235b. The lower end of the water bellows 2240 may be disposed to surround the inner rib 2235a. The lower end of the water bellows 2240 may be disposed between the inner rib 2235a and the outer rib 2235b.

The lower end of the water bellows 2240 may be fixed to the inner rib 2235a using a fixation member such as a snap ring. As the lower end of the water bellows 2240 is fixed to the bellows rib 2235, water in the water bellows 2240 may be prevented from leaking out of a water bellows bar. An inside of the water bellows 2240 may provide a supply flow channel.

<Configuration of Supply Tilt Cover>

The supply tilt cover 2260 may be disposed at a lower side of the water tank 2100, and the water tank 2100 may be detachably held at the supply tile cover 2260. In the embodiment, the supply tilt cover 2260 may be disposed between the water tank 2100 and the supply support body 2230.

When the water tank tilts, the supply tilt cover 2260 may rotate relative to the supply support body 2230 in a state where the supply tilt cover 2260 is supported by the supply support body 2230.

The supply tilt cover 2260 may be disposed to allow the water supply valve of the water tank to penetrate, and the water tank valve 2150 may pass through the supply tilt cover 2260 to contact the valve supporter 2250.

In the embodiment, the supply tilt cover 2260 may be detachably inserted into the tank lower body 2110 constituting a lower portion of the water tank 2100.

The supply tilt cover 2260 may have an open lower side and closed upper and lateral surfaces.

The supply tilt cover 2260 may include a tilt cover body 2262 at which a lower portion of the water tank 2100 is detachably held, which is held at the supply support body 2230 to be able to tilt, and which tilts on the basis of operation of the tilting assembly, a valve insertion hole 2261 which pass through the tilt cover body 2262 in an up-down direction and which communicates with a valve hole 2111 of the water tank 2100, and a tilt cover side wall 2264 which extends downwards from the tilt cover body 2262, and a bellows fixation cover 2265 configured to fix an upper side of the water bellows 2240, protruding from an upper side of the tilt cover body 2262 through the valve insertion hole 2261, to the tilt cover body 2262.

The tilt cover body 2262 may be mostly disposed in a horizontal direction. The valve insertion hole 2261 may be formed at the tilt cover body 2262. The valve insertion hole 2261 may pass through the tilt cover body 2262 in the up-down direction, and may be supplied with water from the valve hole 2111. The valve insertion hole 2261 may be disposed at a lower side of the valve hole 2111.

A lower surface of the tilt cover body 2262 may be supported by a below-described tilt supporter 2280. The supply tilt cover 2260 may tilt forward in a state of being supported by the tilt supporter 2280.

When the water tank 2100 is held at the water supply assembly 2200, a valve installation part 2115 of the water tank 2100 may pass through the valve insertion hole 2261 and may pass through the tilt cover body 2262 to protrude downward. The water tank valve 2150 and the valve supporter 2250 may interfere with each other at the valve installation part 2115.

An installation part 2266 may be formed at the tilt cover body 2262. The installation part 2266 is used to install the bellows fixation cover 2265. The installation part 2266 may be formed on an upper surface of the tilt cover body 2262, and a concaved step may be formed at a lower side of the installation part 2266.

The valve insertion hole 2261 may be formed at a center of the installation part 2266.

An upper end of the water bellows 2240 may be disposed at the installation part 2266 through the valve insertion hole 2261. The bellows fixation cover 2265 may fix the upper end of the water bellows 2240 to the installation part 2266.

The bellows fixation cover 2265 may be provided with a fixation cover hole 2265c communicating with the valve insertion hole 2261. The valve insertion hole 2261 may be disposed at a lower side of the fixation cover hole 2265c.

When the supply tilt cover 2260 tilts, the bellows fixation cover 2265 may also tilt. In response to the tilt, the water bellows 2240 may stretch.

As the upper end and lower end of the water bellows 2240 are fixed respectively, water may be prevented from leaking out of the water bellows 2240 at the time of tilt.

The bellows fixation cover 2265 may include a top plate 2267 disposed at the tilt cover body 2262, and a rear plate 2268 extended downwards from the top plate 2267 and disposed at the tilt cover side wall 2264.

The top plate 2267 and the tilt cover body 2262 may provide a continuous surface. The rear plate 2268 and the tilt cover side 2264 may provide a continuous surface.

The top plate 2267 may be provided with a stopping part 2267*a*, and the stopping part 2267*a* may be inserted into a stopping groove 2262*a* formed at the tilt cover body 2262.

A coupling hole (not illustrated) may be formed at the rear plate 2268, and a coupling member (not illustrated) may pass through the coupling hole of the rear plate 2268 and a coupling hole 2264*a* formed at the tilt cover side 2264 and may fix the bellows fixation cover 2265 and the supply tilt cover 2260.

As the bellows fixation cover 2265 may be coupled and fixed from a rear in a state of being stopped by an upper portion of the supply tilt cover 2260, the bellows fixation cover 2265 may fix the water bellows 2240 more firmly on the basis of the principle of the lever.

<Configuration of Water Bellows>

The water bellows 2240 may be made of an elastic material. The water bellows 2240 may be fixed to the supply tilt cover 2260 and the supply support body 2230, and may supply water discharged from the water tank 2100 to the supply support body 2230.

The water bellows 2240 may prevent water discharged from the water tank 2100 from leaking. When the water tank 2100 tilts, the water bellows 2240 may be elastically deformed and stretched. The water bellows 2240 may connect between the supply tilt cover 2260 and the supply support body 2230 even when the water tank tilts.

In the embodiment, the water bellows 2240 may be formed with a corrugate tube.

An upper end of the water bellows 2240 may be fixed to the supply tilt cover 2260, and a lower end may be fixed to the supply support body 2230.

In the embodiment, a bellows cap 2242 for fixing the upper end of the water bellows 2240 to the supply tilt cover 2260 may be further provided.

The upper end of the water bellows 2240 may protrude from an upper side of the supply tilt cover 2260 through the valve insertion hole 2261.

The bellows cap 2242 may be disposed at the upper side of the supply tilt cover 2260, and may press the upper end of the water bellows 2240 against an upper surface of the supply tilt cover 2260. The bellows cap 2242 may be fixed to the supply tilt cover 2260 through a coupling or a press fit.

In the embodiment, the bellows cap 2242 may be fixed to the supply tilt cover 2260 through a coupling. Accordingly, the water bellows 2240 may be easily replaced when the water bellows 2240 is damaged or broken.

<Configuration of Supply Floater>

The supply floater 2220 may be disposed in the supply chamber 2211 and may move in an up-down direction depending on a water level of the supply chamber 2211.

The supply floater 2220 may prevent all the water in the water tank 2100 from moving to the steam generator 2300. The supply floater 2220 may control an amount of water flowing to the steam generator 2300 while moving in the up-down direction depending on the water level.

For example, buoyancy of the supply floater 2220 may be three times greater than pressure applied by water in the water tank 2100.

When a water level of the supply chamber 2211 increases to a reference level or above, the supply floater 2220 may close the valve hole 2258. When the valve hole 2258 is closed, water is not supplied to the supply chamber 2211, and water in the supply chamber 2211 may flow to the steam generator 2300 through a chamber housing pipe 2214.

A water level in the supply chamber 2211 may decrease by an amount of water flowing from the supply chamber 2211 to the steam generator 2300, and a height of the supply floater 2220 may be lowered such that the valve hole 2258 is opened.

The supply floater 2220 may include a floater body 2222 made of a material having a lower density than water, a guide insertion groove 2225 which is formed at the floater body 2222, which is concaved from an upper side to a lower side, and into which a floater guide 2234 of a supply support body 2230 is inserted, a support body insertion part 2224 formed at the floater body 2222 and forming the guide insertion groove 2225, and a floater valve 2270 disposed at the floater body 2222 and configured to open and close the valve hole 2258 forming a part of a supply flow channel 2231.

The support body insertion part 2224 may be concaved from an upper side to a lower side, and the floater guide 2234 may be inserted into the support body insertion part 2224. When the supply floater 2220 moves up or moves down depending on a water level of the supply chamber 2211, the support body insertion part 2224 may move up or move down along the floater guide 2234.

The support body insertion part 2224 and the floater guide 2234 may have shapes corresponding to each other. In the embodiment, as the floater guide 2234 has a cylindrical shape, the support body insertion part 2224 may also have a cylindrical shape.

The support body insertion part 2224 and the floater guide 2234 may be formed in the up-down direction and may stop each other in a lateral direction. Even when the supply floater 2220 moves to a lowest side, the support body insertion part 2224 and the floater guide 2234 may stop each other with respect to the lateral direction.

At least part of the support body insertion part 2224 and the floater guide 2234 may be disposed within the same height. The support body insertion part 2224 and the floater guide 2234 may at least partially overlap in a horizontal direction.

In the embodiment, a diameter of the support body insertion part 2224 may be smaller than a diameter of the floater guide 2234. Accordingly, the support body insertion part 2224 may be disposed in the floater guide 2234 for an installation structure of the floater valve 2270.

The floater valve 2270 may include a floater valve core 2272 disposed at the floater body 2222, and a floater valve stopper 2278 coupled to an upper side of the floater valve core 2272 and configured to open and close a middle hole 2258.

The floater valve core 2272 may be assembled to the floater body 2222. In the embodiment, the floater valve core 2272 may be disposed to pass through the floater body 2222 in the up-down direction, and the floater body 2222 may be provided with a core hole 2223 through which the floater valve core 2272 passes.

The core hole 2223 may be disposed inside the support body insertion part 2224.

The core hole 2223 may be formed inside the support body insertion part 2224, and the guide insertion groove 2225 may be formed outside the support body insertion part 2224. The core hole 2223 and the guide insertion groove 2225 may all be formed to extend in the up-down direction.

The support body insertion part 2224 may include a support body inner wall 2224a disposed in the floater body 2222, spaced apart from the floater body 2222, forming the core hole 2223 inside thereof and forming the guide insertion groove 2225 outside thereof, and a support body bottom wall 2224b connecting the support body inner wall 2224a and the floater body 2222 and forming the guide insertion groove 2225 at an upper side thereof.

The support body inner wall 2224a may be formed into a cylindrical shape that is long in the up-down direction. The support body bottom wall 2224b may be formed into a ring shape from a top view perspective.

An inner end of the support body bottom wall 2224b may connect to the floater body 2222, and an outer end of the support body bottom wall 2224b may connect to the support body inner wall 2224a.

In the embodiment, the floater body 2222 and the support body insertion part 2224 may be integrally formed through an injection molding process. Unlike the embodiment, the support body insertion part 2224 may be separately manufactured and then may be assembled into the floater body 2222.

The floater valve core 2272 may be disposed to pass through the core hole 2223 in the up-down direction. An upper end of the floater valve core 2272 may protrude further upward than an upper end of the support body inner wall 2224a, and a lower end of the floater valve core 2272 may protrude further downward than a lower end of the support body inner wall 2224a.

A core support base 2273, protruding outward in a radial direction and supported by a lower end of the support body bottom wall 2224b, may be formed at a lower end of the floater valve core 2272. The core support base 2273 may be disposed lower than the support body bottom wall 2224b.

A floater body groove 2226, which is concaved from a bottom surface of the floater body 2222 upwards, may be formed. The floater body groove 2226 may communicate with the core hole 2223 and may be formed at a lower side of the core hole 2223. The floater body groove 2226 may be disposed lower than the support body bottom wall 2224b.

The core support base 2273 may be inserted into the floater body groove 2226, and may be hidden in the floater body groove 2226 without protruding from a lower side of the bottom surface of the floater body 2222.

The floater valve stopper 2278 may be assembled to the upper end of the floater valve core 2272. The floater valve stopper 2278 may be supported by the upper end of the support body inner wall 2224a in a state where the floater valve stopper 2278 is assembled to the floater valve core 2272.

The floater valve stopper 2278 may have a triangular pyramid shape with a pointy upper side, and the pointy end 2279 may be inserted into the valve hole 2258. The pointy end 2279 may protrude further upward than an upper end of the floater body 2222.

In the embodiment, water flowing from the water tank 2100 to the supply chamber 2111 may be regulated twice.

A water tank valve 2150 may open and close the valve hole 2111 to control a flow of water. Then the floater valve 2270 may open and close the middle hole 2258 to control the flow of water.

As water discharged from the water tank 2100 experiences the opening and closing process twice and flows to the supply chamber 2111, water may be prevented from being excessively supplied. The supply floater 2220 may additionally control supply of water. Accordingly, an excessive amount of water may be prevented from being supplied to the steam generator 2300.

Unlike the embodiment, a water level sensor for sensing a level of water may be disposed in the supply chamber 2211, and a shut-off valve may be disposed at the chamber housing pipe 2214 to adjust an amount of water supplied to the steam generator 2300. This structure requires a water level sensor and a shut-off valve additionally, thereby causing an increase in manufacturing costs, and is controlled according to electric signals, thereby requiring an additional wire feeding structure of a cable.

In the embodiment, as an amount of water supplied to the steam generator 2300 may be controlled through the supply floater 2220 that moves up or moves down depending on a water level of the supply chamber 2211, control over a level of water in the steam generator 2300 and an amount of water supplied to the steam generator 2300 may be implemented mechanically.

FIG. 26 is a view illustrating an example where a tilting assembly for an exemplary water tank is installed. FIG. 27 is a perspective view illustrating a state where a lower cover is removed from the water tank, the water supply assembly and the tilting assembly in FIG. 26 without a lower cover. FIG. 28 is a perspective view illustrating an inside of the tilting assembly in FIG. 27.

<<Configuration of Tilting Assembly>>

The tilting assembly 2600 may be disposed at the cabinet assembly 100 or the water supply assembly 2200. In the embodiment, the tilting assembly 2600 may be disposed at the water supply assembly 2200 and may optionally tilt the water tank 2100 forward according to an electric signal. The tilting assembly 2600 may also return the water tank tilted forward to an initial position thereof according to an electric signal.

The tilting assembly 2600 may tilt the water tank 2100 held at the water supply assembly 2200 to space the water tank 2100 from the water supply assembly 2200. When the water tank 2100 is spaced apart from the water supply assembly 2200, the water tank valve 2150 may close the valve hole 2111. Accordingly, water may be prevented from being discharged out of the water tank 2100.

In case there is no water in the water tank 2100 or in case water in the water tank 2100 is at a reference level or below, the tilting assembly 2600 may automatically operate. When a user mounts or dismounts the water tank 2100, the tilting assembly 2600 may operate according to an electric signal.

The water tank 2100 may tilt in a forward direction where the user is positioned, a water tank handle 2140 may be deployed upward when the water tank 2100 tilts, and the user may easily grip the water tank handle 2140 deployed upward.

The tilting assembly 2600 may include a supply tilt cover 2260 which supports a lower side of a water tank 2100, at which the water tank 2100 is detachably held, and which tilts the water tank 2100 forward, a tilt move gear 2620 configured to support the supply tilt cover 2260 and to move a rear of the supply tilt cover 2260 in an up-down direction, a tilt gear housing 2660 disposed at any one of the water supply assembly 2200 or the cabinet assembly 100, a tilt drive gear assembly 2800 disposed in the tilt gear housing 2660, engaged with the tilt move gear 2620, configured to supply a driving force to the tilt move gear 2620 and configured to move the tilt move gear 2620, a tilt motor 2650 disposed in the tilt gear housing 2660 and configured to supply a driving force to the tilt drive gear assembly 2800, and a tilt sensor 2621 configured to sense a tilt or a home position of the tilt move gear 2620.

The tilting assembly 2600 may further include an extra supporter 2290 configured to be rotatably assembled to a supply support body 2230, and support a lower surface of the supply tilt cover 2260. A center of rotation of the extra supporter 2290 may be the same as a direction of the tilt of the water tank 2100, and in the embodiment, may be formed in a left-right direction.

In the embodiment, the supply tilt cover 2260 may be rotatably assembled to the supply support body 2230 disposed at a lower side thereof, and when the tilt move gear 2620 operates, may tilt in a front-rear direction with respect to a tilt axis (T). In the embodiment, the tilt axis (T) of the water tank 2100 may be formed through the supply tilt cover 2260 and the supply support body 2230.

In the embodiment, as the water tank 2100 is detachable from the supply tilt cover 2260, the supply tilt cover 2260 and the supply support body 2230 may provide a rotation structure for a tilt while firmly supporting a load of the water tank 2100.

<Configuration of Supply Support Body for Tilting Assembly>

In the embodiment, the tilt supporter 2280 supporting the supply tilt cover 2260 may be respectively disposed on a left side and a right side of a bellows rib 2235. In the embodiment, each tilt supporter 2280 may be long and extended in a front-rear direction.

When the tilt supporters 2280 distinguish from each other, the tilt supporter 2280 on the left side is referred to as a first tilt supporter 2280-1, and the tilt supporter 2280 on the right side is referred to as a second tilt supporter 2280-2.

The tilt supporter 2280 may be a structure protruding upward from the supply body plate 2232. In the embodiment, the tilt supporter 2280 and the supply support body 2230 may be integrally manufactured through an injection molding process. Unlike the embodiment, the tilt supporter 2280 may be separately manufactured and then may be assembled to the supply support body 2230.

As the tilt supporter 2280 is a structure for supporting the water tank 2100, the tilt supporter 2280 may be disposed at a lower portion of the water tank 2100.

The tilt supporter 2280 may include a tilt supporter body 2281 protruding upward from the supply support body 2230, a tilting journal 2282 which is disposed at the tilt supporter body 2281 and which provides an axis of rotation when the water tank 2100 tilts, and a supporter part 2283 which is formed at the tilt supporter body 2281 and which is configured to support a lower portion of the water tank 2100 when the water tank 2100 tilts.

The water tank 2100 may be held at the supply tilt cover 2260, and a load of the supply tilt cover 2260 may be delivered to the tilt supporter body 2281.

The tilting journal 2282 may be formed at the tilt supporter body 2281. The titling journal 2282 may be disposed respectively at a first tilt supporter 2280-1 and a second tilt supporter 2280-2. The tilting journal 2282 at the first tilt supporter 2280-1 is referred to as a first tilting journal 2282-1, and the tilting journal 2282 at the second tilt supporter 2280-2 is referred to as a second tilting journal 2282-2.

The supply tilt cover 2260 may tilt in a front-rear direction in a state of being supported by the first tilting journal 2282-1 and the second tilting journal 2282-2. The first tilting journal 2282-1 and the second tilting journal 2282-2 may provide a tilt axis of the water tank 2100.

The tilting journal 2282 may protrude from the tilt supporter body 2281 horizontally. A lower end 2282a of the tilting journal 2282 may be supported by a supply body plate 2232. In the embodiment, the tilting journal 2282 and the supply body plate 2232 may be integrally manufactured.

A load of the water tank 2100 may be delivered to the tilting journal 2282 and the load delivered to the tilting journal 2282 may be distributed to the tilt supporter body 2281 and the supply body plate 2232. In the embodiment, to effectively support the load of the water tank 2100, the tilting journal 2282 may protrude respectively from a left side and a right side of the tilt supporter body 2281.

As the water tank 2100 rotates around the tilting journal 2282, a center of gravity of the water tank 2100 may be placed at an upper side of the titling journal 2282, for example.

On the assumption that a point, where a virtual extension line, formed by extending the center of gravity of the water tank 2100 downwards, meets a lower body top wall 2113 constituting a bottom surface of the water tank 2100, is X, the point X may be disposed at an upper portion of the tilting journal 2282, for example.

With respect to the point X, a forward distance (Z1) of the lower body top wall 2113 and a rearward distance (Z2) of the lower body top wall 2113 may be the same. When Z2>Z1 is satisfied, the water tank 2100 may be prevented from falling forward at the time of a tilt.

The tilting journal 2282 may include an inner tilting journal 2283 protruding from the tilt supporter body 2281 inward (in the embodiment, the opposite tilt supporter body 2281), and an outer tilting journal 2284 protruding from the tilt supporter body 2281 outward.

Each inner tilting journal 2283 may be disposed between the first tilt supporter body 2281-1 and the second tilt supporter body 2281-2. Each outer tilting journal 2284 may be disposed outside the first tilt supporter body 2281-1 and the second tilt supporter body 2281-2.

An upper surface 2282b of the tilting journal 2282 may be formed into a curved surface. In the embodiment, the upper surface 2282b of the tilting journal 2282 may form a concentric circle. When seen from a lateral surface of the water tank 2100, the upper surface 2282b of the tilting journal 2282 may be formed into a circle or a part of a circle.

Additionally, the tilting journal 2282 may be provided with a hollow hole 2282c therein. The hollow hole 2282c may pass through the inner tilting journal 2283, the tilt supporter body 2281 and the outer tilting journal 2284. A hollow hole 2282c of the first tilting journal 2282-1 is referred to as a first hollow hole, and a hollow hole 2282c of the second tilting journal 2282-2 is referred to as a second hollow hole.

The first hollow hole of the first tilting journal 2282-1 and the second hollow hole of the second tilting journal 2282-2 may be disposed to face each other. The first hollow hole and the second hollow hole may be disposed in a left-right direction, and a virtual central line (T) connecting a center of the first hollow hole and a center of the second hollow hole may be orthogonal to a direction where the water tank 2100 tilts. In the embodiment, the central line (T) may provide a tilt axis of the water tank 2100.

When the water tank 2100 tilts, a supporter part 2283 supporting a bottom surface of the water tank 2100 may be disposed. The supporter part 2283 may be disposed at the supply support body 2230 disposed at a lower side of the supply tilt cover 2260.

In the embodiment, the supporter part 2283 and the tilt supporter body 2281 may be integrally manufactured.

Unlike the embodiment, the supporter part 2283 may be separately disposed at the supply body plate 2232.

The supporter part 2283 may protrude further upward than the supply body plate 2232. The supporter part 2283 may be disposed further forward than the tilting journal 2282. The supporter part 2283 may be disposed further forward than the central line (T).

In the embodiment, the supporter part 2283 may include an inclined surface 2286 which extends from the tilt supporter body 2281 forward and which is disposed to incline towards a lower side of a front thereof.

The supporter part 2283 at the first tilt supporter 2280-1 is referred to as a first supporter 2283-1, and the supporter part 2283 at the second tilt supporter 2280-2 is referred to as a second supporter 2283-2.

The inclined surface 2286 formed at the first supporter 2283-1 is referred to as a first inclined surface 2286-1, and the inclined surface 2286 formed at the second supporter 2283-2 is referred to as a second inclined surface 2286-2.

In the embodiment, the first supporter 2283-1 and the second supporter 2283-2 may support a lower surface of the supply tilt cover 2260 through the inclined surface 2286. Unlike the embodiment, a supporter part protruding upward from an upper surface of the supply body plate 2232 may be formed and may support the supply tilt cover 2260.

In the embodiment, the water tank 2100 may tilt forward.

Accordingly, for the inclined surface 2286 of the supporter part 2283, a rear is high and a front is low. The inclined surface 2286 may be formed on an upper surface of the supporter part 2283. A height of the inclined surface 2286 may become lower from the rear towards the front, and the inclined surface 2286 may be formed to incline towards the lower side of the front thereof.

A predetermined tilt angle may be formed between the inclined surface 2286 and a horizontal surface. In the embodiment, the tilt angle may be determined by the inclined surface 2286. In the embodiment, the inclined surface 2286 may be formed at an angle between 10 degrees or greater and 45 degrees or smaller. When the water tank 2100 is supported by the inclined surface 2286, the water tank 2100 should not fall forward.

To this end, a center of gravity of the water tank 2100 at the time of a tilt has to be placed further rearward than a tank front wall 2123 of the water tank 2100 before the tilt. With respect to a structure that is not tilted, the center of gravity of the water tank 2100 in the embodiment has to be placed further rearward than a lower cover 164.

A position of the center of gravity may vary depending on a surface area of the bottom of the water tank 2100 and a length of the water tank 2100 in the front-rear direction. In the embodiment, the tilt angle (A) may be 17 degrees. The inclined surface 2286 may be formed to incline at an angle of 17 degrees towards the lower side of the front with respect to a horizontal direction.

<Configuration of Supply Tilt Cover for Tilting Assembly>

The water tank 2100 may be detachably held at the supply tilt cover 2260. The supply tilt cover 2260 may be rotatably assembled to the supply support body 2230. The supply support body 2230 may be disposed at a lower side of the supply tilt cover 2260.

The tilting assembly 2600 may be rotatably inserted into a hollow hole 2282c of a tilting journal 2282, and may further include an extra supporter 2290 configured to support a lower surface 2260b of the supply tilt cover 2260.

The supply tilt cover 2260 may include a tilt cover body 2262 at which a lower portion of the water tank 2100 is detachably held, a tilt part 2263 protruding from a lower surface of the tilt cover body 2262 downwards, held at the supply support body 2230 and assembled to the supply support body 2230 to be able to tilt, and an extra chamber 2269 into which the extra supporter 2290 is inserted.

The tilt part 2263 may be disposed at an upper portion of the tilting journal 2282. The tilt part 2263 may rotate in a front-rear direction in a state of being held at the tilting journal 2282. The tilt part 2263 and the tilting journal 2282 may cause sliding friction.

The tilt part 2263 may include a first tilt part 2263-1 held at a first tilting journal 2282-1, and a second tilt part 2263 held at a second tilting journal 2282-2.

The tilt part 2263 may be formed into a curved surface corresponding to an upper surface 2282b of the tilting journal 2282. In the embodiment, as the upper surface 2282b of the tilting journal 2282 is formed into a circularly curved surface, the tilt part 2263 may be a circle-shaped groove or an arc-shaped groove into which the tilting journal 2282 is inserted.

In the embodiment, the tilt part 2263 may be a circular groove that is concaved from a lower side to an upper side. A diameter of the tilt part 2263 may be larger than that of the tilting journal 2282, and a center of curvature of the tilt part 2263 may be aligned with a center of curvature of the tilting journal 2282.

The first tilt part 2263-1 and the second tilt part 2263-2 may be disposed to face each other. The first tilt part 2263-1 and the second tilt part 2263-2 may be disposed in a left-right direction, and a virtual line connecting the center of curvature of the first tilt part 2263-1 and the center of curvature of the second tilt part 2263-2 may be orthogonal to a direction where the water tank 2100 tilts.

The extra supporter 2290 may support the supply tilt cover 2260 along with the tilting journal 2282, and may guide a tilt of the supply tilt cover 2260.

The extra supporter 2290 rotatably assembled to the first tilting journal 2282-1 is referred to as a first extra supporter 2290-1, and the extra supporter 2290 rotatably assembled to the second tilting journal 2282-2 is referred to as a second extra supporter 2290-2.

The extra supporter 2290 may include an extra body 2292 configured to support a lower surface of the supply tilt cover 2260, and an extra shaft 2291 disposed at the extra body 2292, inserted into the hollow hole 2282c of the tilting journal 2282 and configured to rotate in the hollow hole 2282c of the tilting journal 2282.

Each extra shaft 2291 may be disposed in the left-right direction and may be disposed in parallel with the tilt axis. The extra body 2292 may be disposed in an up-down direction, and its upper surface may support the lower surface 2260b of the supply tilt cover 2260.

A shaft direction of the extra shaft 2291 may be orthogonal to a direction of the extra body 2292.

In the embodiment, the extra chamber 2269, into which the extra body 2292 is inserted, may be formed at a lower portion of the supply tilt cover 2260. A lower side of the extra chamber 2269 may be open.

The extra chamber 2269 may be disposed outside the tilt part 2263 to be readily assembled to the extra supporter 2290.

A first extra chamber 2269-1 may be disposed outside the first tilt part 2263-1, and a second extra chamber 2269-2 may be disposed outside the second tilt part 2263-2.

The extra shaft 2291 may be rotatably inserted into the hollow hole 2282c of the tilting journal 2282, and the extra body 2292 may be inserted into the extra chamber 2269.

As the extra body 2292 is inserted into the extra chamber 2269, the extra supporter 2290 may be prevented from separating from the supply tilt cover 2260.

The extra supporter 2290 and a tilt supporter 2280 may effectively distribute a load of the water tank 2100 applied to the supply tilt cover 2260.

In the embodiment, the tilt part 2263 and the extra chamber 2260 may be integrally manufactured.

The supply tilt cover 2260 may further include a first chamber wall 2269a connecting a tilt cover side wall 2264 and the tilt part 2263, and a second chamber wall 2269b connecting the tilt cover side wall 2264 and the tilt part 2263.

The tilt part 2263 and the tilt cover side wall 2264 may be disposed to face each other, and the tilt part 2263 may be disposed inside the tilt cover side wall 2264.

The extra chamber 2269 may be surrounded by the tilt part 2263, the tilt cover side wall 2264, the first chamber wall 2269a and the second chamber wall 2269b to be formed.

A tilt move gear 2620 may supply a driving force for a tilt to the supply tilt cover 2260, and may move the supply tilt cover 2260 in the up-down direction.

The tilt move gear 2620 may receive a driving force from a tilt drive gear assembly 2800, and may move in the up-down direction when the tilt drive gear assembly 2800 operates.

When the tilt drive gear assembly 2800 operates, the supply tilt cover 2260 and the tilt move gear 2620 may move in the up-down direction together. When the tilt move gear 2620 moves in the up-down direction, the water tank 2100 may tilt in the front-rear direction with respect to the tilting journal 22882.

The tilt move gear 2620 may include a move gear support body 2622 configured to support the supply tilt cover 2260, a move gear engagement body 2624 engaged with the tilt drive gear assembly 2800, and a tilt guide groove 2625 disposed at the move gear engagement body 2624 and configured to guide a tilt direction.

In the embodiment, the supply tilt cover 2260, the move gear support body 2622 and the move gear engagement body 2624 may be integrally manufactured. The move gear support body 2622 may be a component for supporting the supply tilt cover 2260 and for lifting the supply tilt cover 2260.

The move gear support body 2622 may be disposed at a rear of the supply tilt cover 2260. The move gear support body 2622 may be disposed horizontally. The move gear engagement body 2624 may extend to a lower side of the move gear support body 2622. The move gear engagement body 2624 may be disposed at the rear of the supply tilt cover 2260, and may protrude and be long downward.

A tilt sensor 2621 may sense the tilt move gear 2620. In the embodiment, the tilt sensor 2621 may sense a home position of the tilt move gear 2620. The tilt sensor 2621 may sense a lower end 2620a of the tilt move gear 2620. When the lower end 2620a of the tilt move gear 2620 contacts a tilt move gear supporter 2216, the tilt sensor 2621 may sense the lower end 2620a.

In the embodiment, a limit switch may be used as the tilt sensor 2621. Unlike the embodiment, a photo sensor or a tact switch and the like may be used to sense that the lower end 2620a of the tilt move gear 2620 contacts the tilt move gear supporter 2216.

In the embodiment, input pulses of a tilt motor 2650 may be controlled to control a tilt angle of the tilt move gear 2620.

Unlike the embodiment, a permanent magnet may be installed at the tilt sensor 2621 and a Hall sensor may be disposed at the tilt move gear supporter 2216, to sense a position of the tilt move gear 2620.

The tilt sensor may be additionally installed to sense a tilt angle of the tilt move gear 2620. For example, a permanent magnet 2623a may be disposed at an upper end 2620b of the tilt move gear 2620, and a Hall sensor 2623b may be installed on a cover rear wall 164b of a lower cover 164.

In case the tilt move gear 2620 tilts forward, the Hall sensor 2623b may sense the permanent magnet 2623a, and may stop operation of the tilt motor 2650.

In the embodiment, the permanent magnet 2623a may be disposed at the tilt move gear 2620. Unlike the embodiment, the permanent magnet 2623a may be disposed in the water tank 2100, and the Hall sensor 2623b may be disposed at the lower cover 164 forming a water tank storage 165.

The move gear engagement body 2624 may be disposed in the up-down direction. The move gear engagement body 2624 may protrude downward from the move gear support body 2622. The move gear engagement body 2624 may be disposed at a rear of the move gear support body 2622.

The move gear engagement body 2624 may be a component for engaging itself with the tilt drive gear assembly 2800.

At least part of the water tank 2100 (in the embodiment, a back surface of a tank lower body 2110) and a back surface of a supply chamber housing 2210 may be open such that the move gear engagement body 2624 protrudes rearward.

In the embodiment, a groove 2119, through which the move gear engagement body 2624 passes, may be formed on the back surface of the tank lower body 2110. A groove 2119, through which the move gear engagement body 2624 passes, may be formed on a back surface of a bellows fixation cover 2265.

Teeth 2624a may be formed along the back surface of the move gear engagement body 2624 and may be arranged in the up-down direction. The teeth 2624a may be a pinion gear-type one.

The move gear engagement body 2624 may be disposed in the up-down direction, and may be formed into an arc shape where a center of curvature is placed at its front. The center of curvature of the move gear engagement body 2624 may be placed on a tilt axis (T) of the tilting journal 2262.

The move gear engagement body 2624 may rotate backward and forward around the tilt axis (T).

The tilt guide groove 2625 may also be formed into an arc shape. The tilt guide groove 2625 may be disposed considering a radius of gyration of the water tank 2100. The tilt guide groove 2625 may be formed in the up-down direction, and may have an arc shape where a center of curvature is placed at its front.

The center of curvature of the tilt guide groove 2625 may be placed on the tilt axis (T) of the tilting journal 2262.

<Configuration of Supply Chamber Housing for Tilting Assembly>

Components for the tilting assembly 2600 may be disposed in the supply chamber housing 2210.

For the supply chamber housing 2210, a tilt guide 2215 inserted into the tilt guide groove 2625, and a tilt move gear supporter 2216 configured to support the tilt move gear 2620 may be further described.

The tilt guide 2215 may guide a tilt direction of the tilt move gear 2620.

Unlike the embodiment, the tilt guide 2215 may be disposed at a base 130 or a lower cabinet 120 instead of the supply chamber housing 2210.

The tilt guide 2215 may be inserted into the tilt guide groove 2625 formed at the tilt move gear 2620. The tilt guide groove 2625 may be formed respectively on a left side and a right side of the tilt move gear 2620. Accordingly, two tilt guides 2215 may also be formed respectively on the left side and the right side of the tilt move gear 2620. The two tilt guides 2215 may be spaced in a left-right direction.

The tilt guide 2215 may be formed into an arc shape corresponding to a shape of the tilt guide groove 2625. The tilt guide 2215 may be formed in an up-down direction and may have an arc shape where a center of curvature is placed at its front. The center of curvature of the tilt guide 2215 may be placed on a tilt axis (T) of a tilting journal 2262. In the embodiment, the tilt guide 2215 may be disposed at a rear of a supply chamber 2211.

The tilt guide 2215 may be further provided with an alignment guide 2215a configured to support lateral surfaces of a move gear support body 2622 on a rear surface thereof. The alignment guide 2215a may be disposed on the rear surface of the tilt guide 2215 and may be long and extended in a tilt direction.

The alignment guide 2215a may be disposed respectively on the left tilt guide and the right tilt guide. The tilt move gear 2620 may be disposed between the left alignment guide and the right alignment guide.

The tilt move gear supporter 2216 may support a lower end 2620a of the tilt move gear 2620. The tilt move gear supporter 2216 may prevent the tilt move gear 2620 from moving excessively downward.

Even when the lower end 2620a of the tilt move gear 2620 is supported by the tilt move gear supporter 2216, the engagement between a tilt drive gear assembly 2800 and the tilt move gear 2620 may be maintained. The tilt move gear supporter 2216 may prevent the tilt drive gear assembly 2800 and the tilt move gear 2620 from being disengaged.

The tilt move gear supporter 2216 may be disposed to incline towards a lower side of a rear of it. The lower end 2620a of the tilt move gear 2620 may be formed into an inclined surface to correspond to the inclination of the tilt move gear supporter 2216. In the embodiment, the tilt move gear supporter 2216 and the supply chamber housing 2210 may be integrally manufactured.

Although a driving force of the tilt drive gear assembly 2800 is not supplied, the lower end 2620a of the tilt move gear 2620 may be supported by the tilt move gear supporter 2216. Accordingly, the engagement of the tilt drive gear assembly 2800 and the tilt move gear 2620 may be maintained.

In the embodiment, the tilt move gear supporter 2216 may be disposed at a lower side of the tilt guide 2615. The tilt move gear supporter 2216 may be disposed on an extension line of the tilt guide 2615, for example.

The tilt move gear 2620 guided through the tilt guide 2615 may be supported by the tilt move gear supporter 2216 and may stop rotating.

The supply chamber housing 2210 may include a chamber housing body 2212 installed at an upper side of the base 130 of the cabinet assembly 100, a supply chamber 2211 disposed inside the chamber housing body 2212, being open upward, being concaved downward and configured to temporarily store water, a chamber housing pipe 2214 disposed at the chamber housing body 2212, communicating with the supply chamber 2211 and configured to supply water in the chamber housing 2212 to the steam generator 2300, a chamber housing rear wall 2217 protruding upward from the chamber housing body 2212 and disposed at a rear of a tank rear wall 2126 of the water tank 2100, a tilt move gear penetration part 2218 which is formed on the chamber housing rear wall 2217, which passes through the chamber housing rear wall 2217 in a front-rear direction, where the tilt move gear 2620 is disposed, and to which the tilt move gear 2620 moves, a tilt guide 2215 inserted into a tilt guide groove 2625, and a tilt move gear supporter 2216 configured to support the tilt move gear 2620.

The chamber housing rear wall 2217 may be disposed at a rear of the water tank 2100. The tilt move gear 2620 may be disposed by passing through the chamber housing rear wall 2217.

A cover rear wall 164b of a lower cover 164 may be disposed between the chamber housing rear wall 2217 and the water tank 2100. The lower cover 164 may include a water tank opening 167, and the water tank 2100 may be disposed in the lower cover 164 through the water tank opening 167.

The tilt move gear 2620 may pass through the cover real wall 164b and may protrude from a rear of the cover rear wall 164b.

The tilt move gear supporter 2216 may be disposed on the chamber housing rear wall 2217. Specifically, the tilt move gear supporter 2216 may be disposed at a lower side of the tilt move gear penetration part 2218.

In the embodiment, the tilt move gear penetration part 2218 may pass through the chamber housing rear wall 2217 in a front-rear direction, and may be formed into a groove that is concaved from an upper side to a lower side. The tilt move gear 2620 may be disposed at the tilt move gear penetration part 2218 and may rotate at the penetration part 2218 in an up-down direction.

Specifically, a move gear engagement body 2624 may be disposed at the tilt move gear penetration part 2218, and the move gear support body 2622 may protrude from a front of the chamber housing rear wall 2217.

A tilt gear housing 2660 may be disposed at a rear of the chamber housing rear wall 2217, and may be coupled to the chamber housing rear wall 2217.

The cover rear wall 164b of the lower cover 164 may be disposed at the front of the chamber housing rear wall 2217. The chamber housing rear wall 2217 may support of a rear surface of the water tank 2100. The chamber housing rear wall 2217 may prevent the water tank 2100 from falling rearward.

<Configuration of Tilt Gear Housing and Tilt Drive gear Assembly>

The tilt drive gear assembly 2800 may be installed in the tilt gear housing 2660, and the tilt motor 2650 may be installed outside the tilt gear housing 2660. The tilt gear housing 2660 may provide a space for installing the tilt gear drive assembly 2800 and the tilt motor 2650.

The tilt gear housing 2660 may include a first tilt gear housing 2662 and a second tilt gear housing 2664. In the embodiment, with respect to a front surface, the first tilt gear housing 2662 may be disposed on a left side and the second tilt gear housing 2664 may be disposed on a right side.

A part of a front surface of the first tilt gear housing 2662 and a part of a front surface of the second tilt gear housing 2664 may be open. The open surface of the front surface of the first tilt gear housing 2662 and the second tilt gear housing 2664 is referred to as a gear housing open surface 2661.

A tilt move gear 2620 and the tilt drive gear assembly 2800 may be engaged through the gear housing open surface 2661. The gear housing open surface 2661 may be disposed to face the tilt move gear 2620. A tilt move gear penetration part 2218 may be disposed at a front of the gear housing open surface 2661. The gear housing open surface 2661 and the tilt move gear penetration part 2218 may be disposed in line.

The tilt motor 2650 may be assembled to any one of the first tilt gear housing 2662 and the second tilt gear housing 2664. In the embodiment, the tilt motor 2650 may be assembled to the first tilt gear housing 2662.

A motor shaft of the tilt motor 2650 may penetrate the first tilt gear housing 2662 and may be coupled to the tilt drive gear assembly 2800. The motor shaft of the tilt motor 2650 may be disposed in a left-right direction. A step motor may be used as the tilt motor 2650.

The tilt drive gear assembly 2800 may be a combination of gears for delivering a driving force of the tilt motor 2650 to the tilt move gear 2620.

The tilt drive gear assembly 2800 may include a first tilt drive gear 2810 rotatably assembled to the tilt gear housing 2660, coupled to the tilt motor 2650 and configured to receive a driving force from the tilt motor 2650 and to rotate, and a second tilt drive gear 2820 rotatably assembled to the tilt gear housing 2660, engaged respectively with the first tilt drive gear 2810 and the tilt move gear 2620, and configured to deliver a driving force of the first tilt drive gear 2810 to the tilt move gear 2620.

The first tilt drive gear 2810 may be disposed at a lower side of the second tilt drive gear 2820. Central axes of the first tilt drive gear 2810 and the second tilt drive gear 2820 may be disposed in parallel.

In the embodiment, the first tilt drive gear 2810 and the second tilt drive gear 2820 may be disposed in the left-right direction. The first tilt drive gear 2810 and the second tilt drive gear 2820 may rotate in an up-down direction.

Teeth of each of the first tilt drive gear 2810 and the second tilt drive gear 2820 may be formed into those of a pinion gear.

A diameter of the first tilt drive gear 2810 may be smaller than a diameter of the second tilt drive gear 2820. The second tilt drive gear 2820 may reduce a speed of rotation of the first tilt drive gear 2810.

Axes of rotation of the first tilt drive gear 2810 and the second tilt drive gear 2820 may be arranged perpendicularly. That is, the axis of rotation of the first tilt drive gear 2810 may be disposed at a lower side of the axis of rotation of the second tilt drive gear 2820.

The first tilt drive gear 2810 may be an ordinary pinion gear. Accordingly, description of the first tilt drive gear 2810 is omitted.

The second tilt drive gear 2820 may include a first drive gear part 2830 engaged with the first tilt drive gear 2810, and a second drive gear part 2840 engaged with the tilt move gear 2620.

The first drive gear part 2830 and the second drive gear part 2840 may be integrally manufactured.

A diameter of the first drive gear part 2830 may be larger than a diameter of the second drive gear part 2840. A diameter of the second drive gear part 2840 may be larger than that of the first tilt drive gear 2810.

In the embodiment, the first drive gear part 2830 may be disposed at the first tilt gear housing side 2662, and the second drive gear part 2840 may be disposed at the second tilt gear housing side 2664.

An axis of rotation of the second tilt drive gear 2820 may be disposed at the first drive gear part 2830. In the embodiment, the axis of rotation of the second tilt drive gear 2820 and the first tilt gear housing 2662 may be integrally manufactured.

Accordingly, the first drive gear part 2830 may be rotatably assembled to the axis of rotation disposed in the first tilt gear housing 2662.

The first drive gear part 2830 and the second drive gear part 2840 may be respectively formed into a pinion gear-type with different diameters. The diameter of the second drive gear part 2840 may be smaller than that of the first drive gear part 2830.

Accordingly, the tilt move gear 2620 engaged with the second drive gear part 2840 may be disposed at a lateral portion of the first drive gear part 2830. In the embodiment, the tilt move gear 2620 may be disposed on a right side of the second drive gear part 2840, and when viewed laterally, a part of the tilt move gear 2620 and a part of a front of the first drive gear part 2830 may overlap.

The second drive gear part 2840 may be disposed at a rear of the tilt move gear penetration part 2218. The second drive gear part 2840 may be disposed at a rear of the gear housing open surface 2661. The tilt move gear 2620 may be disposed at a front of the second drive gear part 2840, and the second drive gear part 2840 may be engaged with the tilt move gear 2620.

The second tilt drive gear 2820 may rotate in its place, and the tilt move gear 2620 may rotate in the up-down direction in a state of being engaged with the second drive gear part 2840.

The second drive gear part 2840 may be disposed further upward than a tilt move gear supporter 2216. As the second drive gear part 2840 supports the tilt move gear 2620, the second drive gear part 2840 may be disposed at a lower side of a water tank 2100, for example.

Specifically, a center of the axis of the second drive gear part 2840 may be disposed at the lower side of the water tank 2100 (in the embodiment, a lower side of a lower body top wall 2113).

When the tilt drive motor 2650 operates in a first direction, the first tilt drive gear 2810 engaged with the first tilt drive motor 2650 may rotate, and the second tilt drive gear 2820 engaged with the first tilt drive gear 2810 may rotate. The second tilt drive gear 2820 may reduce a speed of rotation of the first tilt drive gear 2810 and may increase torque of the first tilt drive gear 2810.

Additionally, the tilt move gear 2620 engaged with the second drive gear part 2840 of the second tilt drive gear 2820 may rotate upward, and on the basis of an upward rotation of the tilt move gear 2620, a supply tilt cover 2260 may be pushed to an upper side on which the water tank 2100 is disposed.

The supply tilt cover 2260 may contact a bottom surface of the water tank 2100, and the tilt move gear 2620 may push up a tank lower body 2110 of the water tank 2100 and may tilt the water tank 2100 forward.

When the water tank 2100 tilts forward, a water tank valve 2150 and a valve supporter 2250 may be separated, and the water tank valve 2150 may close the valve hole 2111. A user may lift the forward-tilted water tank 2100 and may detach the water tank from a water supply assembly 2200 (in the embodiment, a supply support body 2230).

Then when the water tank 2100 is placed and held at the water supply assembly 2200 (in the embodiment, the supply support body 2230) by the user, the tilt motor 2650 may rotate in a second direction, and the water tank 2100 may return to its initial position while the tilt move gear 2620 rotates downward.

<<Configuration of Steam Guide>>

The steam guide 2400 may supply steam of the steam generator 2300 to a discharge flow channel. The discharge flow channel may include a flow channel of air allowed to flow by the long-distance fan assembly 400, and a flow channel of air allowed to flow the a short-distance fan assembly 300.

In the embodiment, the discharge flow channel may be disposed at the cabinet assembly 100, and may be defined as a period during which air passing through the filter assembly 600 is discharged out of the cabinet assembly 100.

In the embodiment, the steam guide 2400 may guide steam, generated in the steam generator 2300, to the lateral discharge port 301, 302. The steam guide 2400 may provide an additional flow channel separate from the air flow channel in the cabinet assembly 100. The steam guide 2400 may have a pipe shape or a duct shape.

The steam guide 2400 may include a main steam guide 2450 coupled to the steam generator 2300 and supplied with humidified air of the steam generator 2300, a first branch guide 2410 coupled to the main steam guide 2450 and configured to guide some of the humidified air, supplied through the main steam guide 2450, to a first lateral discharge port 301, a second branch guide 2420 coupled to the main steam guide 2450 and configured to guide the rest of the humidified air, supplied through the main steam guide 2450, to a second lateral discharge port 302, a first diffuser 2430 assembled to the first branch guide 2410, disposed at the first lateral discharge port 301 and configured to discharge the humidified air, supplied through the first branch guide 2410, to the first lateral discharge port 301, and a second diffuser 2440 assembled to the second branch guide 2420, disposed at the second lateral discharge port 302 and configured to discharge the humidified air, supplied through the second branch guide 2420, to the second lateral discharge port 302.

FIG. 38 is a right-side sectional view illustrating a second exemplary water tank and a second exemplary tilting assembly.

For the tilting assembly 2602 according to the second embodiment, an elastic member 2670 and a damper 2680 may be disposed instead of a tilt motor.

The tilting assembly 2602 may include an elastic member 2670 coupled to a base 130 and a tilt move gear 2620 and configured to supply an elastic force to the tilt move gear 2620, a damper gear 2684 engaged with a move gear engagement body 2624 of the tilt move gear 2620, and a damper 2680 coupled to the damper gear 2684 and configured to supply a damping force at the time of rotation of the damper gear 2684.

The elastic member 2670 may supply an elastic force upward, and may allow the tilt move gear 2620 to rotate around a tilting journal 2282.

The damper gear 2684 may maintain its engagement with the move gear engagement body 2624. The damper 2680 may reduce a speed of rotation of the tilt move gear 2620 when the tilt move gear 2620 is rotated by the elastic member 2670. The damper 2680 may be disposed at the base 130 or the cabinet assembly 100.

A lower cover 164 and the water tank 2100 may be provided with a lock 2690 configured to optionally fix the water tank 2100. The lock 2690 may include a held part 2692 and a locker 2691. In the embodiment, the held part 2692 may be disposed at a tank upper body 2130 and may protrude rearward. The locker 2691 may be disposed on a cover rear wall 164*b*.

The locker 2691 may operate on the basis of a control signal, and may optionally catch hold of the held part 2692.

In case a user is sensed, or in case a user inputs a signal, the held part 2692 may be released from the locker 2691.

When the lock 2690 opens, a supply tilt cover 2260 may be rotated around the tilting journal 2282 by an elastic force of the elastic member 2670. When the supply tilt cover 2260 rotates, the damper 2680 may reduce a speed of rotation of the damper gear 2684. Accordingly, a speed of a tilt of the water tank 2100 may be reduced and the water tank 2100 may slowly tilt forward.

Unlike the embodiment, the elastic member 2670 may be provided with the damper 2680 removed.

Unlike the embodiment, the damper 2680 may be installed at an extra supporter 2290 and a speed of rotation of an extra shaft 2291 may be reduced.

The rest of the configuration of this embodiment are the same as those in the above-described first embodiment. Accordingly, detailed description on the rest configurations is omitted.

Although the embodiments have been described with reference to a number of illustrative embodiments thereof, it should be understood that numerous other modifications and embodiments can be devised by those skilled in the art. In addition to variations and modifications in the component parts and/or arrangements, alternative uses will also be apparent to those skilled in the art. Thus, it should be understood that the embodiments are provided only as examples and are not limited.

The invention claimed is:

1. An indoor unit for an air conditioner, comprising:
a cabinet assembly including a base;
a water tank disposed at an upper side of the base;
a tilting journal disposed between the base and the water tank to support the water tank, and to provide a tilt axis of the water tank when the water tank tilts;
a supply tilt cover at which the water tank is detachably held, which supports a lower side of the water tank, and which is supported by the tilting journal;
a tilt move gear to support the supply tilt cover and to move a rear of the supply tilt cover in an up-down direction;
a tilt drive gear assembly engaged with the tilt move gear to supply a driving force to the tilt move gear and move the tilt move gear in the up-down direction; and
a tilt motor to supply the driving force to the tilt drive gear assembly,
wherein on the basis of operation of the tilt drive gear assembly, the tilt move gear moves in the up-down direction, and on the basis of the up-down movement of the tilt move gear, the water tank tilts in a front-rear direction with respect to the tilting journal.

2. The indoor unit of claim 1, further comprising:
a supply support body disposed at the upper side of the base,
wherein the tilting journal is disposed at the supply support body, and the supply tilt cover is disposed at an upper side of the supply support body, and
the supply tilt cover tilts in the front-rear direction with respect to the tilting journal in a state of being supported by the tilting journal.

3. The indoor unit of claim 2, further comprising:
a tilt part protruding downward from a lower surface of the supply tilt cover and supported by the tilting journal,
wherein the tilting journal protrudes upward from an upper surface of the supply support body, and the tilt part is provided with a groove into which the tilting journal is inserted.

4. The indoor unit of claim 3, wherein an upper surface of the tilting journal has a curved shape, and the tilt part has an arc shape into which the tilting journal is inserted.

5. The indoor unit of claim 2, wherein the tilting journal further comprising:
- a first tilting journal disposed on a left side of the supply support body to support a lower end on a left side of the supply tilt cover; and
- a second tilting journal disposed on a right side of the supply support body to support a lower end on a right side of the supply tilt cover,
- wherein the tilt axis of the water tank is formed on an extension line connecting the first tilting journal and the second tilting journal.

6. The indoor unit of claim 5, wherein a direction in which the first tilting journal and the second tilting journal are disposed is orthogonal to a direction in which the water tank tilts.

7. The indoor unit of claim 5, further comprising:
- an extra supporter rotatably assembled to the supply support body to support a lower surface of the supply tilt cover.

8. The indoor unit of claim 7, wherein the extra supporter further comprising:
- a first extra supporter rotatably assembled to the first tilting journal to support the lower surface of the supply tilt cover; and
- a second extra supporter rotatably assembled to the second tilting journal to support the lower surface of the supply tilt cover.

9. The indoor unit of claim 8, wherein the first tilting journal is provided with a first hollow hole, the second tilting journal is provided with a second hollow hole, the first hollow hole and the second hollow hole are disposed in a left-right direction, and
- the first extra supporter is rotatably assembled to the first hollow hole of the first tilting journal and, and the second extra supporter is rotatably assembled to the second hollow of the second tilting journal.

10. The indoor unit of claim 5, wherein the tilt move gear and the supply tilt cover are integrated, the tilt move gear protrudes further rearward than a back surface of the water tank, and the tilt drive gear assembly is disposed at a rear of the tilt move gear.

11. The indoor unit of claim 5, wherein the tilt move gear is formed in an arc shape, and a center of curvature of the tilt move gear is disposed to face the tilting journal.

12. The indoor unit of claim 5, wherein a lower end of the tilt move gear protrudes further downward than the supply support body, and a portion, where the tilt move gear and the tilt drive gear assembly are engaged, is disposed at a height the same as or lower than the tilting journal.

13. The indoor unit of claim 5, wherein the tilt move gear is disposed between the first tilting journal and the second tilting journal.

14. The indoor unit of claim 5, further comprising a tilt guide disposed at a structure at a base side to guide a direction of movement of the tilt move gear.

15. The indoor unit of claim 14, wherein a tilt guide groove is formed along a length-wise direction of the tilt move gear, the tilt guide is inserted into the tilt guide groove, and when the water tank tilts, the tilt guide groove moves along the tilt guide.

16. The indoor unit of claim 15, wherein the tilt guide groove and the tilt guide are formed into an arc shape, and a center of curvature of the tilt guide groove and the tilt guide is disposed to face the tilting journal.

17. The indoor unit of claim 5, further comprising a tilt move gear supporter disposed at a structure at a base side to support a lower end of the tilt move gear.

18. The indoor unit of claim 5, further comprising:
- a supply chamber housing disposed at the base, disposed at a lower side of the supply support body to support the supply support body;
- a supply chamber disposed inside the supply chamber housing to store water;
- a valve insertion hole disposed at an upper side of the supply chamber, which passes through the supply tilt cover in the up-down direction and through which water, discharged from the water tank, passes; and
- a middle hole disposed between the valve insertion hole and the supply chamber, which passes through the supply support body in the up-down direction and allowing water, supplied through the valve insertion hole, to flow to the supply chamber,
- wherein the water discharged from the water tank passes through the valve insertion hole and the middle hole and is stored in the supply chamber.

19. The indoor unit of claim 18, further comprising:
- a water bellows which is disposed between the supply tilt cover and the supply support body, an upper end of which is fixed to the supply tilt cover, and a lower end of which is fixed to the supply support body,
- wherein the valve insertion hole is disposed at an upper side of the water bellows, and the middle hole is disposed at a lower side of the water bellows, and
- the water bellows is made of an elastic material and is provided with a supply flow channel to guide water, supplied through the valve insertion hole, to the middle hole.

20. The indoor unit of claim 1, wherein when viewed laterally, the tilting journal is disposed at a lower side of a center of gravity of the water tank.

* * * * *